United States Patent [19]

Kassatly

[11] Patent Number: 5,508,733
[45] Date of Patent: Apr. 16, 1996

[54] METHOD AND APPARATUS FOR SELECTIVELY RECEIVING AND STORING A PLURALITY OF VIDEO SIGNALS

[76] Inventor: L. Samuel A. Kassatly, 4150 Middlefield Rd., Palo Alto, Calif. 94303

[21] Appl. No.: 17,030

[22] Filed: Feb. 12, 1993

Related U.S. Application Data

[63] Continuation-in-part of Ser. No. 826,372, Jan. 27, 1992, which is a continuation-in-part of Ser. No. 573,539, Aug. 27, 1990, Pat. No. 5,157,491, which is a continuation-in-part of Ser. No. 258,722, Oct. 17, 1988, abandoned, and a continuation-in-part of Ser. No. 457,403, Dec. 18, 1989, Pat. No. 4,975,771, which is a continuation-in-part of Ser. No. 308,826, Feb. 10, 1989, Pat. No. 4,903,126.

[51] Int. Cl.⁶ .......................... H04N 7/14; H04N 7/015; H04N 7/26
[52] U.S. Cl. .................................. 348/13; 348/7; 348/8; 348/10; 348/12; 348/385; 348/426; 455/5.1
[58] Field of Search ............................... 348/7, 8, 12, 10, 348/11, 13-19, 22, 23, 24, 385, 388, 384, 387, 426, 469, 472, 471, 705, 706, 720, 901, 389, 461, 468; 370/109, 118, 112; 455/3.1, 3.2, 5.1, 4.1, 4.2, 69, 88, 72; H04N 7/15, 7/14, 1/42, 7/08, 1/21, 7/015, 7/26

[56] References Cited

U.S. PATENT DOCUMENTS

| | | | |
|---|---|---|---|
| 3,213,201 | 10/1965 | Flood et al. | 220/301 |
| 3,693,090 | 9/1972 | Gabriel | 358/86 |
| 3,733,430 | 5/1973 | Thompson et al. | 358/84 |
| 3,740,466 | 6/1973 | Marshall et al. | 348/154 |
| 3,883,685 | 5/1975 | Yumde | 348/424 |
| 3,883,686 | 5/1975 | Jacobus et al. | 348/424 |
| 3,898,374 | 8/1975 | Gargini | 348/7 |
| 3,975,583 | 8/1976 | Meadows | 348/460 |
| 4,035,838 | 7/1977 | Bassani et al. | 348/7 |
| 4,075,658 | 2/1978 | De Cosnac et al. | 358/96 |
| 4,079,417 | 3/1978 | Scudder | 358/111 |
| 4,095,259 | 6/1978 | Sawagata | 358/141 |
| 4,124,871 | 11/1978 | Morrin | 358/287 |
| 4,127,873 | 11/1978 | Katagi | 358/166 |
| 4,143,401 | 3/1979 | Coviello | 358/96 |
| 4,148,070 | 4/1979 | Taylor | 358/160 |
| 4,183,058 | 1/1980 | Taylor | 358/127 |
| 4,189,744 | 2/1980 | Stern | 358/93 |
| 4,193,096 | 3/1980 | Stoffel | 358/260 |

(List continued on next page.)

FOREIGN PATENT DOCUMENTS

93/10606  11/1992  WIPO .............................. H04N 7/13

OTHER PUBLICATIONS

AD–A206–140: "Investigation of Optional Compression Technique".
AD–A210–974: "Robot Vehicle Video Imaging Compression".
AD–A191–577: "Narrative Compression Coding . . . ".
AD–A194–681: "Snap/DDN Interface for Information Exchange".
AD–A206–999: "Geometric Methods with Application . . . ".

(List continued on next page.)

*Primary Examiner*—Safet Metjahic
*Attorney, Agent, or Firm*—Samuel Kassatly

[57] ABSTRACT

Video receiving method and apparatus, are responsive to requests from a selector unit (240), for identifying channels (1 through n), in a transmitter system (204), containing video signals to be sent from the transmitter system (204) to one or more receiver systems (202). The receiving method includes steps of having the receiver system (202) select (94) one or more channels. The receiver system generates (90) signals identificative of the selected channels, and sends (29) the channel identifying signals to the transmitter system (204). The transmitter system uses the channel identifying signals to selectively identify the channels to be transmitted to the receiver system (202). The transmitter system compresses (17, 19, 21) and multiplexes (25) the signals of the channels selected by the receiver system (202). The receiver system (202) receives (75) the compressed and multiplexed signals, and stores (35, 37, 39) the received signals.

12 Claims, 45 Drawing Sheets

U.S. PATENT DOCUMENTS

| | | | |
|---|---|---|---|
| 4,215,369 | 7/1980 | Ijima | 358/146 |
| 4,215,370 | 7/1980 | Kirk | 358/142 |
| 4,242,707 | 12/1980 | Budai | 358/280 |
| 4,282,546 | 8/1981 | Reitmeier | 358/22 |
| 4,300,161 | 11/1981 | Haskell | 370/109 |
| 4,302,771 | 11/1981 | Gargini | 348/7 |
| 4,302,776 | 11/1981 | Taylor | 358/160 |
| 4,345,273 | 8/1982 | Barabas et al. | 348/7 |
| 4,365,273 | 12/1982 | Yamada et al. | 358/260 |
| 4,369,463 | 1/1983 | Anastassiov | 358/135 |
| 4,408,836 | 10/1983 | Kikund | 350/334 |
| 4,410,980 | 10/1983 | Takasaki et al. | 370/109 |
| 4,417,276 | 11/1983 | Bennett et al. | 358/160 |
| 4,442,454 | 4/1984 | Powell | 358/167 |
| 4,450,477 | 5/1984 | Lovett | 358/142 |
| 4,467,355 | 8/1994 | Matsuda | 358/134 |
| 4,467,356 | 8/1984 | McCoy | 358/146 |
| 4,506,387 | 3/1985 | Walter | 455/612 |
| 4,517,597 | 5/1985 | Glenn | 358/181 |
| 4,521,806 | 6/1985 | Abraham | 348/7 |
| 4,533,936 | 8/1985 | Tiemann et al. | 358/12 |
| 4,538,176 | 8/1985 | Nakajima et al. | 348/7 |
| 4,573,072 | 2/1986 | Freeman | 358/86 |
| 4,590,516 | 5/1986 | Abraham | 358/86 |
| 4,593,318 | 6/1986 | Eng et al. | 358/146 |
| 4,597,058 | 6/1986 | Izumi et al. | 364/900 |
| 4,646,135 | 2/1987 | Eichelberger et al. | 358/146 |
| 4,650,929 | 3/1987 | Boerger et al. | 358/86 |
| 4,654,799 | 3/1987 | Ogacki et al. | 364/900 |
| 4,689,661 | 8/1987 | Barbieri et al. | 358/12 |
| 4,694,490 | 9/1987 | Harvey et al. | 380/20 |
| 4,703,349 | 11/1987 | Bernstein | 348/403 |
| 4,704,725 | 11/1987 | Harvey et al. | 380/9 |
| 4,734,764 | 3/1988 | Pocock et al. | 348/7 |
| 4,763,317 | 8/1988 | Lehman et al. | 370/58 |
| 4,806,922 | 2/1989 | McLaughlin et al. | 340/784 |
| 4,814,883 | 3/1989 | Perine et al. | 358/181 |
| 4,824,215 | 4/1989 | Joseph et al. | 350/339 |
| 4,832,457 | 5/1989 | Saitoh et al. | 350/334 |
| 4,874,227 | 10/1989 | Matsukawa et al. | 350/334 |
| 4,890,320 | 12/1989 | Monslow | 380/10 |
| 4,896,209 | 1/1990 | Matsuzaki et al. | 358/86 |
| 4,903,126 | 2/1990 | Kassatly | 358/146 |
| 4,905,094 | 2/1990 | Pocock et al. | 348/13 |
| 4,924,311 | 5/1990 | Ohki et al. | 348/408 |
| 4,949,170 | 8/1990 | Yamagidairu et al. | 348/7 |
| 4,963,995 | 10/1990 | Lang | 358/335 |
| 4,965,825 | 10/1990 | Harvey et al. | 380/9 |
| 4,975,771 | 12/1990 | Kassatly | 358/146 |
| 4,996,707 | 2/1991 | O'Malley et al. | 379/100 |
| 5,014,125 | 5/1991 | Pockok et al. | 348/12 |
| 5,027,400 | 8/1992 | Baji et al. | 380/20 |
| 5,032,927 | 7/1991 | Watanabe et al. | 358/335 |
| 5,057,916 | 10/1991 | Krause et al. | 358/105 |
| 5,068,724 | 11/1991 | Krause et al. | 358/133 |
| 5,091,782 | 2/1992 | Krause et al. | 358/135 |
| 5,091,931 | 2/1992 | Milewski | 379/100 |
| 5,099,319 | 3/1992 | Esch et al. | 358/86 |
| 5,109,414 | 4/1992 | Harvey et al. | 380/9 |
| 5,119,188 | 6/1992 | McCalley et al. | 455/4.1 |
| 5,132,789 | 7/1992 | Ammon et al. | 348/7 |
| 5,132,992 | 7/1992 | Yurt et al. | 375/122 |
| 5,133,079 | 7/1993 | Ballantyne et al. | 455/4.1 |
| 5,168,353 | 12/1992 | Walker et al. | 358/86 |
| 5,182,642 | 1/1993 | Gersdorff et al. | 358/133 |
| 5,187,589 | 2/1993 | Kono et al. | 358/335 |
| 5,189,673 | 2/1993 | Burton et al. | 370/110.1 |
| 5,191,410 | 3/1993 | McCalley et al. | 348/13 |
| 5,195,086 | 3/1993 | Baumgartner et al. | 370/62 |
| 5,216,503 | 6/1993 | Paik et al. | 358/167 |
| 5,231,494 | 7/1993 | Wachob et al. | 358/146 |
| 5,235,419 | 8/1993 | Krause | 358/135 |
| 5,235,680 | 8/1993 | Bijnagte | 348/13 |
| 5,239,540 | 8/1993 | Rovira et al. | 370/77 |
| 5,241,674 | 8/1993 | Reed et al. | 395/600 |
| 5,276,866 | 1/1994 | Paolini | 348/12 |
| 5,337,199 | 4/1994 | Arai et al. | 360/8 |
| 5,371,602 | 12/1994 | Tsuboi | 358/335 |

OTHER PUBLICATIONS

AD–A174–316: "A Packet Communication Network . . .".

AD–A207–814: "Random Transform Analysis . . .".

AD–A188–293: "A Video–Rate CCD Two Dimensional . . .".

AD–A198–390: "Navy Satellite Communications . . .".

Time–Multiplexed Analog Transmission of Three Broadcast, Quality Television Channels Through One Satellite Transponder pp. 676–684. Journal on Selected Areas in Communications, IEEE, vol. SAC–5, No. 4, May 1987—Y.–S.—Kao et al.

Kaneko et al. "Digital Transmission of Broadcast Television with Reduced Bit Rate", National Telecommunications, vol. 3, 1977, Section No. 41.

Koga et al. "Statistical Analysis of NETEC–22H System Performance", Copyrigth Notice: 1979 IEEE, pp. 23.7.1–23.7.5.

Koga et al. "Statistical Performance Analysis of an Inteframe Encoder for Broadcast Television Signals", ITTT Transactions on Communications, vol. COM–29, No. 12, Dec. 1981, pp. 1868–1876.

"Digicipher™ All Digital, Channel Compatible, HDTV Broadcast System" by Woo Paik, General Instrument Corporation, IEEE Transactions on Broadcasting, vol. 36, Dec. 1990, pp. 245–254.

ISO/IEC 13818–1, MPEG–2 Recommendation H.222.0, Draft Date Jun. 10, 1994.

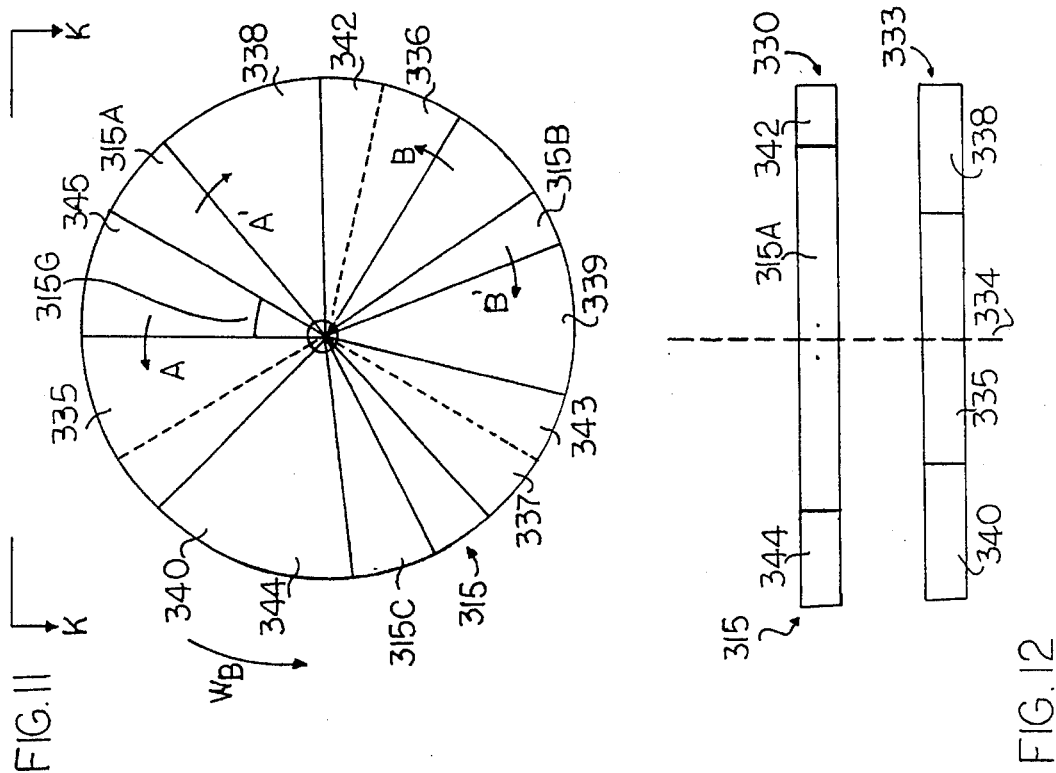
FIG. 11
FIG. 12
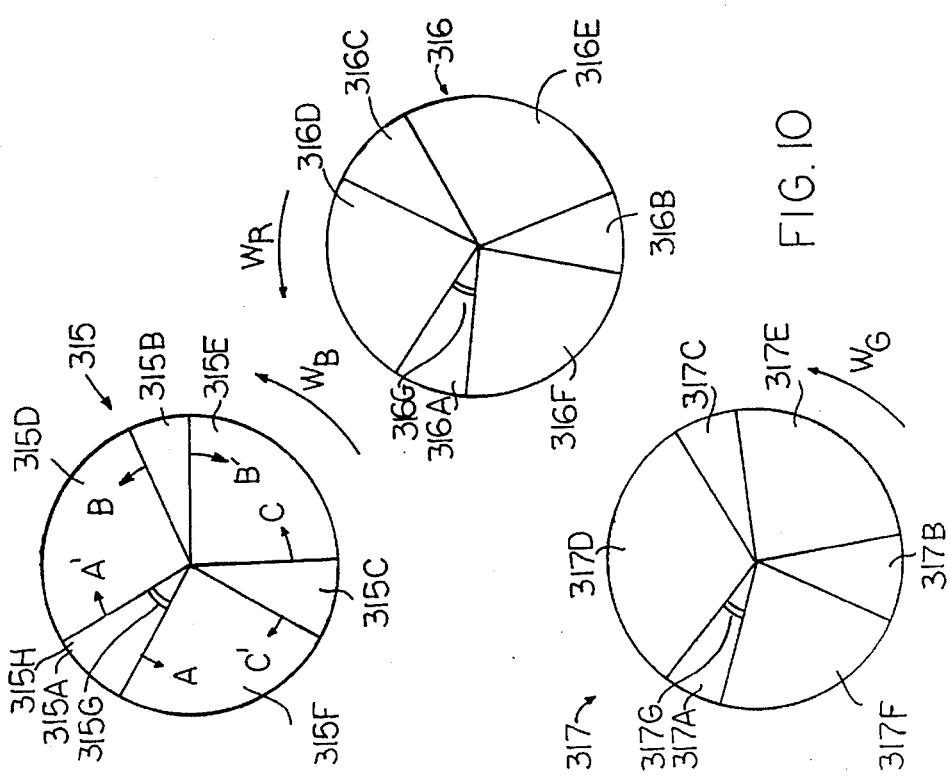
FIG. 10

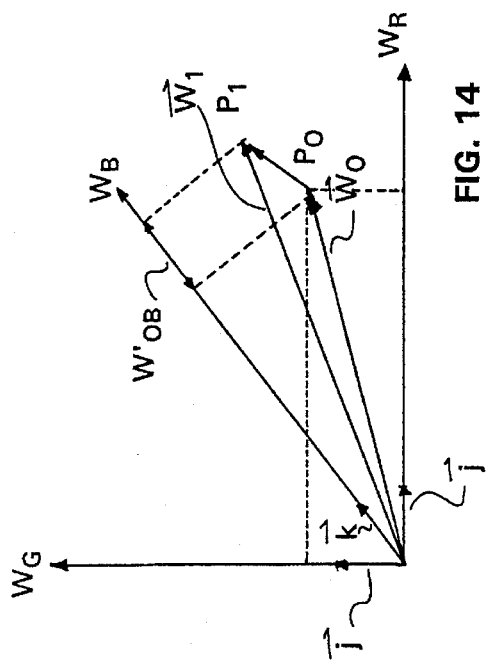
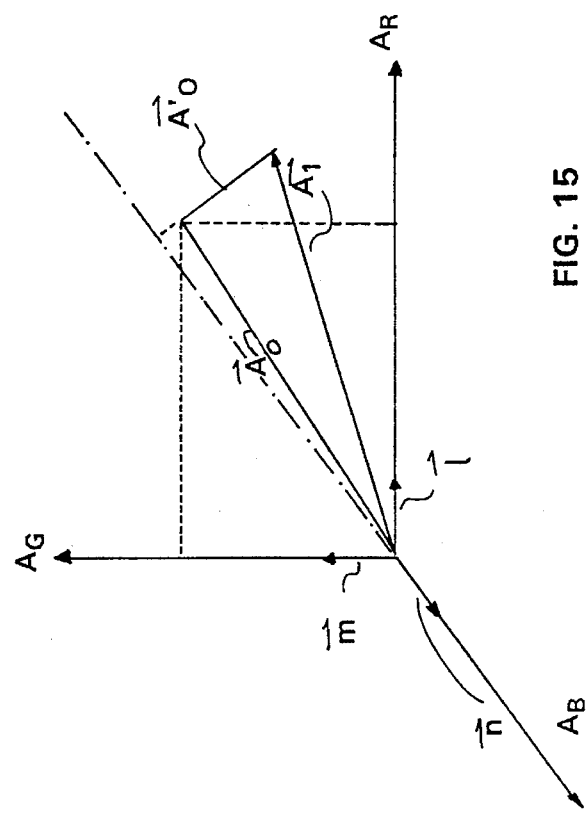
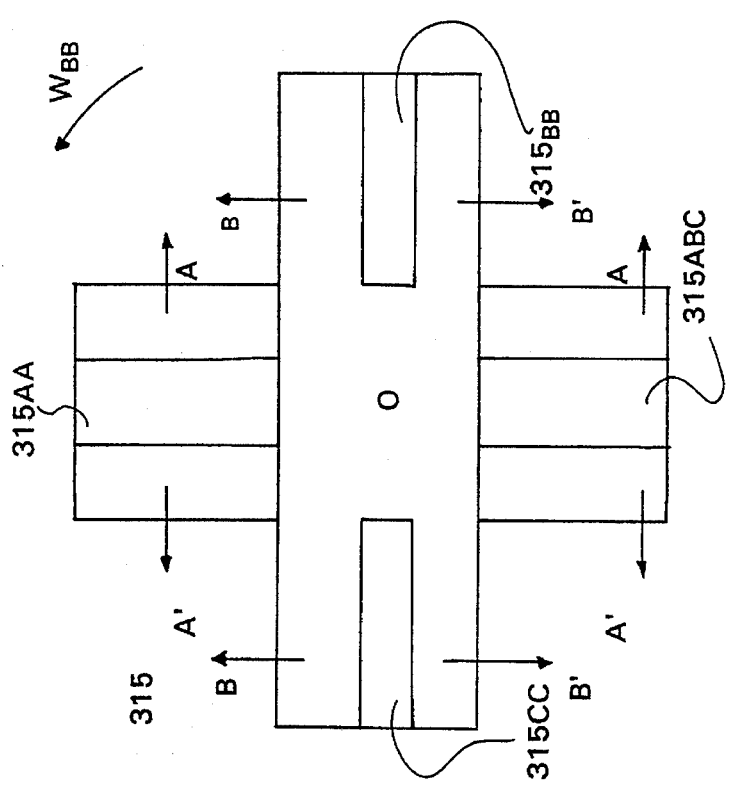
FIG. 14
FIG. 15
FIG. 13

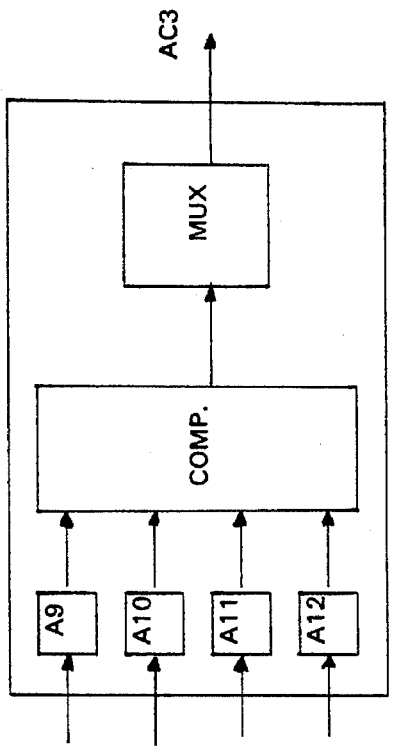
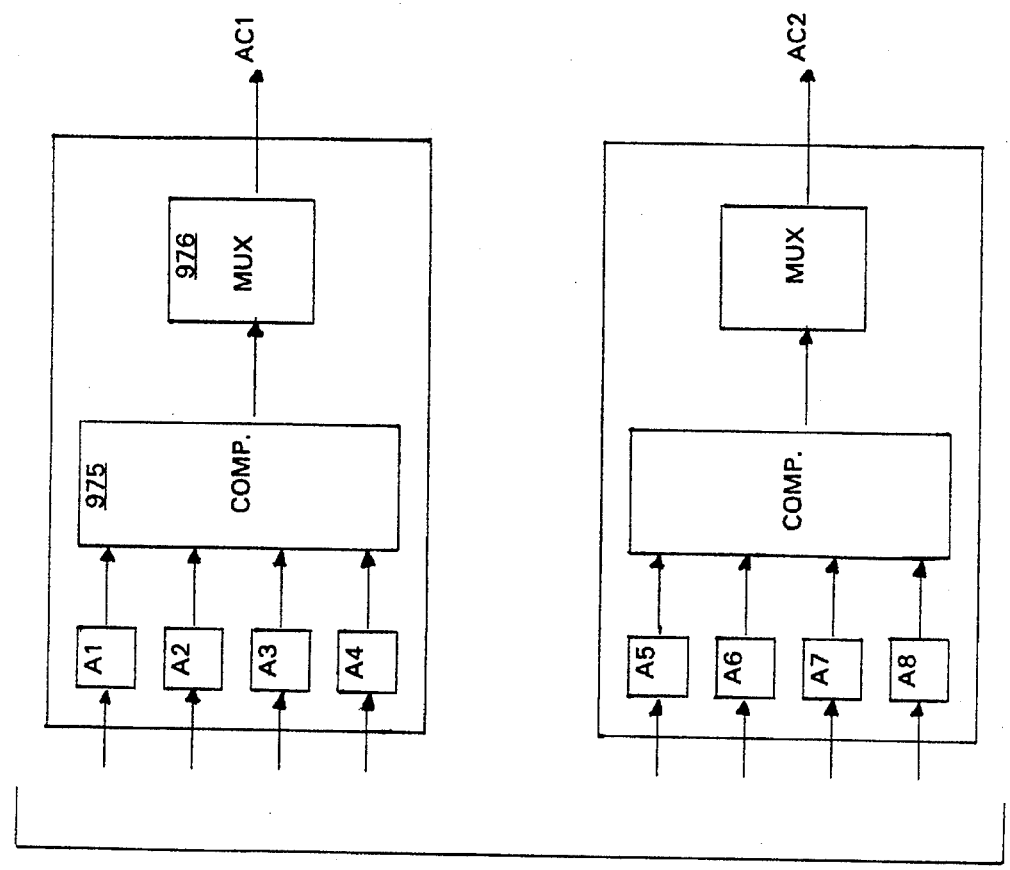
FIG. 26

| | VC | AC | | DC | | |
|---|---|---|---|---|---|---|
| | | MC1 | MC2 | MC3 | MC4 | MC5 MC6 |
| V1R | V1R — 901 | ØR2 ØR1 | ØR3 | — | ØR4 | ØR5 |
| V1G | V1G — 902 | ØG1 | ØG2 | ØG4 ØG3 | ØG5 | — |
| V1B | V1B — 903 | ØB3 ØB2 ØB1 | — | ØB4 | — | ØB5 |
| V2R | V2R — 904 | ØR3 ØR2 ØR1 | ØG4 | — | — | — |
| V2G | V2G — 905 | ØG1 ØG2 | ØG3 | — | ØG4 | — |
| V2B | V2B — 906 | ØB1 | ØB2 | ØB5 | — | — |
| V3R | V3R — 907 | ØR1 | ØR2 | — | ØR4 | — |
| V3G | V3G — 908 | ØG3 ØG2 ØG1 | — | — | — | — |
| V3B | V3B — 909 | ØB2 ØB1 | ØB3 | — | ØB4 | — |

FIG. 30

|  | CARRIER FREG | V | A | D | SUB-BAND |
|---|---|---|---|---|---|
| $V_1$ | R | 1,2 | 3 | 4,5 | 901 |
| $V_1$ | G | 1 | 2,3,4 | 5 | 902 |
| $V_1$ | B | 1,2,3 | 4 | 5 | 903 |
| $V_2$ | R | 1,2,3 | 4 | — | 904 |
| $V_2$ | G | 1,2 | 3 | 4 | 905 |
| $V_2$ | B | 1 | 2,5 | — | 906 |

FIG.38

METHOD AND APPARATUS FOR SELECTIVELY RECEIVING AND STORING A PLURALITY OF VIDEO SIGNALS

CROSS REFERENCE TO RELATED APPLICATIONS

This is a continuation-in-part of the co-pending U.S. patent application Ser. No. 07/826,372, filed on 27 Jan. 1992, which is a continuation-in-part of U.S. patent application Ser. No. 07/573,539 filed Aug. 27, 1990, which issued on Oct. 20, 1992 as U.S. Pat. No. 5,157,491, which is in turn a continuation-in-part of Ser. No. 07/457,403, filed 12/18/89 now U.S. Pat. No. 4,975,771 issued on Dec. 4, 1990, which in turn was a continuation-in-part of Ser. No. 07/308,826, filed 2/10/89, now U.S. Pat. No. 4,903,126 issued on Feb. 20, 1990; and U.S. patent application Ser. No. 07/258,722 filed Oct. 17, 1988, now abandoned.

The present application also relates to the following foreign applications: (1) Canadian patent application Serial No. 2,007,964, filed on 17 Jan. 1990; (2) Canadian patent application Serial No. 2,070,529, filed oil Jun. 4, 1992; (3) Patent Cooperation Treaty application Serial No. PCT/US89/05713, filed on Dec. 19, 1989, now abandoned; and Japanese patent application No. 5-12038, filed on Jan. 27, 1993.

TABLE OF CONTENT

The titles in the present Table of Contents have been included to provide a simplified road map for the reader. These titles are not intended to divide the specification into separate inventions or independent subject matters.

Cross Reference to Related Applications
Background of the Invention
1. Technical Field
2. Background Information.
I. Teleconferencing
II. Video Cameras
III. LCD Monitors
IV. Paperless Network
V. Program Delivery System With Digital Compression and Encoding/Decoding Scheme
VI. Multimedia and Video On Demand Systems
VII. Medical Applications
  Ultra Sound Imaging Applications
Summary of the Invention
Brief Description of the Drawings Description of the Preferred Embodiment
I. Teleconferencing
II. Video Cameras
III. LCD Monitors
IV. Paperless Network
V. Program Delivery System With Digital Compression and Encoding/Decoding Scheme:
  Processing of Video Signals
  Processing of Audio and Data signals
  VAD Mapping System
  Program Insertion Systems
  Other Applications
VI. Multimedia and Video On Demand Systems
VII. Medical Applications
  Imaging Applications
VIII. Other Applications
  Recording Media
  Data Transmission System
Claims
Abstract

BACKGROUND OF THE INVENTION

1. Technical Field

The present invention relates in general to telecommunications systems, such as cable, television, video and satellite broadcasting; printers; scanners (such as those used in photocopiers, facsimile machines and the like); recording and storage media; and like devices capable of producing a raster scan. The invention more particularly relates to efficient methods and systems for simultaneous digital compression of video, audio and/or data (VAD) signals to preselected degrees of compression, for use in military and civilian applications.

2. Background Information

I. TELECONFERENCING

Conventional television and cable television (CATV) broadcasting are generally carried out on a real-time basis. For instance, it takes the same length of time to broadcast or transmit a TV program than it does to receive and display the program. Such broadcasting method has proven to be less than completely desirable due to limited TV bandwidth and channels allocation.

Channel availability has been a crucial limitation in the broadcasting industry. Channel allocation has been very valuable and expensive. It has precluded several interested individuals, small businesses, consumers, and local community chapters from accessing the TV broadcasting networks, in order to express personal views or to advertise.

TV broadcasting has become the single most important and popular means for accessing and educating large numbers of citizens. Therefore, TV broadcasting has a direct effect on the right to free speech and expression as guaranteed by several constitutions around the world, including that of the United States of America.

Research and development has been carried out in the TV and video broadcasting field. The United States Department of Defense has sponsored several projects relating to the field of the present invention. The following Defense Technical Information Center (DTIC) technical reports exemplify some of these projects:

1. AD-A210 974, entitled "Robot Vehicle Video Image Compression."
2. AD-A191 577, entitled Narrative Compression Coding for a Channel with Errors."
3. AD-A194 681, entitled "SNAP/DDN Interface for Information Exchange."
4. AD-A174 316, entitled "A Packet Communication Network Synthesis and Analysis System."
5. AD-A206 999, entitled "Geometric Methods with Application to Robust Detection and Estimation."
6. AD-A207 814, entitled "Random Transform Analysis of a Probabilistic Method for Image Generation."
7. AD-A188 293, entitled "A Video-Rate CCD Two-Dimensional Cosine Transform Processor."
8. AD-A198 390, entitled "Navy Satellite Communications in the Hellenic Environment."

9. AD-A206 140, entitled "Investigation of Optional Compression Techniques for Dither Coding."

The following patents are incorporated by reference and teach various video broadcasting and teleconferencing techniques:

1. U.S. Pat. No. 3,693,090 to Gabriel, entitled "Wired Broadcasting Systems", and assigned to Communications Patents Limited.
2. U.S. Pat. No. 3,733,430 to Thompson et al., entitled "Channel Monitoring System", and assigned to RCA Corporation.
3. U.S. Pat. No. 4,215,369 to Ijima, entitled "Digital Transmission", and assigned to Nippon Electric of Japan.
4. U.S. Pat. No. 4,300,161 to Haskell, entitled "Time Compression Multiplexing of Video Signals", and assigned to Bell Telephone Laboratories.
5. U.S. Pat. No. 4,650,929 to Boerger et al., entitled "Communication System For Videoconferencing", and assigned to Heinrich Hertz Institute of Germany.
6. U.S. Pat. No. 4,903,126 to Kassatly, entitled "Method and Apparatus for TV Broadcasting".
7. U.S. Pat. No. 4,975,771 to Kassatly, also entitled "Method and Apparatus for TV Broadcasting".
8. U.S. Pat. No. 5,157,491 to Kassatly, entitled "Method and Apparatus for Video Broadcasting and Teleconferencing".
9. U.S. Pat. No. 4,410,980 by Takasaki, entitled "Time Division Multiplexing System", and assigned to Hitachi Limited of Japan.
10. U.S. Pat. No. 4,533,936 by Tiemann, entitled "System for Encoding and Decoding Video Signals", and assigned to General Electric Co.
11. U.S. Pat. No. 4,593,318 by Eng, entitled "Technique for the Time Compression Multiplexing of Three Television Signals", and assigned to AT&T Bell Laboratories
12. U.S. Pat. No. 4,646,135 by Eichelberger, entitled "System for Allowing Two Television Programs Simultaneously to Use the Normal Bandwidth for One Program by Chrominance Time Compression and Luminance Bandwidth Reduction", and assigned to General Electric Co.
13. U.S. Pat. No. 4,442,454 by Powell, entitled "Image Processing Method Using a Block Overlap Transformation Procedure", and assigned to Eastman Kodak.

The Boerger U.S. Pat. No. 4,650,929 patent is a representative publication of the state of the relevant art in the video teleconferencing field, and will now be described in more detail. The Boerger patent generally relates to a video-conferencing system which basically includes a central station 1 and a significantly limited number of subscribers stations 25. Boerger acknowledges the limitation of the patented system in column 3, lines 41–43, and column 7, lines 51–52, and states that it only accommodates a maximum of 12 subscribers. Furthermore, the main purpose of the central station appears to be that of an intermediary or exchange between sources and sinks, i.e. transmitting and receiving signal points". Column 3, lines 10–13.

Therefore, the Boerger system, in general, seems to connect only a very limited number of specific subscribers; collects the video and audio signals from these subscribers in the central station; and sends the collected signals back to the subscribers. These signals are sent back to the subscribers in a non-compressed format, on a real time basis.

FIG. 4, and the corresponding description of the system in the specification, column 7, lines 15–18, lines 29–33 and lines 54–62; and column 9, lines 53–58, indicate that the incoming video source signals 41 are passed through an analog-to-digital converter 9 to a large picture storage 5, and to a small picture storage 6. The video signals from the large and small picture storages 5 and 6 are then fed to multiplexers 17, 18, and therefrom, through a digital-to-analog converter 19 to the respective connecting line 36. Therefore, the video signals are converted back to analog signals prior to transmission to the participant subscribers, and as such the signals are said to be transmitted on a real-time basis, and are not compressed. Consequently, there is no need to decompress the video signals at the participant subscribers' locations 25. Column 3, lines 24–27, confirms that "[if] picture storage units and multiplexers are employed for video signals in digital form, conventional networks can be used, as before, equipped for transmitting analog signals."

The gist of the Boerger system therefore seems to be the use of conventional cameras and monitors at the participant locations, as well as "control means which can be manipulated to initiate communication with other participants and to control the images displayed." Column 2, lines 37–39. The signals 42 which are transmitted to the participant locations 25 already contain the composite mixture of large and small pictures as selected by the location 25, and consequently, the location 25 does not include means for demultiplexing and decompressing the signals.

Furthermore, while the Boerger patent mentions the use of multiplexers, it does not teach any discipline for conducting the multiplexing of the video signals. It appears that Boerger is simply equating multiplexing with mixing of signals from the large and small picture storages 5 and 6.

Additionally, the limited capability of the Boerger system renders it similar to a closed loop system, and if the maximum number of subscribers (12 subscribers) are using the system, other participants will be locked out, and will not be able to join in or to establish their own video-conferencing session. This is a significant limitation, as it renders the Boerger system generally inefficient as a public video teleconferencing system.

As a quasi-closed loop, private video conferencing system, Boerger is not concerned with, and does not address the issue of video channel availability. For all practical purposes, each one of the large and small picture signals can be assigned its own transmission bandwidth (column 3, lines 30–40), without regard to the compression requirements. This holds particularly true if the connecting lines 36 and return channels 37 are actual cable lines as opposed to television or satellite telecommunications channels.

Therefore, it would be highly desirable to have a new and improved method and system for video teleconferencing and for increasing video channel availability and for rendering the video channel allocation process more efficient. The new method and system should be relatively simple and inexpensive to implement and to place into effect. The new method and system should also be capable of being implemented with new as well as existing television or receiver sets.

II. VIDEO CAMERAS

The first generation of color studio cameras used three image orthicon tubes, which were essentially three identical monochrome camera channels with provisions for superposing the three output-signal rasters mechanically and electrically. The optical system consisted of a taking lens which was part of a four-lens assembly. The scene was imaged in the plane of a field lens using a 1.6-inch diagonal image format. The real image in the field lens was viewed by a back-to-back relay lens assembly of approximately 9 inch focal length. At the rear conjugate distance of the optical relay was placed a dichromic-prism beam splitter with color-trim filters.

In this manner, the red, blue, and green components of the screen lens were imaged on the photo-cathodes of the three image orthicon tubes. A remotely controlled iris located between the two relay-lens elements was used to adjust the exposure of the image orticons. This iris was the only control required in studio operation. These cameras are no longer in use because of their size, cost, and operating and setup requirements, compared to photoconductive cameras.

Four-tube (luminance-channel) cameras were then introduced when color receivers served a small fraction of the audience. The viewer of color program in monochrome became aware of lack of sharpness. Using a high-resolution luminance channel to provide the brightness component in conjunction with three chrominance channels for the Red (R), Green (G) and Blue (B) components produced images that were sharp and independent of registry errors.

Improvements in scanning components and circuits have eliminated the need for use of a separate luminance channel in order to obtain adequate resolution. However, for a period of time, the four-tube approach continued to be used for telelcine applications where the inclusion of an additional vidicon channel was not an appreciable cost consideration or of mechanical complexity. Nevertheless, the four-tube cameras were supplanted by the three-tube photoconductive cameras and by non-storage flying-spot and charge coupled device scanning systems.

A color television camera must produce R, G and B video signals which complement the characteristics of the NTSC three-gun three-phosphor standard additive display tube. For both live and film cameras it is now common to use a camera with three photoconductive pickup tubes with a high-efficiency dichromic light splitter to divide the optical image from a zoom lens into three images of red, blue and green, with different spectral characteristics.

Light splitting is accomplished by a prism or by a relay lens and dichromic system. The prism has the advantage of small size and high optical efficiency but a disadvantage in that the three tubes are not parallel to each other and are thus more susceptible to misregistration produced by external magnetic fields. A more serious problem is that of obtaining a uniform bias light on the face of the tubes. Bias light producing 2 to 10 percent of the signal is used in most modern cameras to reduce lag effects. Nonuniformity of the bias light can produce color shading in dark areas of the picture. Most new designs now use the prism splitter.

Therefore, it would be highly desirable to have a new video camera that does not use multiple color optical splitters, and which improves the sharpness and resolution of the image.

One of the most important criteria for determining the picture quality of a color television camera is the signal-to-noise ratio, which is measured in decibels according to the following formula:

$$dB = 20 \cdot \log[\text{peak-to-peak video voltage/rms noise voltage}].$$

Noise also plays an important role in the quality of the video signals transmitted. Several types of radio noise must be considered in any design, though, in general, one type will be the dominant factor. In broad categories, the noise can be divided into two types: noise internal to the receiving system, and noise external to the receiving antenna.

The noise of the receiving system is often the controlling noise in systems operating above 100 MHz. This type of noise is due to antenna losses, transmission-line losses, and the circuit noise of the receiver itself.

Several costly designs, using elaborate mathematical equations, have been devised to reduce the noise factor and to improve the signal-to-noise ratio. However, low-cost circuit designs still include a relatively low signal-to-noise ratio, for cost effectiveness.

Therefore, it would be desirable to have a new circuit design and method for improving signal-to-noise ratio in video broadcasting systems, and particularly in low cost video cameras and broadcasting systems.

III. LCD MONITORS

Liquid crystal display (LCD) monitors have become increasingly popular in the television and computer industries. In general, a conventional LCD monitor includes a single rigid screen which permits the display of either video signals or computer generated signals. The following patents, are incorporated by reference, and illustrates some exemplary conventional liquid crystal display devices and methods of manufacturing the same:

1. U.S. Pat. No. 4,874,227 issued to Matsukawa et al. describes a large-size crystal display which is used as a large picture display for a sign or advertisement at railway stations, airports or for projection at halls or theaters. Matsukawa teaches the use of a single unitary rigid large size display of fixed dimensions and size.

2. U.S. Pat. No. 4,806,922 issued to McLaughlin et al. generally describes a large size LCD having several nematic curvilinearly aligned phases (NCAP) liquid crystal material. The modules are positioned adjacent to one another to effect a single display having a relatively large area.

3. U.S. Pat. No. 4,824,215 issued to Joseph et al. discloses a large liquid crystal display electronic sign which employs several modules that are juxtaposed adjacent to one another on a transparent diffuser plate and conducive liquid crystal coating layer between the plates.

4. U.S. Pat. No. 4,832,457 to Saitoh et al., assigned to Hitashi Limited of Japan, and entitled Multipanel Liquid Crystal Display Device", relates to a method of manufacturing the LCD, by combining two or four LCD panels to increase the displayable area.

Liquid crystals are also defined in several publications, among which is the "Electronics Engineers' Handbook", Third Edition, McGraw Hill Publications, page 6–36, where a general brief explanation of the use of liquid crystal displays in television, is given at page 20–120.

However, conventional liquid crystal monitors still include a single screen which does not enable the user to select the desired sizes and shapes of the screen. The size and weight of a LCD monitor are important features for the LCD to compete with other displays, and printed publications such as newspapers. For this purpose, the monitor should be small in size and light in weight. Additionally, conventional displays, including lap top computers, are generally inconvenient to transport, since the screen is a single rigid screen which commonly folds over the keyboard.

Furthermore, conventional displays do not generally address the growing elderly and disabled populace, who would be very inconvenienced by the fixed size of the conventional display monitors. At present, these monitors do not enable this group of people to accommodate the displayed material to their own personal needs. In some instances, an elderly person might wish to read a newspaper, but is prevented from doing so because of that person's inability to read small print characters, and to hold and flip through the relatively heavy newspaper.

Therefore, it would be desirable to have a display monitor which uses liquid crystal material, and which could be sized and dimensioned by the user according to the user's particular needs.

IV. PAPERLESS NETWORK

At present, information is widely spread and distributed by means of publications such as newspapers, books and magazines. Generally, publications are distributed individually to subscribers in a relatively cumbersome, costly and inefficient way. Furthermore, the reader or subscriber usually finds it bulky, cumbersome and inconvenient to carry or transport the printed publication for reading or reviewing it at a later time.

Printed publications can be relatively heavy, and can contain information that is not of particular interest to the reader. Additionally, there is a private and public concern with respect to the manner of disposing of the printed publications once they have been read, and are no longer of use. This constitutes substantial waste of resources, which has instigated attempts to recycle and reuse the paper. Nonetheless, the recycling process does not solve all the foregoing problems.

Some methods have been designed to substitute for the paper dissemination of information, among which are computers, audio and video cassettes, floppy disks and like electronic storage devices. However, there has been no paperless device or method which substitutes entirely for the paper dissemination of information.

Therefore, there is a substantial need for a new and improved paperless network and method of using the same for disseminating information. The new network and method of using it should substantially reduce or substitute for the use of paper, thus reducing the cost of distribution and waste. The new network should render the transfer, transport, storage and review of published information convenient, and should permit a wasteless disposition thereof.

U.S. Pat. No. 4,597,058, issued to Izumi et al., and U.S. Pat. No. 4,654,799, issued to Ogaki et al., both of which are incorporated by reference, describe software vending machines, it being understood that "software" includes machine readable codes to the exclusion of "human readable" or printed publications.

Software vending machines address distinctly different problems than printed publications. The Izumi vending machine is provides for a cartridge programming system and method for storing a library of programs and for loading a selected program or set of programs onto reprogrammable cartridge memories.

Other objects of the Izumi vending machine are to provide a method of maintaining a program library without requiring a large inventory of memory cartridges; and to provide a system for programming a cartridge memory without removing the semiconductor memory chip from the cartridge.

However, conventional software and other publications vending machines do not yet present an acceptable alternative to printed publications, which deal with different problems, among which are: (1) Inefficient and wasteful distribution of printed publications; (2) Indirect restraint on the United States constitutional freedom of speech; (3) Waste of natural resources; and (4) Environmental concerns.

With the foreseeable depletion of natural resources, such as timber, paper publications will become increasingly expensive to produce. This will eventually force the conventional printing industry to select alternate less expensive routes. After printing, the conventional paper publications are conventionally transported, stored, and distributed at an enormous and wasteful overhead, cost and labor.

Nowadays, small businesses and individuals find it quite prohibitive to advertise and/or to express their views in conventional publications, such as newspapers. As the cost of printed publications rises with the continuing decrease of natural resources, it will become even more forbidding for individuals and small businesses to retain, even the limited access to printed publications, they now enjoy. This problem will become a major concern in the near future, as it will very subtly become an indirect restraint on the constitutional freedom of speech.

Enormous waste of natural resources are presently generated by the use of conventional paper publications. For instance, it is highly unlikely that the subscribers read each and every line or page of their daily newspapers or weekly journals. Despite the huge waste of natural resources, conventional publications methods are still being used to publish newspapers which are not even read in their entirety.

Consider also the environmental issues relating to the waste generated by the conventional paper publications. Recycling is becoming increasingly popular in industrialized countries such as the United States, and other countries are following suit. Recycling bins dedicated to paper are sprouting nationwide, and dumping sites are filling up and becoming harder to locate due to increasing social and environmental pressures.

Therefore, it would be highly desirable to have a new system which will ultimately substitute for the conventional printed publications, and which will render the distribution and dissemination of information efficient and economical, and as such, more accessible to the members of the general public. The new system should eliminate or substantially reduce the current impermissible waste of natural resources which are depleted by the conventional publication industry.

V. PROGRAM DELIVERY SYSTEM WITH DIGITAL COMPRESSION AND ENCODING/DECODING SCHEME, AND PROGRAM INSERTION SYSTEMS

Methods for digitizing and compressing video signals are well known. The following patents, are incorporated by reference and teach various conventional video digitization and compressing techniques:

1. U.S. Pat. No. 3,740,466 to Marshall et al., entitled "Surveillance System", relates to a system for maintaining surveillance for detecting changes of interest in the surveilled domain and ignoring other changes. The system employs an analog to digital converter 50 for converting the analog television input signals into a digital format which is stored in the computer memory.

2. U.S. Pat. No. 3,883,685 to Yumde et al., entitled "Picture Signal Conversion System", and assigned to Hitachi Limited of Japan, relates to a system for converting an analog signal of a wide band into a pulse train signal of a narrow band. The input picture signal is converted into a digital signal and is successively written in the digital memory. When the picture signal of one frame is written in to fill up the digital memory, a write-in end pulse signal is generated by a clock pulse signal generator.

3. U.S. Pat. No. 3,883,686 to Jacobacus et al., entitled "Method to Reduce the Effect of a Loss of Information during the Transmission Compressed Band Width and Device for Carrying out the Method" and assigned to T. L. M Ericsson of Sweden, generally relates to a technique for reducing the effect of loss of information during transmission at compressed bandwidth of a PCM-signal. A PCM coder converts the analog video signal to a PCM signal such that the picture elements in the video signal will be the equivalent to PCM words having binary values which are equivalent to respective light intensities of the picture elements.

4. U.S. Pat. No. 4,075,658 to de Cosnac et al,. entitled "Method and Device for Isolating Figures in an image", and assigned to Commissariat a L'Energie Atomique of France, relates to a method for converting the graphic information in the image to a video signal constituted by a succession of lines, each being sampled sequentially to obtain an ordered series of points which is stored in memory.

5. U.S. Pat. No. 4,079,417 to Scudder, entitled "Digital Video Window Control", and assigned to General Electric Company, relates to a digital signal processor which is connected between a refresh memory at the output of a digital computer in an x-ray tomography, and the digital to analog converter of a CRT display to provide a limited resolution gray scale display of a selected portion from an image signal having wide dynamic range.

6. U.S. Pat. No. 4,095,259 to Sawagata, entitled "Video Signal Converting System Having Quantization Noise Reduction", and assigned to Sony Corporation of Japan, relates to a system for converting a video signal into a digitized signal, and for clamping the levels at every horizontal synchronizing interval. The levels are randomly shifted before conversion, whereby quantization noise can be scattered on a displayed image by reclamping after a reconversion of the signal.

7. U.S. Pat. No. 4,124,871 to Morrin II, entitled "Image Data Resolution Change and Apparatus and Process Utilizing Boundary Compression Coding of Objects", and assigned to IBM Corporation, relates to a method for using the information obtained in the boundary following exterior and interior borders of objects, to accomplish resolution or size changing of scanned objects.

8. U.S. Pat. No. 4,127,873 to Katagi, entitled "Image Resolution Enhancement and Apparatus", and assigned to RCA Corporation, generally relates to the display of a frame of information in the form of a row and column matrix of display elements. The matrix is created from a corresponding group of data cells stored functionally in the form of a row and column, where the number of rows and columns in the stored matrix is less than the number of rows and columns in the displayed matrix.

9. U.S. Pat. No. 4,143,401 to Coviello, entitled "System For Generating Line Drawing of a Scanned Image", and assigned to Westinghouse Electric, generally relates to scanners for detecting changes in the gray scale of a scanned image to generate line drawing corresponding to changes in the gray scale image. Each line of video information produced by scanning the image is digitized. Each digitized sample is compared to digital samples delayed a predetermined amount to generate a difference signal which is indicative of a change in the gray scale having a component perpendicular to the direction of the scan.

10. U.S. Pat. No. 4,148,070 to Taylor, entitled "Video Processing System", and assigned to Micro Consultants of England, generally relates to the manipulation of pictures by digital methods in diverse fields. A digital frame store receives and stores digital video signals. A digital to analog converter converts the data back into analog form, and accessing means provides random access to the frame store locations during the video blanking time to allow processing of the data.

11. U.S. Pat. No. 4,183,058 to Taylor, entitled "Video Store", and assigned to Micro Consultants of England, generally relates to video digital storage systems. The store may be operated in an asynchronous manner.

12. U.S. Pat. No. 4,189,744 to Stern, entitled "Apparatus for Generating Signals Representing Operator selected Portions of a Scene", and assigned to New York Institute of Technology, generally relates to an apparatus for generating video-representable signals which represent one or more operator-selected portions of a scene. The apparatus includes means for displaying the tabulation of the pixel values, and an operator can select desired portions of an existing scene and automatically obtain stored contour outlines of those portions.

13. U.S. Pat. No. 4,193,096 to Stoffel, entitled "Half Tone Encoder/Decoder", and assigned to Xerox Corporation, generally relates to a system for compressing scanned image data. The system subdivides the image data pixel pattern into quadrants encodes pictorial data, by predicting form the established image values of adjoining quadrants, an image value for each quadrant.

14. U.S. Pat. No. 4,242,707 to Budai, entitled "Digital Scene Store", generally relates to a method for raster scanning a scene. During each scan, an analog signal derived from a binary number and representing a given light intensity is compared against other analog signals representing the light intensity of each of the pixels When the light intensity of a pixel is greater than the given light intensity, the binary number associated with that given light intensity is stored in registers assigned to the respective pixels. After each scan, the given light intensity is increased.

15. U.S. Pat. No. 4,282,546 to Reitmeier, entitled "Television Image Size Altering Apparatus", and assigned to RCA Corporation, generally relates to a method for separating composite pixel information into original pixels relating to each basic component of the video signal. Interpolated pixel values are then derived from the original pixel values at an effective rate less than the synchronous rate when compressing the image size, and at an effective rate greater than the synchronous rate when expanding the image size.

16. U.S. Pat. No. 4,302,776 to Taylor et al., entitled "Digital Still Picture Storage System with Size Change Facility", and assigned to Micro Consultants of England, generally relates to a method for digital picture processing suitable for use in a digital picture library. The system includes real time frame storage and a non-real time store. The size change mechanism has access to the data in the non-real time domain to allow size change techniques to be used.

17. U.S. Pat. No. 4,365,273 to Yamada et al., entitled "Picture Data Compression Method", and assigned to Dainippon Screen Seiko Kabushiki Kaisha of Japan generally relates to a method for compressing picture data where an original picture is scanned photoelectrically to obtain analog picture signals which are converted into picture data to be transmitted. Each matrix of picture data is compared with an adjacent picture data in horizontal, vertical, right upper diagonal and left upper diagonal directions to obtain comparisons results.

18. U.S. Pat. No. 4,369,463 to Anastassiou, entitled "Gray Scale Image Data Compression with Code Words a Function of Image History", and assigned to IBM Corporation, generally relates to a method for generating a minimum length code word stream for efficient transmission or storage of two dimensional gray scale image data utilizing the concepts of adaptive differential pulse code modulation (PCM).

19. U.S. Pat. No. 4,417,276 to Bennett et al., entitled "Video to Digital Converter", generally relates to a method for converting video signals to digital values and for storing these values in memory. Successive images are continuously digitized and adjacent picture elements are compressed to produce a spacially compressed image which takes up less memory space.

20. U.S. Pat. No. 4,874,227 to Matsukawa et al.
21. U.S. Pat. No. 4,410,980 to Takasaki.
22. U.S. Pat. No. 3,740,466 to Marshall et al.
23. U.S. Pat. No. 3,883,685 to Yumde.
24. U.S. Pat. No. 3,883,686 to Jacobus et al.
25. U.S. Pat. No. 4,075,658 to De Cosnac et al.
26. U.S. Pat. No. 4,079,417 to Scudder.
27. U.S. Pat. No. 4,095,259 to Sawagata.
28. U.S. Pat. No. 4,124,871 to Morrin
29. U.S. Pat. No. 4,127,873 to Katagi.
30. U.S. Pat. No. 4,143,401 to Coviello.
31. U.S. Pat. No. 4,148,070 to Taylor.
32. U.S. Pat. No. 4,183,058 to Taylor.
33. U.S. Pat. No. 4,189,744 to Stern.
34. U.S. Pat. No. 4,193,096 to Stoffel.
35. U.S. Pat. No. 4,242,707 to Budai.
36. U.S. Pat. No. 4,282,546 to Reitmeir.
37. U.S. Pat. No. 4,302,776 to Taylor.
38. U.S. Pat. No. 4,365,273 to Yamada et al.
39. U.S. Pat. No. 4,369,463 to Anastassiou.
40. U.S. Pat. No. 4,417,276 to Bennett et al.
41. U.S. Pat. No. 4,694,490, to Harvey et al. generally discloses a signal processing apparatus and method for automatically controlling programming transmission on television and radio equipment and monitoring the transmitted programming.
42. U.S. Pat. No. 4,704,725, to Harvey et al. is a continuation of the above U.S. Pat. No. 4,694,490, also to Harvey et al., and generally relates to a similar subject matter.
43. U.S. Pat. No. 4,965,825, to Harvey et al. is a continuation-in-part of the above U.S. Pat. No. 4,704,725 to Harvey et al., and generally relates to a system of programming communication for use on individual computer systems with capacity for generating relevant user specific information simultaneously at each station of a plurality of subscriber stations.
44. U.S. Pat. No. 5,109,414, to Harvey et al. is a continuation of the above U.S. Pat. No. 4,965,825 to Harvey et al., and generally relates to similar subject matter.
45. U.S. Pat. No. 5,132,992, to Yurt et al. generally discloses a system for distributing video and audio information which uses data compression. This patent refers to the following four patents (46–49) in its "Background" section.
46. U.S. Pat. No. 4,506,387, to Walter, which is described, in column 1, lines 18–29 of the above U.S. Pat. No. 5,132,992 patent, to disclose a fully dedicated, multi-conductor, optical cable system that is wired to the viewer's premises.
47. U.S. Pat. No. 4,890,320, to Monslow, which is described in column 1, lines 30–38 of the above U.S. Pat. No. 5,132,992 patent, to disclose a system which broadcasts viewer selected material to a viewer at a prescribed time.
48. U.S. Pat. No. 4,590,516, to Abraham, which is described in column 1, lines 39–47 of the above U.S. Pat. No. 5,132,992 patent, to disclose a system that discloses a dedicated signal path, rather than multiple common carriers, to transmit audio/video programming.
49. U.S. Pat. No. 4,963,995, to Lang, which is described in column 1, lines 47–56 of the above U.S. Pat. No. 5,132,992 patent, to disclose an audio/video transceiver with the capability of editing and/or copying from one video tape to another using only a single tape deck.
50. U.S. Pat. No. 4,814,883, to Perine et al. generally discloses a commercial insertion system which includes a control center having a source of commercial inserts and a processor for generating various command signals based upon monitoring a plurality of programmed channels signals on a per channel basis.
51. U.S. Pat. No. 5,099,319, to Esch et al. generally discloses an apparatus having a central site and a remote site for customizing advertising for television using a video signal comprising a communication channel, and video and communications processors. The video processor mixes the first content data signal with the video signal. A cue processor generates insertion signals.

While the video digitization and compression techniques disclosed in the foregoing patents have proven to be adequate for their intended purposes, there is no completely adequate teaching of a Program Delivery System (PDS) which is capable of simultaneously delivering multiple signals from different origins or sources, such as video, audio and/or data (VAD). The PDS should also allow program suppliers to provide multiple programs per transponder channel, such as a satellite transponder channel, to cable, television or other systems headends or end users. One application for the PDS should be to provide multiple video outputs with multiple audio channels and VBI text signals for each video output. Another application of the PDS should be to provide various degrees of compression for different combinations of video, audio and/or data (VAD) signals.

Therefore, it would be desirable to have a new Program Delivery System (PDS) which will be compatible with digital or analog compression distribution requirements of cable, television and satellite systems.

The Esch et al. U.S. Pat. No. 5,099,319 generally describes a video information delivery apparatus for customizing advertising for television. As exemplified by claim 2, the apparatus includes a studio processor and storage, for generating and storing content data signals. A schedule-processor is responsive to the content data signals for generating a schedule data signal. A network processor generates ac communications data signal, and a transmitter transmits the communications signal. A control processor coordinates the operation of the studio-processor, schedule-processor and network processor.

The Perine et al. U.S. Pat. No. 4,814,883 generally describes a multiple input/output video switch for commercial insertion system. This system is exemplified by claim 1, and selects one video composite signal from a group of a programmed channel signal, a commercial insert video group and a local video signal. It further includes a video switch for receiving the three video inputs, for applying the same at a video output based upon the receipt of a first, second and third switch commands, from a telecommunications network, at a control input of the video switch.

The Harvey et al. U.S. Pat. Nos. 4,694,490 and 4,704,725 generally describe signal processing apparatus and methods for automatically controlling programming transmissions and presentations on television and radio equipment. As exemplified by claim 1, the method of communication of U.S. Pat. No. 4,694,490, includes the steps of transmitting a video signal containing a television program signal to receivers; and transmitting an instruct-to-overlay signal to the receiver stations at a time when the corresponding overlay is not being displayed. The video signals are received at the receiver stations, and the program material is displayed on the video receivers. The presence of the instruct-to-overlay signal is detected at the receiver stations, and the instruct-to-overly signal is coupled to the computers. These computers are caused to generate and transmit their overlay signals to their associated television receivers in response to the instruct-to overlay signal, for presenting a display, such that the overlays that are displayed at the receiver stations are different with each display being specific to a specific user.

As exemplified by claim 3, the method of communicating data of U.S. Pat. No. 4,704,725, includes the steps of transmitting an instruct-to-overlay signal to computers when the corresponding user specific information is not being transmitted to an output device. The presence of the instruct-to-overlay signal is detected at the receiver stations, and the instruct-to-overly signal is coupled to the computers. These computers are caused to generate and transmit their user specific signals to their associated output devices in response to the instruct-to overlay signal, for transmitting an output signal comprising the data and the related user specific signals, such that the output signals at the output devices are different with each display being specific to a specific user.

The Harvey et al. U.S. Pat. Nos. 4,965,825 and 5,109,414, the latter with a filing date of Sep. 25, 1990, generally relate to a unified system of programming communications for use on individual computer system with capacity for generating relevant user specific information simultaneously at each station of a plurality of subscriber stations. U.S. Pat. No. 4,965,825 is exemplified by claims 14 and 24. Claim 14 relates to the method including the steps of receiving a carrier transmission; and demodulating the carrier transmission to detect an information transmission thereon. Embedded signals are detected and identified on the information transmission; and the embedded signals are passed and controlled based on instructions identified within the embedded signals. The receipt and passing of the embedded signals are recorded.

Claim 24 describes a method for generating computer output, which includes the steps of transmitting an instruct-to-generate signal to the computers when the corresponding user specific information does not exist. These computers are caused to generate and transmit their user specific output information content in response to the instruct-to-generate signal, for transmitting an output signal comprising the user specific information content, and the user specific signal of the associate computer, such that the output signals at the output devices are different with each display being specific to a specific user.

U.S. Pat. No. 5,109,414 is exemplified by claims 1 and 18 through 26, and relates to an automation system for local broadcast stations and cable TV headends, for handling spot commercials, and for inserting them locally in ad supported television networks; and to the automatic operation of local recorders/players and switching systems (claims 25 and 26). The patent also describes an automation system for computer networks and server nodes in recording and routing data packets and inputting them to processors (claims 18, 19, 23 and 24). It also relates to the feature of automation of multimedia and multiple media presentations at receiver stations (claims 18 through 26).

VI. MULTIMEDIA AND VIDEO ON DEMAND SYSTEMS

The signals that fill today's broadcasting systems are analog signals, in that they are time and amplitude-continuous. In other words, the amplitude of the signals proportionally creates the display on the screen, or the sound from the loudspeakers. Consequently, in order to deliver high quality service to the users, the broadcasting systems should includes as little disturbances as possible.

By contrast, digital signals are not continuous. They are time and amplitude-discrete. That is, they are signals that are created so that they exist only at certain values, at evenly spaced instants in time. Each value represents a digit. Consequently, the determining factor in video and sound quality will mainly depend upon the method with which the digital signal is created at the source of origin.

With the advent of computers, it would be desirable to combine the digital signal processing and computer technologies to provide a uniform, simplified and multipurpose use, such as in video-on-demand (VOD) and multimedia systems.

Video on Demand or VOD, is a service which is similar in terms of user control to Video Tape Recorder (VTR) playback of rental programs, and further includes additional services, such as educational and other interactive programming. The VOD concept generally requires an extensive video programming source or library, and a distribution network to transport the subscriber-selected material to the home or office.

It would be desirable to have a library programming that is capable of digital storage in a compressed form. High-capacity storage is therefore of key importance to the deployment of the VOD.

Converging Technologies make it possible to access a great deal of information through the use of a single system or the integration of a number of systems, generally referred to as multimedia. Mass storage in a compressed mode will have a significant impact of the digital video component of multimedia in term of increasing the system's digital capacity.

Conventional digital storage technologies include video tapes, such as VHS tapes; magnetic reel-to-reel tapes; digital audio tapes (DAT); magnetic disks; write-once read-many (WORM) optical disks; and erasable/rewritable optical disks. It would be desirable that the present VAD system be compatible and usable with most, if not all of these conventional storage media.

The above listed Yurt U.S. Pat. No. 5,132,992 patent has a filing date of Jan. 7, 1991, and generally describes a system of distributing video and/or audio information which employs digital signal processing to achieve high rates of data compression. The compressed and encoded audio and/ or video information is sent over standard telephone, cable or satellite broadcast channels to a receiver specified by a subscriber of the service, preferably in less than real time, for later playback, and optional recording on standard audio and/or video tape.

The Yurt patent addresses the problem of remote access of audio/video material, and describes a transceiver system for providing information to remote locations. This system includes a source material library, and an encoder for retrieving the information from the library and for assigning a unique identification code to the retrieved information. A converter formats the retrieved information, and an ordering means places the formatted data in a sequence of addressable blocks. A compressing means compresses the formatted and sequenced data, and a compressed data storage stores as a file, the compressed data. A transmitter sends at least a portion of a specific file to a specific remote location.

The Yurt patent also describes a distribution method responsive to requests identifying information to be sent from a transmission system to a remote location. The distribution method includes the steps audio and video information in a compressed data form; requesting transmission, by a user, of at least a part of the stored compressed information to the remote location; sending at least a portion of the stored compressed information to the remote location; receiving the sent information at the remote location; buffering the processed information at the remote location; and playing back the buffered information in real time at a time requested by the user.

VII. MEDICAL APPLICATIONS

Ultra-Sound Imaging Applications

One illustrative example of the conventional ultrasound diagnostic apparatus is generally described in the U.S. Pat. No. 4,612,937 issued to Miller and Assigned to Siemens Medical Laboratories, Inc., and which is incorporated herein by reference. The patented apparatus displays two-dimensional blood flow information, superimposed over anatomical information. A transducer generates a series of ultrasound bursts which are directed towards the area of the body where blood flow and anatomical information are desired. The bursts are transmitted in several beam directions so as to form a sector scan.

A detector circuit receives the reflected ultrasound signals and produces a frequency difference signal which corresponds to the difference in frequency between the transmitted and reflected ultrasound, such difference being attributable to the Doppler shift produced by moving blood cells. The apparatus uses higher frequencies to achieve greater resolution, and lower frequencies to achieve greater penetration. The apparatus uses ultrasound signals of about 3 MHz in frequency. The apparatus also uses a series of pattern array transducers or piezoelectric transducers, phased array pulsers and delay circuits in order to provide a standard sector scan image. Wherefore, it would be desirable to have a new alternative for the conventional ultra-sound imaging technology for use in medical applications, which By using the prevent invention, it is now possible to achieve greater control over the penetration and resolution of the ultrasound signals.

SUMMARY OF THE INVENTION

Therefore, it is an object of the present invention to address the above concerns, and to provide adequate solutions thereto.

The present invention will enable the uniform handling of these video, audio and data (VAD) signals, by using a single carrier frequency. In other terms, the VAD system, as it will be referred to, of the present invention, will treat the video signals in a generally similar manner to the data and audio signals, and vice versa. The VAD system also provides digital compression and multiple programs for use in multimedia and video-on-demand (VOD) systems.

Television has been recognized as a most powerful mass medium for communicating ideas. Despite the technical complexity of television broadcasting, television still remains "user friendly", in that it is easy for subscribers to use. It is a main purpose of the present invention, to provide improvement to the signal processing technology, while preserving this user friendliness feature.

Computer processing is not generally a mass medium, and is far less user friendly than television. Today's multimedia technology aims at combining the capacity of broadcast communications media to convey ideas with the capacity of computers to process and output specific information.

Video tape recording and storage is yet another technology that is being considered for integration within the multimedia concept. Video tape recording have the capacity for automatic delayed recording of television transmission on the basis of instructions that are input manually by viewers. The present invention aims at integrating television broadcasting, computer processing, video recording and storage, under the control of the users.

The foregoing objects are achieved by the new video receiving method and apparatus. The receiving method is responsive to requests from a selector unit (240), for identifying channels (1 through n), in a transmitter system (204), containing video signals to be sent from the transmitter system (204) to one or more receiver systems (202). The receiving method includes steps of having the receiver system (202) select (94) one or more channels.

The receiver system generates (90) signals identificative of the selected channels, and sends (29) the channel identifying signals to the transmitter system (204). The transmitter system uses the channel identifying signals to selectively identify the channels to be transmitted to the receiver system (202). The transmitter system compresses (17, 19, 21) and multiplexes (25) the signals of the channels selected by the receiver system (202). The receiver system (202) receives (75) the compressed and multiplexed signals, and stores (35, 37, 39) the received signals.

BRIEF DESCRIPTION OF THE DRAWINGS

The above and other features of the present invention and the manner of attaining them, will become apparent, and the invention itself will be best understood, by reference to the following description and the accompanying drawings, wherein:

FIG. 10 is a top plan view of three lens systems R, G and B used in the optical system of FIG. 9;

FIG. 11 is an enlarged, more detailed top plan view of one lens system of FIG. 10;

FIG. 12 is an enlarged side view of the lens system of FIG. 11, taken along line K—K;

FIG. 13 illustrates another embodiment of the lens system of FIG. 11;

FIG. 14 is a three-dimensional coordinates system and a vectorial representation of a three dimensional frequency color spectrum according to the present invention, for use in the optical system of FIG. 9;

FIG. 15 is another three-dimensional coordinates system and a vectorial representation of a three amplitude dimensional color spectrum according to the present invention, for use in the optical system of FIG. 9;

FIG. 26 provides details, in a block diagram form, of three audio channels $AC_1$, $AC_2$ and $AC_3$ in the ground station $GS_1$ of FIG. 25;

FIG. 30 illustrates a plurality of marker channels for the video, audio and data (VAD) channels in the ground station $GS_1$, showing the audio and data signals being modulated at selected video frequencies;

FIG. 38 is a tabular representation of the record provided by the VAD mapping system of FIG. 37;

FIGS. 48 through 52C illustrate a data transmission system according to the present invention, wherein:

FIG. 48 is a high level block diagram of the data transmission system comprising a transmitter and a receiver;

FIG. 49 is a more detailed block diagram of the transmitter of FIG. 48;

FIG. 50 is a more detailed block diagram of a transform circuit used in the receiver of FIG. 48;

FIG. 51 is a more detailed block diagram of the receiver shown in FIG. 48; and

FIGS. 52A through 52C represent a flow chart of software program used in the receiver of FIG. 48.

DESCRIPTION OF THE PREFERRED EMBODIMENT

Figure 1:
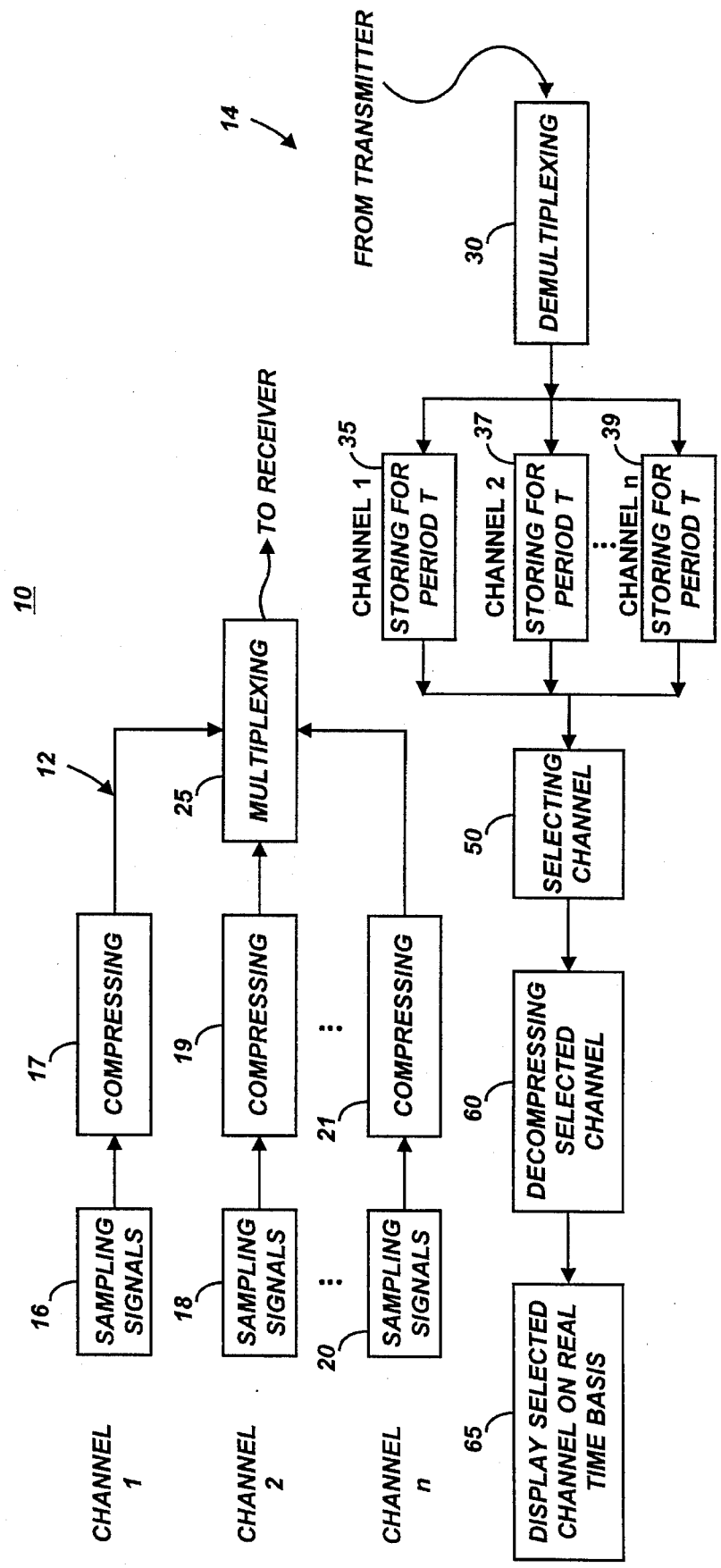
FIG. 1 is a block diagram of a method for broadcasting video signals according to the present invention.

Referring now to the drawings, and more particularly to FIG. 1 thereof, there is illustrated a flow chart of a method 10 for broadcasting and receiving TV or video signals according to the present invention. The method 10 generally comprises a process 12 for processing signals to be transmitted, and a reception process 14 for processing the received signals.

In conventional television or video broadcasting systems, the channels 1 through n are received and then displayed on a real time basis as corresponding channels 1 through n. These channels generally occupy the entire bandwidth at the receiver end. Thus, the channel availability in conventional broadcasting systems is severely limited by the allocated TV bandwidth. This bandwidth is generally pre-assigned, and thus not expandable. Since each one of the received channels also generally has a fixed bandwidth, the number of channels cannot be increased.

Therefore, the present broadcasting method 10 (FIG. 1) and system 200 (FIG. 3) offer a valuable advantage over the conventional methods and systems, in that the present method and system enable the accommodation of a significantly larger number of channels in the limited TV or video bandwidth of the receiver, and enable the broadcasting of an increased number of channels over the existing video bandwidth.

The transmission process 12 generally includes multiplexing signals from a plurality of channels 1 through n, prior to transmission. The multiplexed signals are then transmitted over a single base carrier frequency. The channels 1 through n generally occupy the entire allocated television or video bandwidth.

The reception process 14 generally includes the steps of demultiplexing the transmitted signals, storing the received signals for a predetermined period of time T, and then displaying only the selected channel, on a screen, such as a conventional monitor, or the modular monitor (FIGS. 19, 20) of the present invention.

Figure 4:
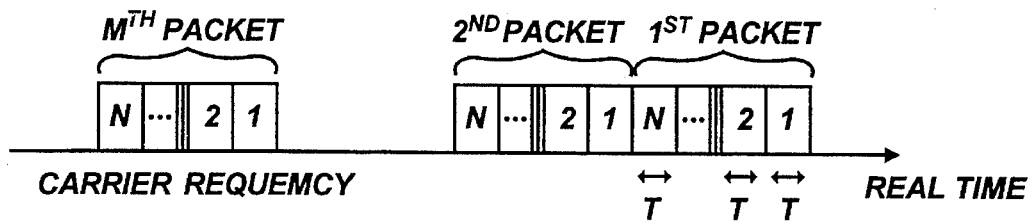
FIG. 4 is diagrammatic representation of the real-time signal processing at the output of a transmitter circuit which forms a part of the system of FIG. 3.

Considering now the transmission process 12 in greater in detail, with respect to FIGS. 1 and 4, it includes sampling the signals of a first channel 1 as indicated at 16, for a predetermined period of time T' (sampling period). The sampled signals are then compressed at 17.

The signals of each one of the remaining channels 2 through n are processed similarly to those in channel 1, as indicated at 18, 19, 20 and 21. The multiplexing of the signals from all the channels 1 through n, are then multiplexed at 25, in the form of successive packets. FIG. 4 illustrates the real-time multiplexing of the signals from all the channels 1 through n.

Figure 5:
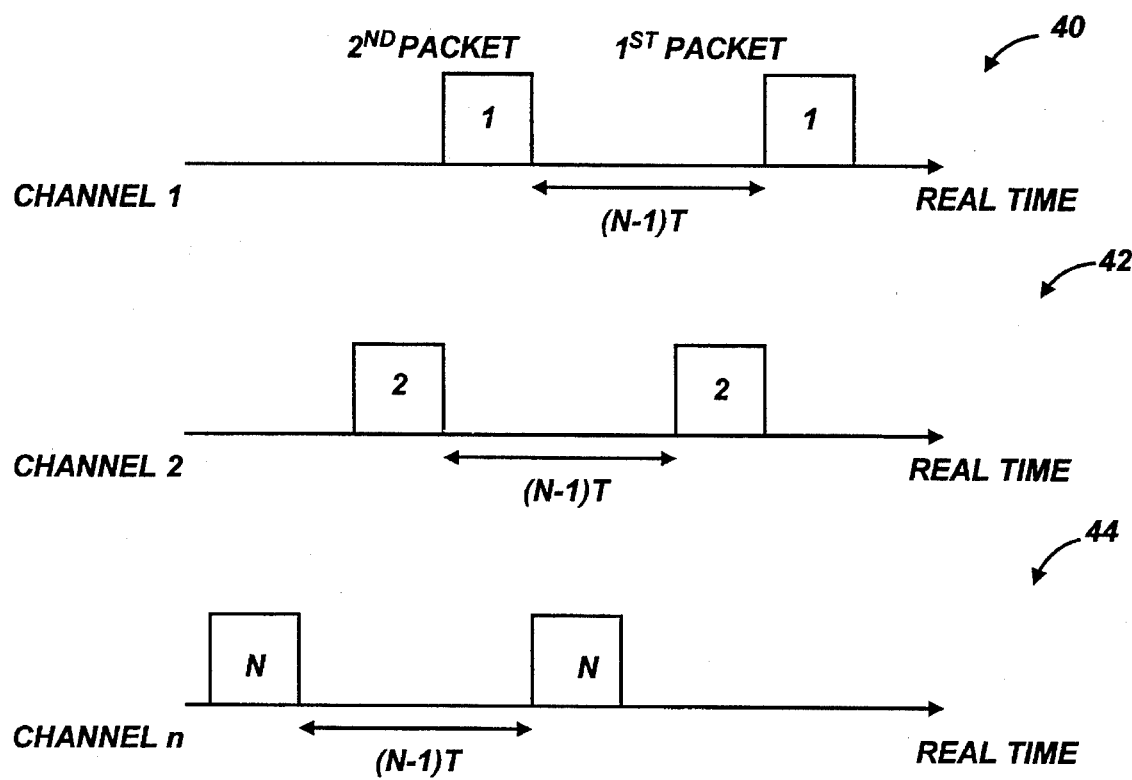
FIG. 5 is a diagrammatic representation of the real-time signal processing at the input of a receiver circuit which forms a part of the system of FIG. 3.

Returning now to FIG. 1, the reception process 14 includes receiving the multiplexed signals, and then demultiplexing the same at 30, into the same number of separate channels 1 through n. The signals are then independently stored, as indicated at 35, 37 and 39 in FIG. 1, and at 40, 42 and 44 in FIG. 5.

Once a particular channel, such as channel 2 is selected at 50 (FIG. 1), only the signals of that particular channel are displayed on a real-time basis. However, since the last compressed signals in a packet, such as the first packet, for each channel, such as channel 2, are separated from the beginning of the compressed signals in the next packet, by the sum total of the sampling period (n−1)T', it is important to serially display the information contained in successive packets to avoid a non-continuous display of signals.

Figure 3:
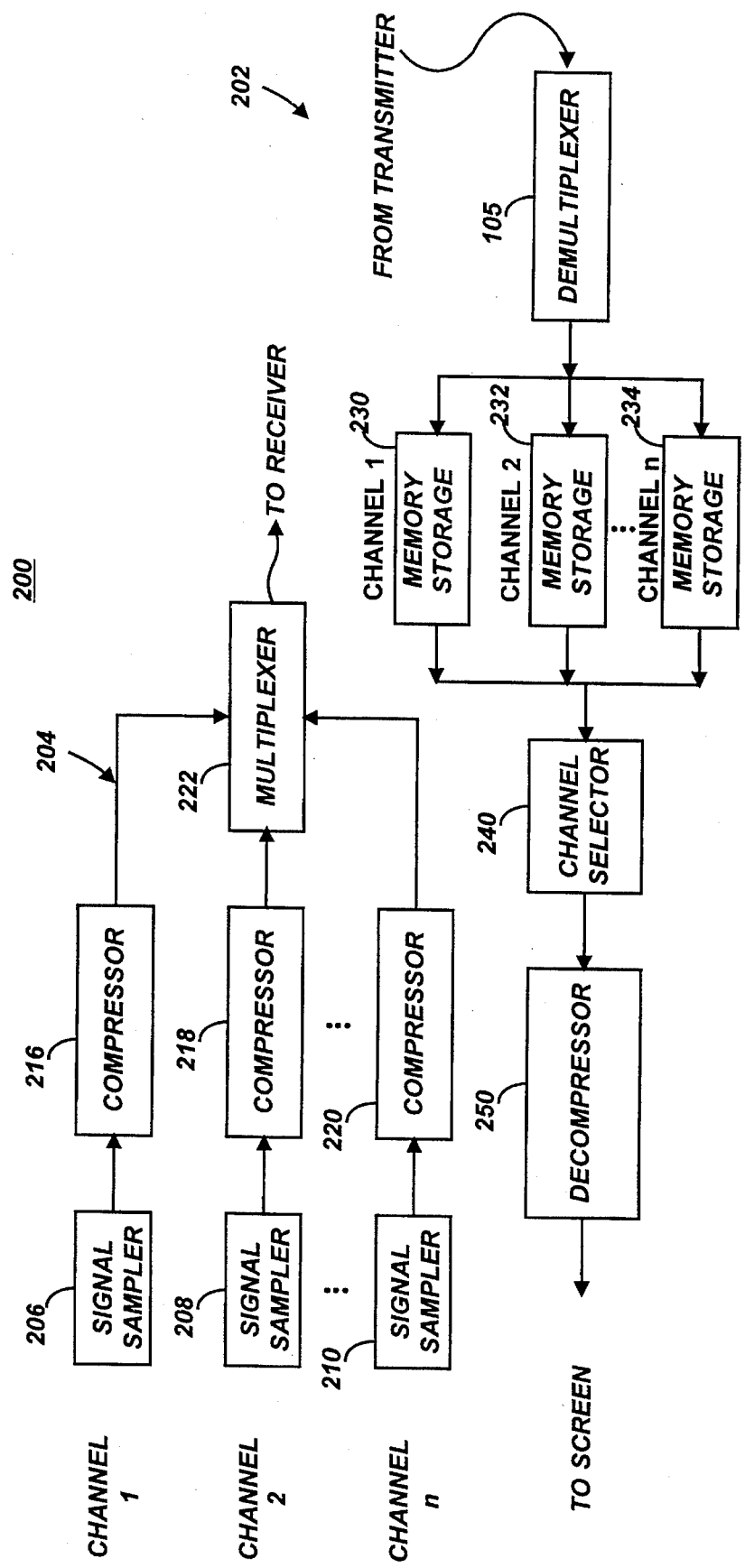
FIG. 3 is a block diagram of a video broadcasting system according to the present invention, for implementing the broadcasting method of FIGS. 1 and 2.

For this purpose, a processor or computer 51 (shown as part of the system 200 of FIG. 8), at the receiving end, causes the decompressor circuit 250 (FIG. 3), to decompress the signals of the selected channel at 60, and to reconstruct the initial real-time signals. While the processor 51 is illustrated as part of the system 200 in FIG. 8, it should be understood to those skilled in the art, after reviewing the present invention, that the processor 51 could be included as part of the system 200, which is illustrated in FIG. 3.

The processor 51 simultaneously expands the real-time spread of the restored signals over a period T', thus bridging the (n−1)T' time gap between two successive packets. The restored signals are then displayed at 65.

At present, a major limitation to the storage period T, is the limitation on the storage memory capacity. However, it should be understood that with the increased availability of expanded memory capacity, the storage period T will, in the future, be capable of being increased, as required by the particular applications, such as for several hours, days or longer. It should be clear to those skilled in the art, after reviewing the present specification, that the storage period T could be set equal to the sampling period T', or, alternatively, both periods T and T' could be different, with the storage period T being much longer than the sampling period T'.

Figure 2:
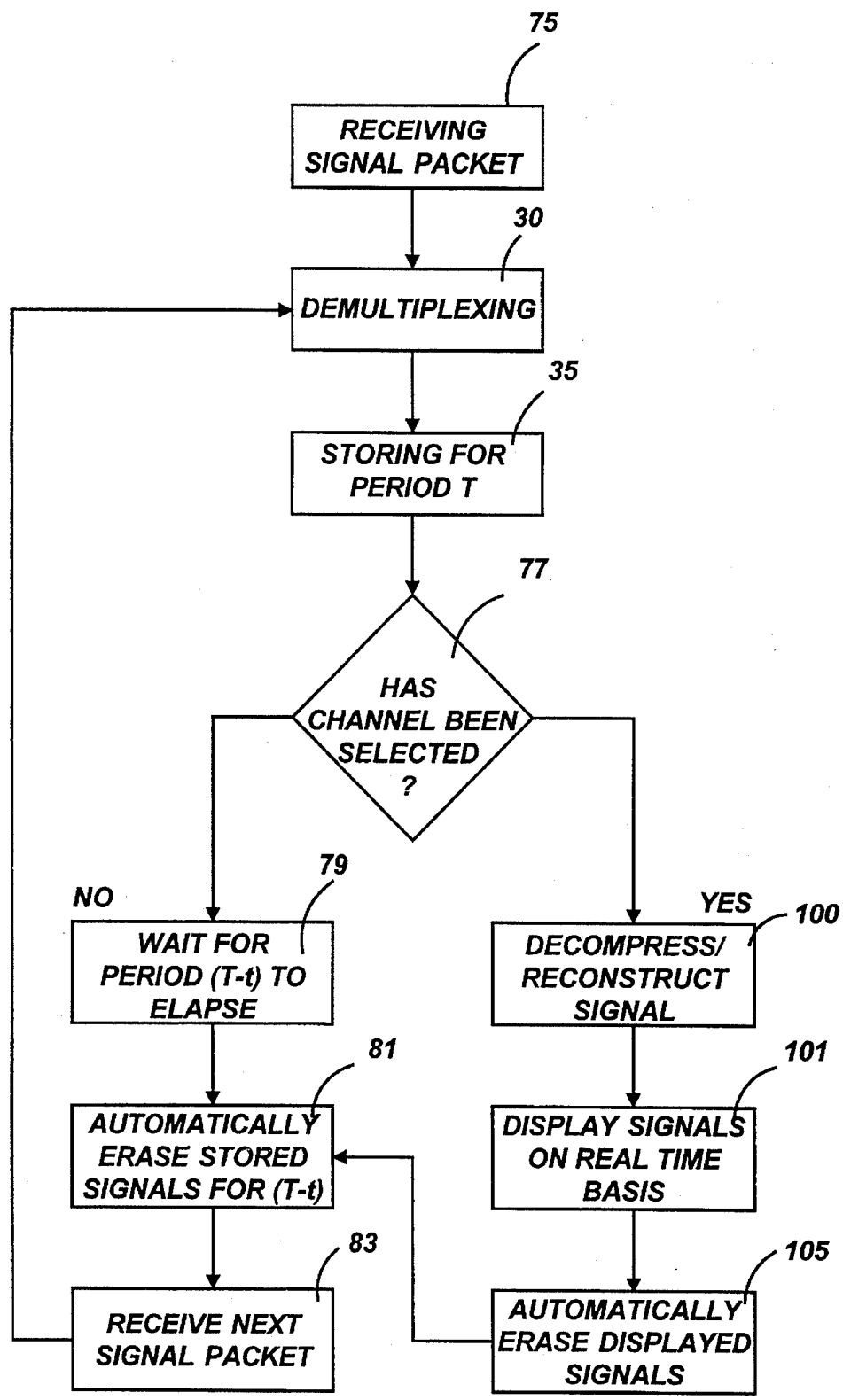
FIG. 2 is a flow chart diagram further detailing the method for video broadcasting of FIG. 1.

Considering now FIG. 2 in greater detail, it generally illustrates a flow chart further detailing the reception process of the signals for each individual channel, such as channel 1. Such process is carried out by a software program in the processor 51, at the receiver station or circuit 202, or by the monitor or TV set.

The compressed signals are first received at 75, at the input of a demultiplexer 105 (FIG. 3) in the form of a packet of signals from various channels. The received signals are then demultiplexed at 30, and the demultiplexed signals are then stored for a predetermined period of time T, and for each channel separately from the others, as indicated at 35, 37 and 39 in FIG. 1.

The software then determines at 77, whether that particular channel has been selected. If it has not been selected, then the software waits at 79 for a period (T−t) to elapse; where "t" is a relatively small incremental period compared to the period T.

At the end of the time period (T−t), the software instructs the processor 51 to automatically erase the signals stored of the elapsed period (T–t), at 81, and to replace them with new signals, if any. This will allow for the packet-to-packet replacement of the stored signals, and consequently, since the step of erasing signals, and the step of replacing them with new signals are carried out simultaneously, or in parallel, rather sequentially, the broadcasting method, including the storage step, is rendered more efficient. The time period "t" allows the signals from the next packet to replace the erased signals which are received by the demultiplexer 105, and for the stored signals to be erased. Thus, the period t can be substantially smaller than T, and for certain applications, the period t can be so negligible that it can be ignored totally.

This will allow for the signals that are stored in the in the memory storage 230, 232 and 234 (FIG. 8) to be replaced with new signals. These new signals could be updated information of the stored signals, or completely new incoming signals. It should be obvious to those skilled to the art, after reviewing the present specification, that the processor 51 could be programmed so that this wait and erase feature could be performed manually.

The signals from the next packet are then received at 83, and the cycle, or subroutine, of demultiplexing and storing the signals is then repeated.

If the software determines that the particular channel has been selected by the user or TV viewer, then the stored signals for that particular channel are decompressed and restored at 100, in the manner described above.

The reconstructed signals are then displayed on a real-time basis at 101. Thus, instead of using real-time transmission of the signals, the signals can now be transmitted in a compressed form, thereby clearing precious channel space and increasing channel availability. The real-time signal reconstruction is carried out at the user's level without excessive cost.

In the preferred embodiment, the signals which have been displayed at 101, are automatically erased from the storage memory at 105. Once the signals are reconstructed at 100, the previously stored compressed signals are automatically erased at 81, after a period (T-t), as shown in FIG. 2, and the cycle of demultiplexing and storing the signals is then repeated.

It should however be understood to those skilled of the art after reviewing the present specification, that the displayed signals could still be maintained in storage, thus skipping step 105. It should also become apparent that the storage period T could be programmed differently for each of the channels 1 through n. Furthermore, the waiting period (T—t) could also be individualized for each channel. Thus, for example, while the signals in channel 1 are automatically erased after a period ($T_1-t_1$), the signals in channel n are automatically erased after a period ($T_n-t_n$).

Referring now to FIG. 3, there is illustrated a block diagram of a TV broadcasting and reception system 200 which is constructed in accordance with the present invention and which performs the steps of the process 10, as illustrated in FIGS. 1 and 2.

In operation, the user simply connects the reception circuit 202 of the system 200 between his or her antenna or cable outlet and the conventional TV set, and operates his or her TV set as usual.

The system 200 also serves another important function, namely to prevent copying or taping of the TV programs. This is accomplished by incorporating the reception circuit 202 inside the TV set, invisibly from the user, thereby preventing access to the reconstructed signals.

The system 200 generally includes a transmission circuit 204 and the reception circuit 202. While the components used in the system 200 are conventional parts, generally known and available in the electronics industry, it should be understood that the general architecture of the system 200, including the combination of its components for producing the desired results, features and advantages is new.

The transmission circuit 204 generally includes a signal sampler 206, 208 and 210 for each one of the channels 1 through n, respectively. It further includes a separate compression circuit 216, 218 and 220, for each one of the channels 1 through n. The compressed signals are then fed to a multiplexer 222, and are transmitted to the reception circuit 202.

The reception circuit 202 generally includes a demultiplexer 105 which separates the incoming signals into their respective separate channels. The demultiplexed signals are then stored in a separate memory storage 230, 232 or 234, for each one of the channels 1 through n. It should be understood to those skilled in the art, after reviewing the present specification, that the signals that are received from the transmitter circuit 204, or from the demultiplexer 105, could be stored, while still compressed, in a digital or analog form, in a single storage means, or, the signals of each channel (1 through n) could be separated and individually stored.

Figure 8:
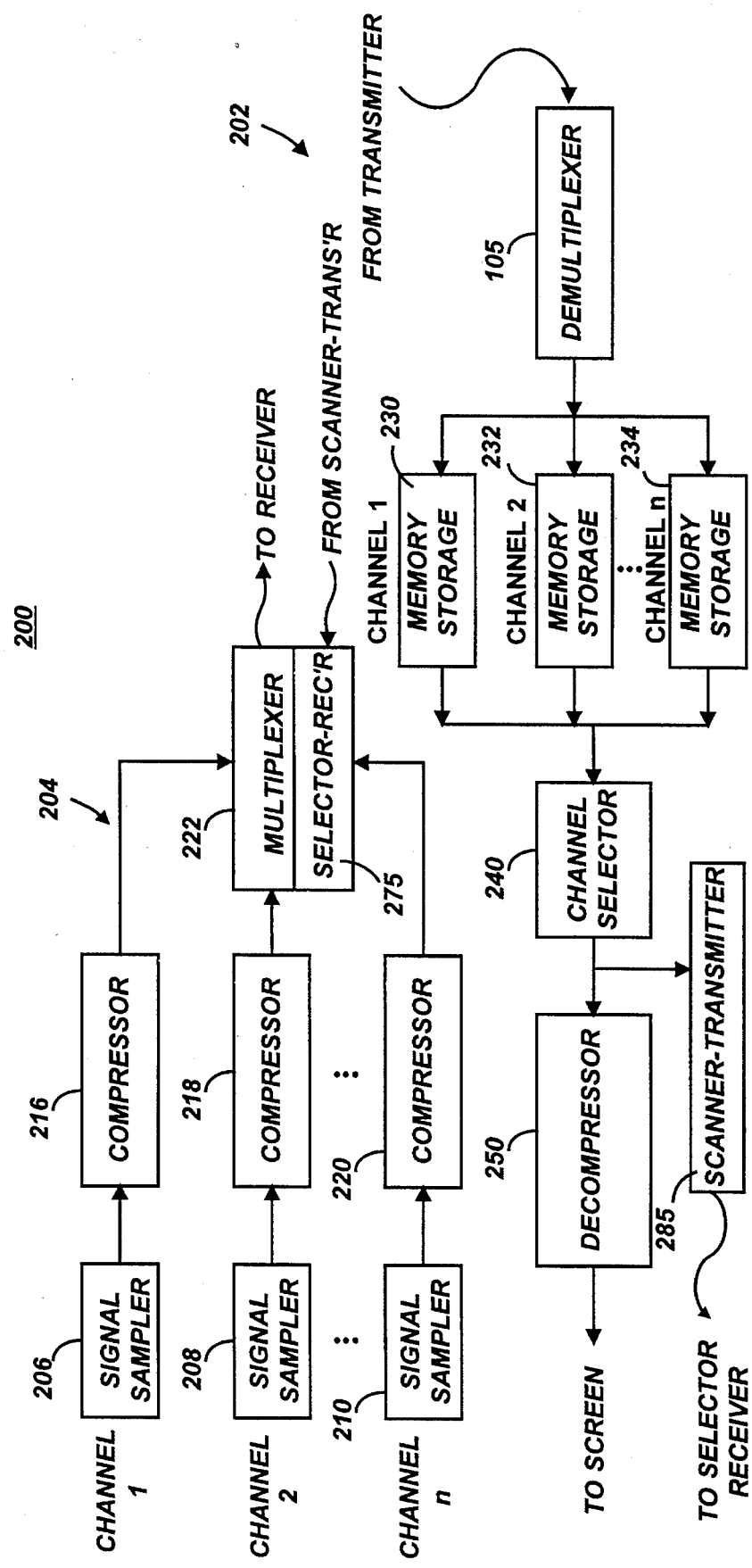
FIG. 8 is a block diagram of another video broadcasting system according to the present invention, for implementing the broadcasting method of FIG. 6.

An important feature of the present invention, is that the signals in FIG. 8, are demultiplexed and then stored in a compressed form. See FIG. 4. This means that new signals could be included in the spaces between the stored packets. This is an important feature for the retransmission of the signals, in that old or existing signals could be replaced with signals on a packet-by-packet basis.

Another application of the present system 200, 200A, is that it allows one or more channels to be recorded, taped or stored, while one of more channels are being viewed on one or more monitors.

A conventional channel selector 240 enables the user to select the channel he or she wishes to view. The selector 240 could be a PC (personal computer. i.e. processor 51), a passive terminal, a TV remote control, or similar control devices. A decompressor circuit 250 decompresses and reconstructs only those signals on the selected channel, which signals are then displayed on a screen or monitor (not shown). The monitor could be, for example, a conventional video monitor, CRT, or a modular monitor similar to the monitor 700 described below.

An alternative embodiment of the present invention will now be described in conjunction with FIGS. 6, 7 and 8. The numeral references in FIGS. 6, 7 and 8 connote the same, or substantially similar elements or processes, to those in FIGS. 1, 2 and 3.

The alternative embodiment has several military and commercial applications. For instance, the inventive alternative broadcasting method 12 (FIGS. 6, 7) and system 200 (FIG. 8) will provide substantial practical improvements to the United States Navy Telecommunications Systems (NTS), satellite communications, and sub-marine imaging.

In addition to the military applications, the inventive alternative broadcasting method and system have versatile commercial applications, such as regular television, high definition TV (HDTV), as well as interactive television and educational video systems.

Figure 6:
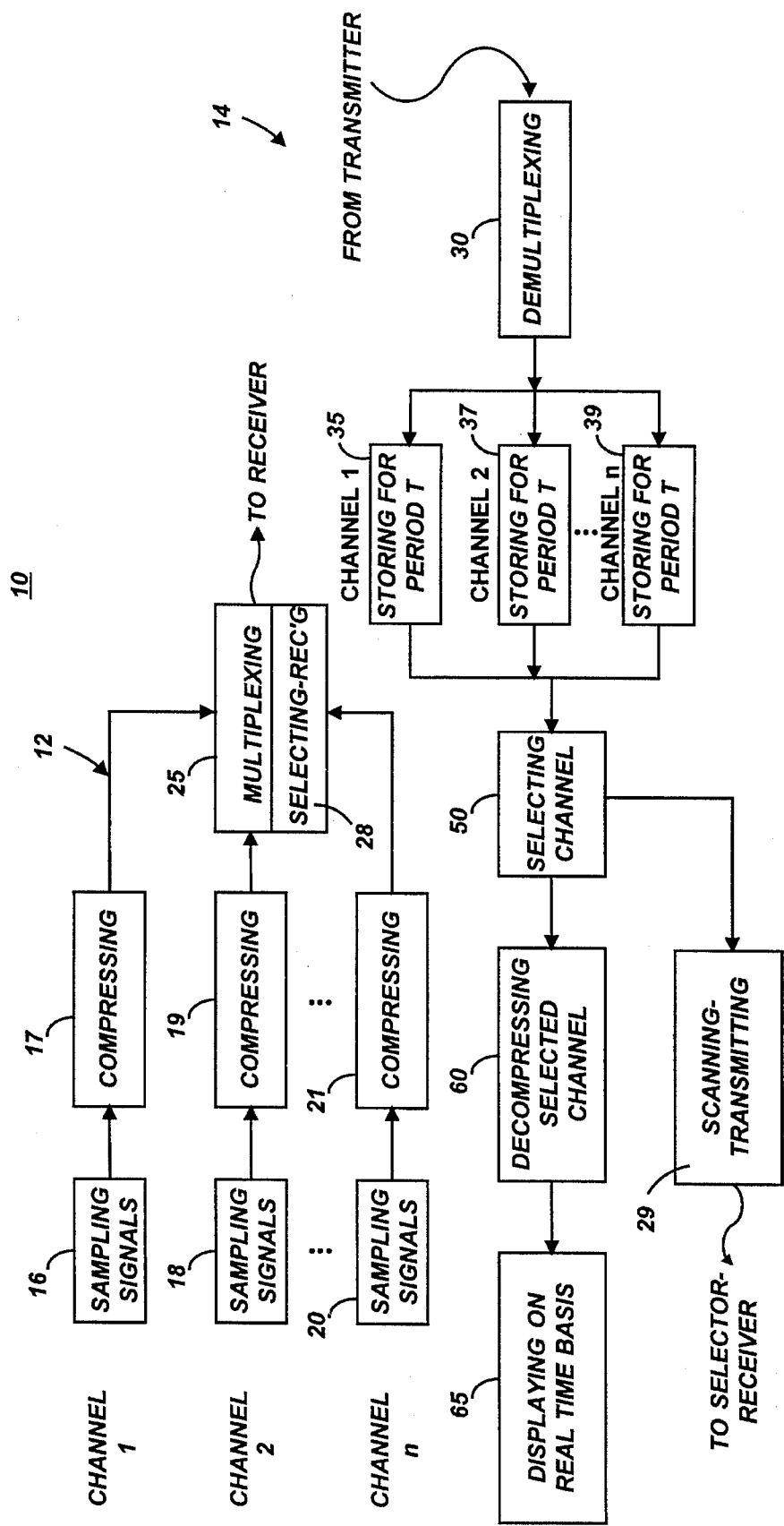
FIG. 6 is a block diagram of another method for broadcasting video signals according to the present invention.

The alternate broadcasting method 12 of FIG. 6 includes identifying the channels that have been selected by the user at the receiver level 202, and then feeding this information back to the transmitter 204 (FIG. 8). This selection data is valuable to further enhance the broadcasting process, in that it is used to identify and select which of the channels 1 through n will be transmitted.

Hence, instead of transmitting all the channels 1 through n, only those channels which the user wishes to view, are selected and then transmitted. In this manner, the efficiency of the preferred broadcasting method illustrated in FIG. 1 is substantially improved.

Let us take a hypothetical example to illustrate the improvements presented by the alternate embodiment. If for instance 50 channels can be transmitted over a conventional television bandwidth, the preferred embodiment will allow the transmission of at least 100 channels, while the alternate embodiment will permit the selective transmission of over 200 channels.

In specialized applications, the alternate broadcasting method and system offer significant additional advantages. Let us consider for instance the satellite communications where the selection process is done periodically, automatically or selectively, the delay time t can be designed to correspond to the time it takes the feedback signal to be transmitted to, and reach the satellite so that the processor or computer on board the satellite can select the channels to be transmitted, and then transmit these channels to the exclusion of the channels that have not been selected.

In such application, video cameras can be installed in a matrix format at almost any angle around the satellite, thus capturing a three dimensional view of the surrounding space. If it is therefore desired to view selected space sectors within certain desired angles, the viewer at the receiver end simply programs the channel selector 240 to select only those video cameras or channels within the matrix of the desired viewing angles. In this manner, only the space sectors within the desired angles will be viewed.

Similarly, if the alternate broadcasting system and method are used in interactive or educational video, where the viewer has to option to select from a broad range of options, then the viewer can make a selection of his or her choices, these choices are then forwarded to the transmitter and the selected choices are then displayed, while the non-selected choices would not be transmitted or displayed.

Figure 40:
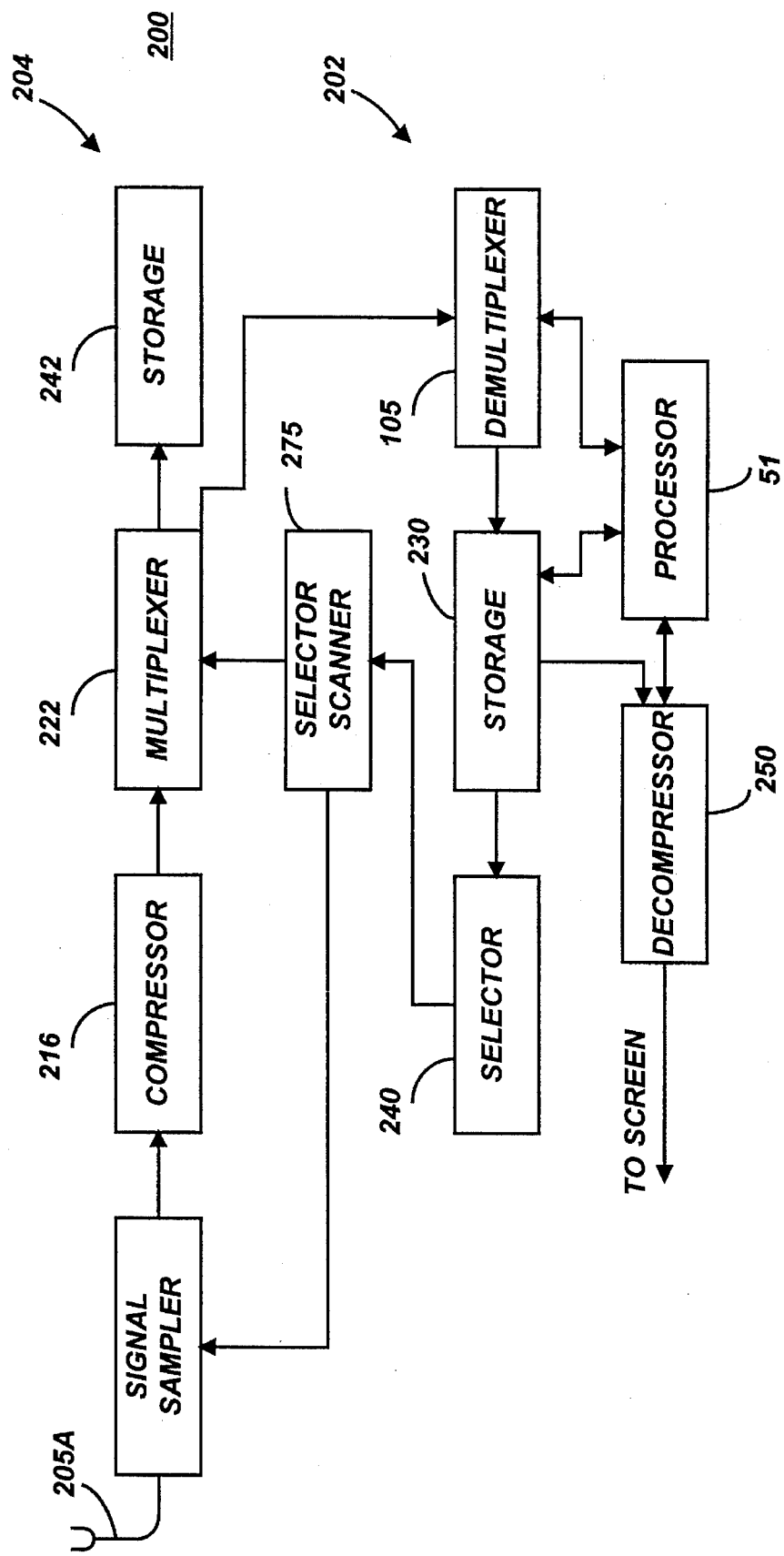
FIG. 40 illustrates another more detailed block diagram architecture of the video broadcasting system of FIG. 8.

Yet another application of the alternate system and method is illustrated in FIG. 40, and relates to video recorders, generally known as video tape recorders (VTR's) or video cassette recorders (VCR's), for recording multiple channels. In this application, the transmitter 204 and the receiver 202 are incorporated as part of the VCR circuitry at the user's level. While this application is described in relation to video recorders, it should be understood that it is also applicable to other apparatus or systems in which the functions of the transmitter station or circuit 204 and the receiver station 202, could be combined.

When it is desired to record more than one channel, the user simply enters his or her channel selection using the channel selector 240. A scanner-transmitter 285 identifies the selected channels and transmits them, via an electrical or light (i.e. infra-red) connection to a selector-receiver 275. The selector-receiver 275 then issues a command to the signal samplers (i.e. 206, 208 and 210) to sample the signals from the selected channels, and to block the channels that have not been selected. For simplicity, these signal samplers are illustrated as a single block, which is identified by the numeral reference 206.

The signal samplers are connected to an antenna or a similar receiver, such as a UHF-VHF antenna, to a cable input connection 205A, for receiving the transmitted television or video signals. The signals from the selected signal samplers are then compressed by the compressors (i.e. 216, 218 and 220), and multiplexed by the multiplexer 222. For simplicity, these compressors are identified in FIG. 40, by as a single block, which is identified by the numeral reference 216. The multiplexed signals could then be recorded on regular video tapes, in a compressed form, or for a better performance, these signals could be digitized and stored on tapes or in a computer memory 242 for later retrieval. The memory 242 is also referred to as the library or database. For this purpose, the samplers 206, 208 and 210 are well known in the field, and could be used to digitize, or to simply provide analogue samples of incoming signals. When the user wishes to view the recorded programs, he or she selects the particular channel to be viewed with the channel selector 240.

The scanner-transmitter 285 then issues a command to the selector-receiver 275 for retrieving, from the storage 242, and for transmitting, only those channels that have been selected to be viewed on a real-time-basis. The demultiplexer 105 then demultiplexes only these channels and transmits their signals to the corresponding memory storage (i.e. 230, 232, 234). The memory storage stores the signal for a period of [n.(T'−1)], if the compressed signals of the selected channels have substantially similar sampling periods, and for a period substantially equal to $$\sum_{i=2}^{n} T_i$$

if the compressed signals of the selected channels do not have substantially similar sampling periods T', wherein n represents the number of channels that have been originally recorded or stored on tape or memory 242.

Thus, the memory storage (i.e. 230) provides a temporary or transitional storage, so that the selected signal is assembled and is ready to be viewed in a continuous and uninterrupted manner.

As illustrated in FIG. 4, the intermittent storage of the signals from the same channel is important for providing a continuous uninterrupted viewing of the signals. For instance, if the viewer wishes to record or tape three channels, and the sampled signals from the first channel occupy a time slot or sampling period T' (FIG. 4), the memory storage 230 delays the transmission of the first packet signals by a period of "3.T'", until the signals from the second packet are processed. In which case, the signals from each one of the packets are restored on a real-time-basis, thus achieving a continuous, allowing for an uninterrupted flow of signals.

Yet another application of the present invention, is that it allows the users to communicate and interact with each others, not only through data or audio exchange, but through an integral video-audio-data exchange (VADE) system, thus achieving true interactivity.

Another application of the present system 200, 200A, that distinguishes it over conventional VTR's, is that it allows the user to perform the VTR functions, such as fast forward and rewind, pause, etc., while the channel is being viewed. In conventional VTR's, the channel has to be taped first, and then the foregoing functions could be performed, using a special recorder (VTR).

In the present invention, such a recorder is not necessary, or in the alternative, it could be part of the computer system, i.e. a personal computer, or, part of the intermediate station 202A. In this manner, if the user wishes to "pause" the channel being viewed, the viewer issues a command to the computer 51B (FIG. 44), which, by controlling the storage period in the storage 230B, the decompressor 250B and/or the scanner 285B, prevents further transmission of the signals from the storage 230B to the screen 251B.

As a result, the user obtains a still picture on the screen or auxiliary device 251B. This will enable the picture to be printed. This feature will allow the user station 203A, or a simplified version thereof, to be used in still picture photography. Additionally, the user station 203A could be combined with the video optical system or camera 300 which will be described hereafter, in connection with FIG. 9, such that the signals from the optical system 300 could be inputted to the demultiplexer 105B, and processed as described herein.

Similarly, if the user wishes to fast forward the program (channel) being viewed, the computer 51B controls the storage 230B and the decompressor 250B, and causes the stored signals, which were already sampled prior to storage, to be re-sampled. For instance, instead of the sequence of signals (FIG. 4) to be released or transmitted to the decompressor 250B, every other signal, or every two other signals (or faster if desired), are transmitted to the screen 251B.

The modular screen or the present invention, or a conventional monitor with split screen capability could be used with the present user station 203A. In this way, if the user wishes to fast forward the program (channel), while still viewing it, the fast forwarded signals could be viewed on a part (split) of the screen, while the remaining program could be viewed on the remaining portion of the screen. Additionally, another part of the screen could also be designated to allow the user to view the rewound program (or other features).

To perform this multi-task function, the computer 51B (or the storage 230B, or as an independent element) of the user station 203A, includes a sampler 26B, which controls the re-sampling period of the signals, prior to further processing. The re-sampling period T" is controlled by the computer 51B. Additionally, instead of automatically erasing the signals that have been viewed, the storage 243 or 230B could still store these signals, for another holding period $T_h$. Consequently, the rewind and other features could be performed, similarly to the conventional VTR's, without having to use a separate recorder-player, as the computer 51B and the monitor 251B could share the functions (elements) of the conventional VTR, and provide improved performance. The foregoing feature of the present invention if part of the multi-media environment, which will become increasingly acceptable in industry standard.

For sophisticated users, or for other applications, the station 203B could also be used as a segment (commercial) removal. This would require the coordination from the sources of the programs, in that they need to encode the programs so that they are identifiable by the user station 203B. In other words, the locations of the commercials are generally identified, and the uses station 203B could recognize the identification signals, and instruct the computer 51B to remove, or otherwise dispose of the signals between two successive identification signals, in a desired manner.

Figure 41:
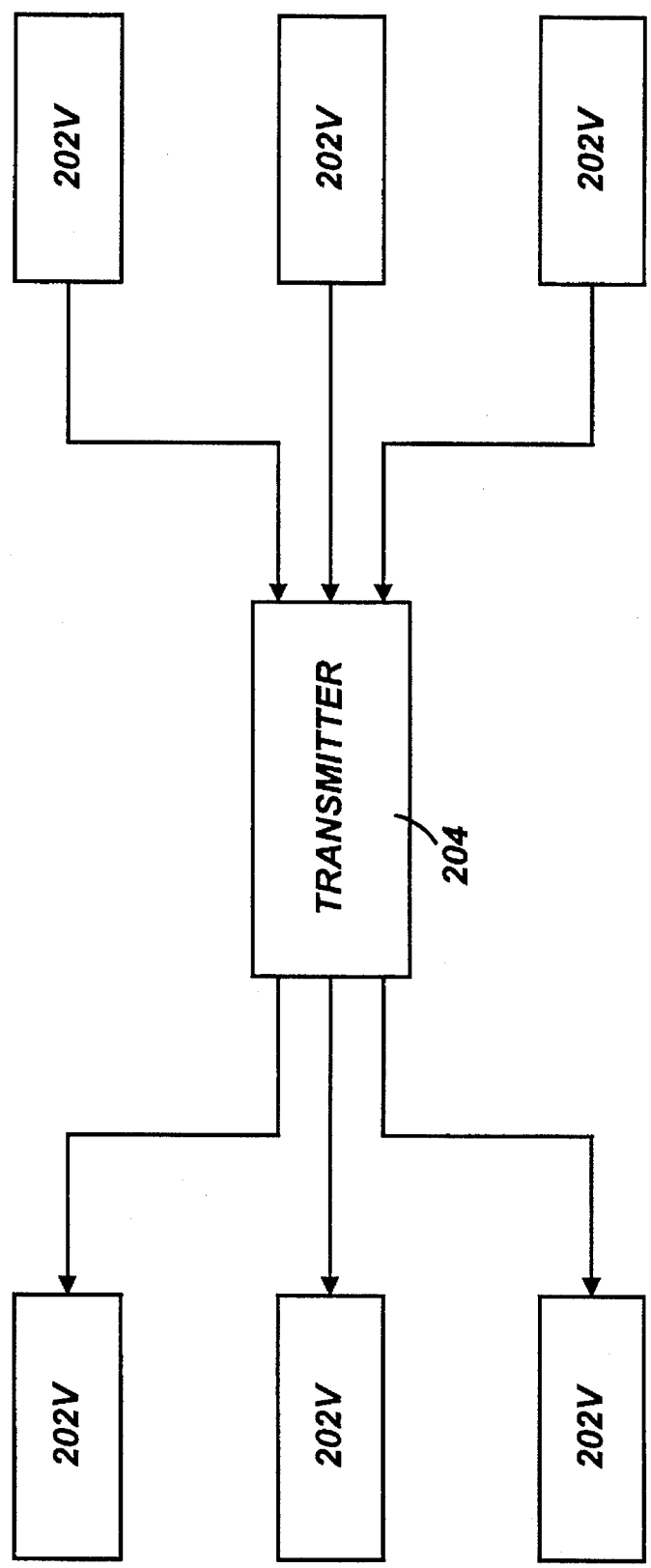
FIG. 41 illustrates another block diagram architecture of an application of the video broadcasting system of FIG. 8.

The above application (FIG. 40) can also be used in collecting data, voice, light and video signals from individual transmitter units and channel or "network" them to a single or multiple outputs. One such applications could be used in fast food restaurants or other similar restaurants, where multiple customers can place or select their orders, and is illustrated in FIG. 41. These orders are then distributed to various food preparers for service.

In this application, the users of the system are the patrons or customers of the restaurant, and the viewers are the food preparers who are located at a remote location from the users, and the system 200 would include a transmitter unit 204 and a plurality of substantially similar reception units or receptors 202. Some of these receptors 202 are allocated to the users and others are allocated to the viewers. In this manner, the users or customers use the channel selector 240 to make their food selection, while the viewers or food preparers use the channel selectors 240 to view the orders. The users can then make multiple food selections while the food preparers view only their own specialized orders and identify these orders with particular customers who placed the orders. Thus, communication between the customers and the food preparers is significantly enhanced.

As illustrated in FIG. 41, the receptors that are allocated to the users have been designated as 202U, while the receptors allocated to the viewers have been designated as 202V. The transmitter circuit 204 and the receptors 202U and 202V are described in FIGS. 3, 8 and 40, and therefore, only a high level block diagram will be illustrated in FIG. 41.

In the preferred mode of this .application, the receptors 202U and 202V have preferably an identical design, in order to promote the interchangeability and maintenance of these units. Thus, a receptor 202U could be interchanged with a receptor 202V.

The difference between the receptors 202U and 202V is one of function. That is, each of the receptors 202V acts as a local transmitter of information fed to the transmitter 204, which acts as a central transmitter or switching system. The receptors 202V act as true receivers, with the viewers as end users.

Additionally, in other applications, such as in interactive televisions, or in teleconferencing, it would be desirable to have the users 202U interface with the viewers 202V or with each others.

In operation, the customers use the receptors 202U to make their selections. The information from each receptor 202U could be treated in either one of the following ways:

The first way: Normally, each menu, would it be the restaurant menu or a computer menu, would by definition have several choices for selection by the user. Each one of these selections could be treated as if it were a separate channel.

The second way: Treat the signals from each user selector 202U as a separate channel.

In either way, the signals on the channels are processed according to the teachings in the present specification.

Figure 7:
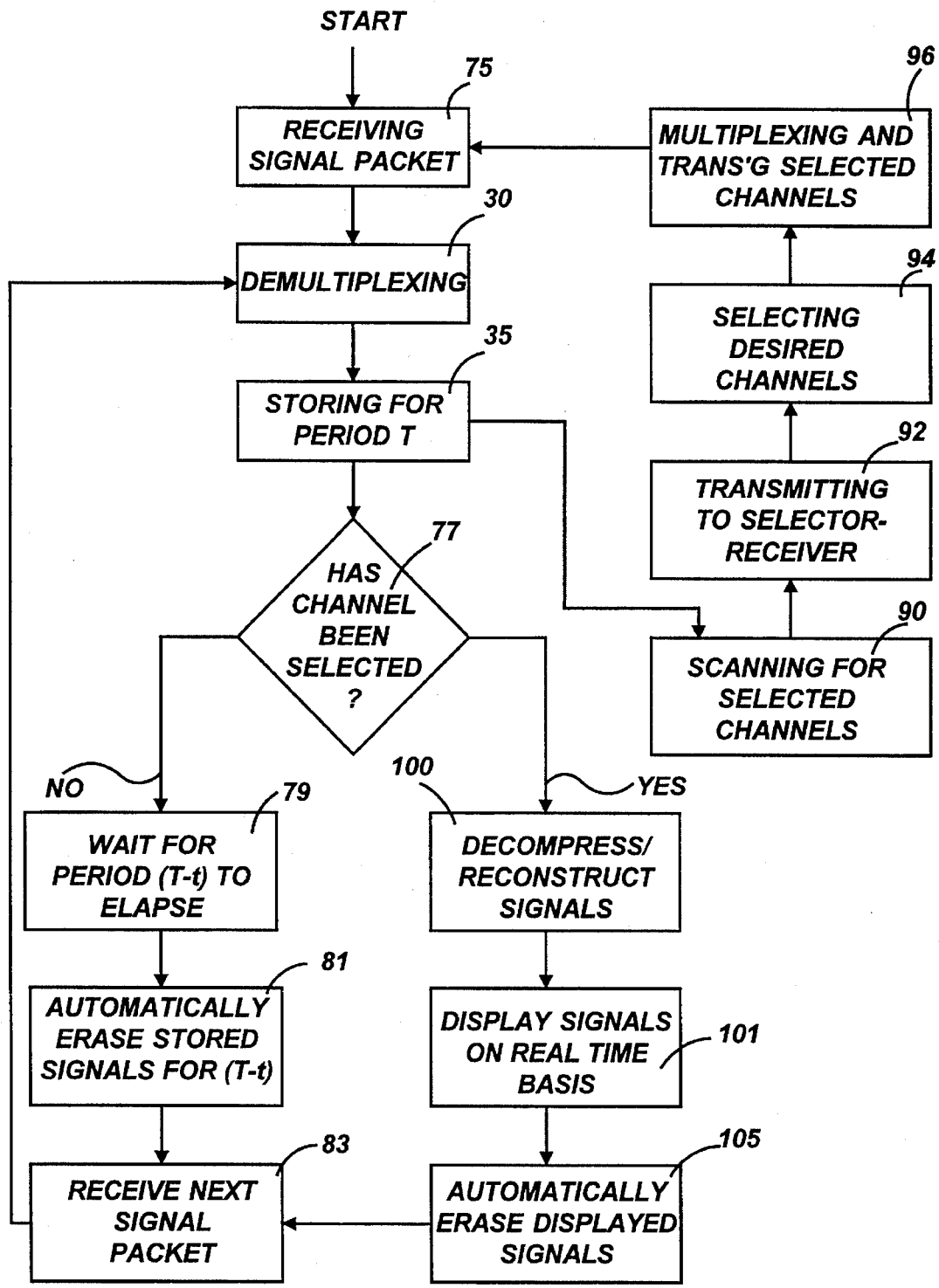
FIG. 7 is a flow chart diagram further detailing the broadcasting method of FIG. 6.

The alternate method 12 is illustrated in more detail in FIGS. 6 and 7. It is substantially similar to the method of the preferred embodiment, with the exception that the alternate method 12 includes the step of scanning 29 the selection process of the channels after they have been selected at 50 at the receiver station or level 202 (FIG. 8). Information on the selected channel, such as which channel has or has not been selected by the user, is then fed back to the transmitter 204 (FIG. 8).

The feedback process can be done in any conventional transmission method, such as over a radio or light frequencies. Lasers and infra-red transmissions can also be used. The frequency of transmission should however be selected in such a way as not to interfere with the simultaneous video transmission.

Figure 39:
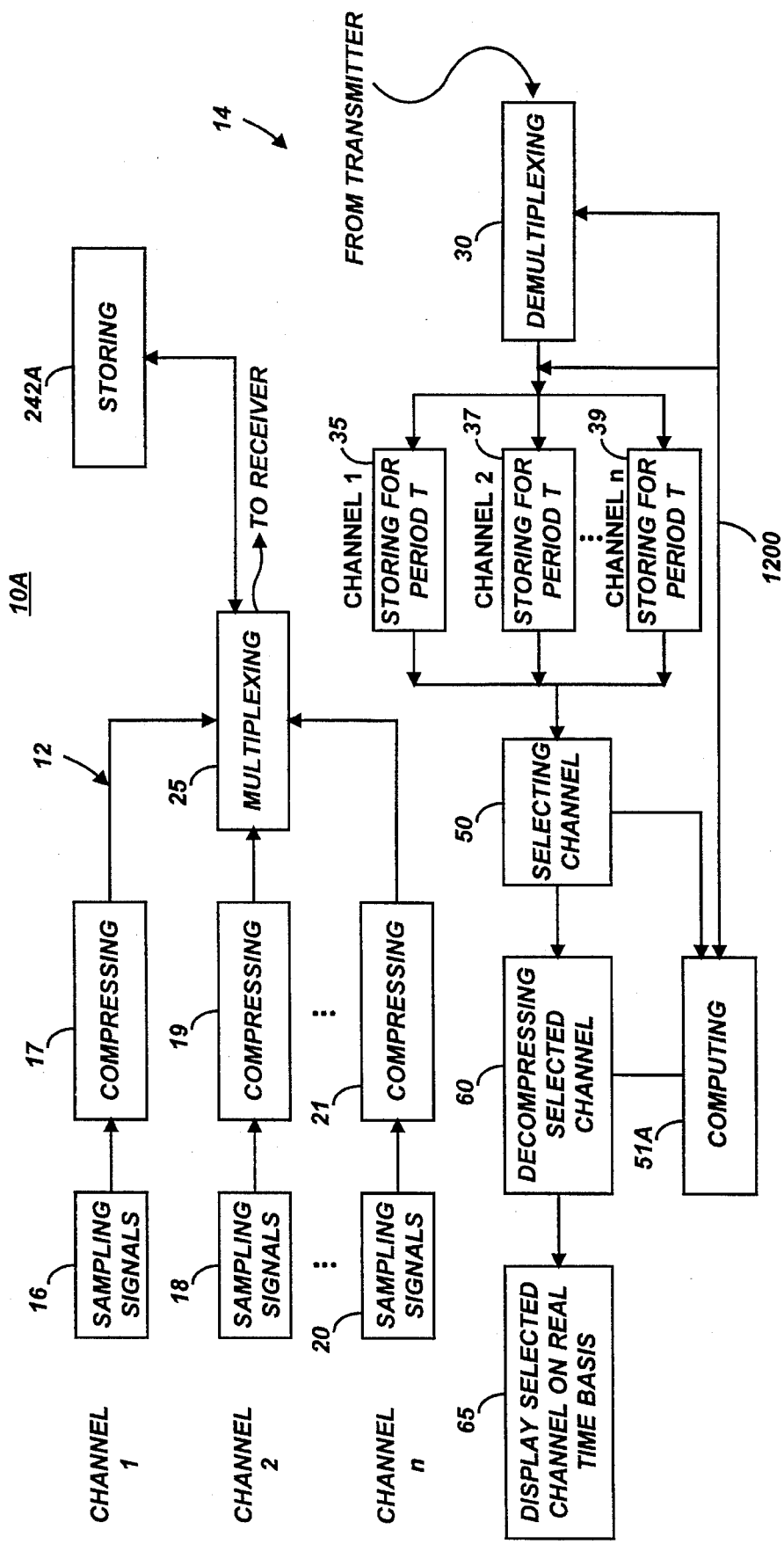
FIG. 39 illustrates a more detailed block diagram architecture of the video broadcasting method of FIG. 1.

Turning now to FIG. 39, it illustrates a more detailed block diagram architecture of the video broadcasting method of FIG. 1. The difference being that the method 10A of FIG.

39 includes the step of storing the multiplexed information at 242A. Furthermore, the method 10A further includes feeding back (step 51A) the information from the channel selector 240, to the demultiplexer 105 and to each one of the memory storages 230, 232 and 234.

In this way, the signals that have been compressed at 17, 19 and 21, could be stored in the storage 242, and are identified by their channel numbers. Once the signals have been selected, then they are transmitted or sent to the demultiplexer 105, for further processing. When the user selects a certain number of channels (1 through n), these channels are retrieved from the storage 242, and sent to the demultiplexer 105.

It should become apparent to those skilled in the art, after reviewing the present specification, that the signals that are viewed by the user, on a real time basis, do not necessarily need to be automatically erased. The signals in the storage units 230, 232, 234 and 242 could be duplicated, and then processed for viewing by the user. The original signals would still remain stored in their corresponding storage units.

I. TELECONFERENCING SYSTEM

Figure 16:
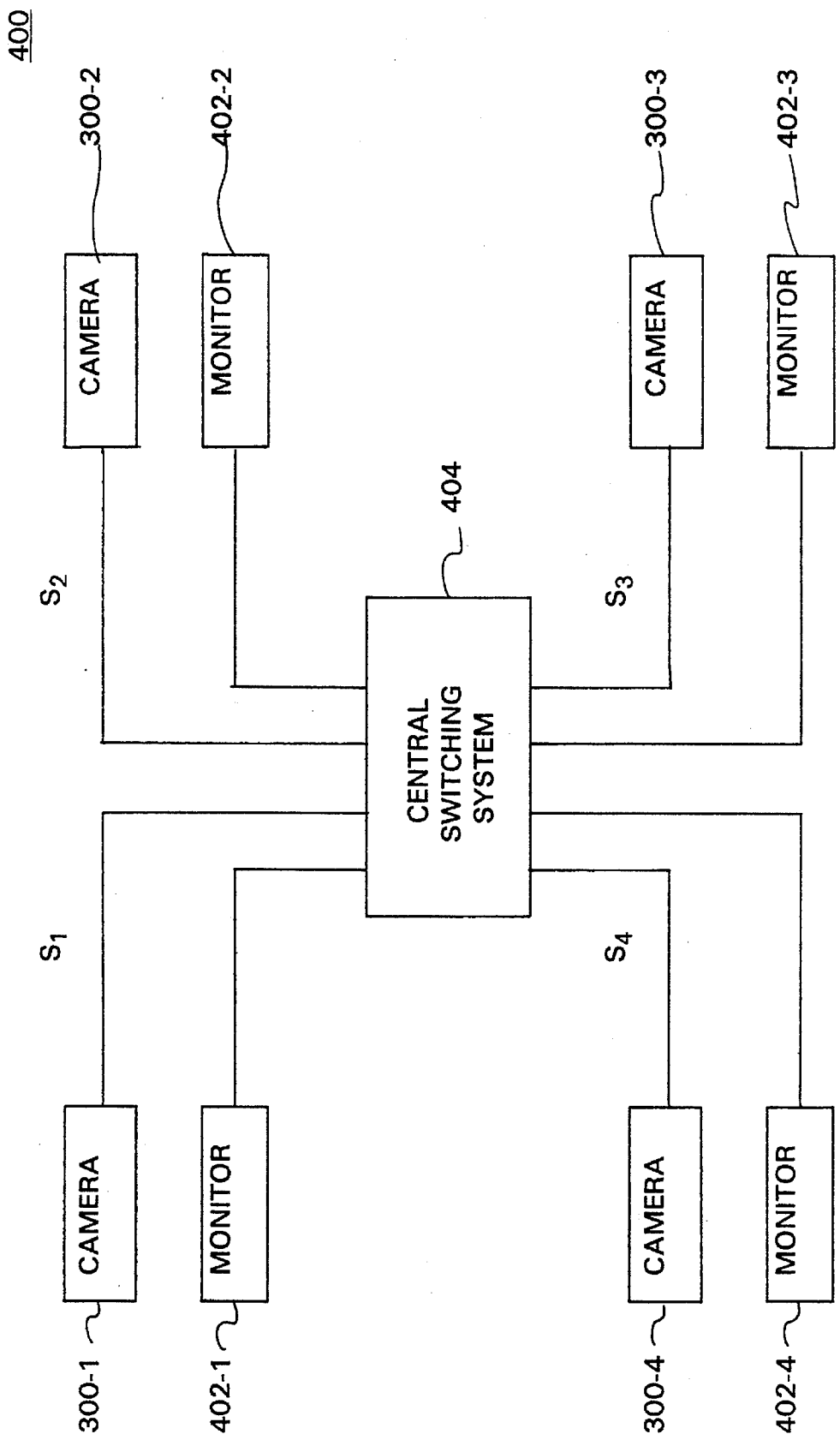
FIG. 16 illustrates a high-level video teleconferencing system according to the present invention.

Turning now to FIG. 16, there is illustrated a video teleconferencing system 400 which permits video interaction among several remote sites. While there is illustrated only 4 conferring sites, it will be understood from the following description that other locations could also be connected to the teleconferencing system 400, and that more than a single camera could be placed at each remote location.

The teleconferencing system 400 generally includes four remotely located video cameras 300-1, 300-2, 300-3 and 300-4; four video monitors 402-1, 402-2, 402-3 and 402-4; and a central switching system 404. The cameras transmit the signals to the central switching system 404 via conventional transmission means. The central processing system 404 processes the incoming signals from the cameras and then sends the processed signals to the monitors at the remote locations.

The cameras 300-1, 300-2, 300-3 and 300-4 at the remote locations could be conventional cameras, or, in the alternative, they could be similar to the video optical system or camera 300 which will be described hereafter, in connection with FIG. 9, could be used instead. The monitors 300-1, 300-2, 300-3, and 300-4 could be conventional video monitors, or in the alternative, they could be specially designed modular monitors, as will be described below with respect to the modular liquid crystal display (LCD) monitor 700.

The central switching system 404 will now be described in greater detail in connection with the comparator system 450 shown in FIG. 17, and the broadcasting system 200 shown in FIG. 8. It will be understood to those skilled in the art, after reviewing the present description that the comparator system 450 could be either located at the remote site, as part of the camera 300, or as part of the central switching system 404.

Figure 17:
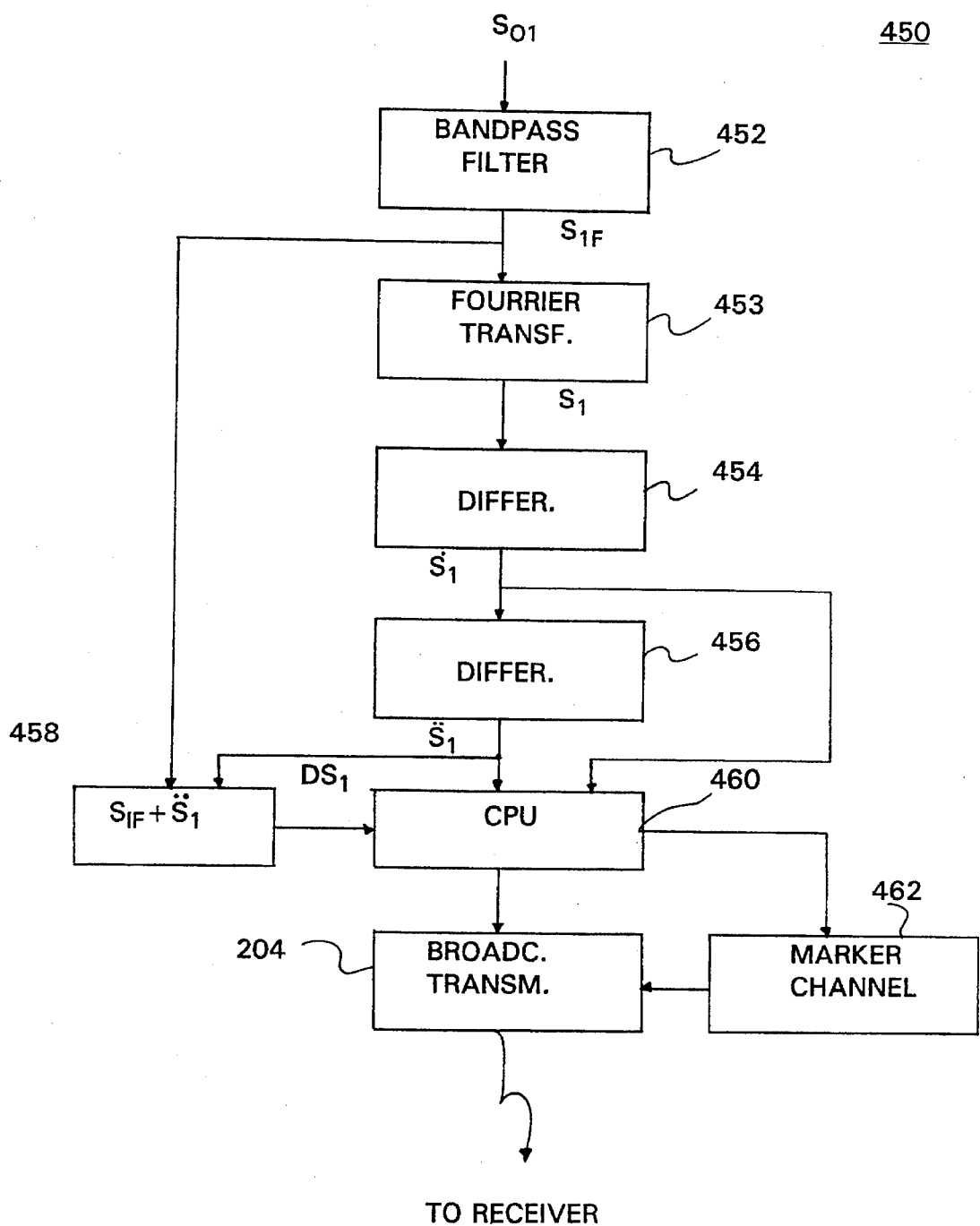
FIG. 17 is a block diagram of a comparator system according to the present invention, for use with the video teleconferencing system of FIG. 16 and the video optical system of FIG. 9.

In the preferred embodiment, the comparator system 450 is part of the central switching system 404, and the initial signal So1 in FIG. 17 is the signal Voc (FIG. 9) at the output of the camera 300. It should however be understood that the signal So1 could be any one of the signals Vb, Vr or Vg, or the modulated signals thereof, as illustrated in FIG. 9.

The signal So1 is filtered by the band-pass filter 452, in a first attempt to filter out noise and undesirable signals. The filtered signal S1f is then passed through a Fourier transformer 452, for generating Fourier transforms sinusoidal signals, which are then limited to the most desirable transform signals S1.

The signal S1 is then passed through a series of differentiators 454 and 456, for generating a first and a second differential signals $dS1/dt$ and $d^2S1/d^2t$ respectively. An adder 458 then adds the filtered signal S1f and the second differential signal $d^2S1/d^2t$ to generate the signal DS1, such that $DS1=S1f+k.d^2S1/d^2t$, where k is a coefficient resulting from the double differentiation of the signal S1f. Since the signal S1 is a sinusoidal signal, then the second differential signal $d^2S1/d^2t$ is equal to $(-k. S1)$.

The signal DS1, could be used as a tolerance value or for parity check, and it is one object of the present invention to have this DS1 signal processed independently from the sinusoidal signal S1. For this purpose, the signals $d^2S1/d^2t$, DS1 and $dS1/dt$ are sent to a central processing unit (CPU) 460 for processing. The CPU can be programmed to determine whether the DS1 signal is needed, and if it is not, then the signal DS1 is discarded and only the sinusoidal signal S1 is used as the final signal. If the DS1 signal is needed, then both the DS1 and S1 signals will be sampled by the signal sampler 206 (FIG. 8) and processed by the broadcasting system 200, as described above.

If the CPU 460 determines that the differential signal $dS1/dt$ is equal to a tolerance value, such as zero, then it sets a flag, at the marker circuit 462, instructing the transmitter 204 not to set a marker indicator and not to sample the corresponding signal S1, since the signal S1 has not changed from the template signal (i.e. the previous sampled signal S1). In this manner, if the camera 300 is taking a picture of an unchanging background scene, for instance a document, then it would not be necessary to sample the new signal S1. This will allow for a better efficiency and faster processing of the signals.

If on the other hand, the signal $dS1/dt$ is different than the tolerance value (i.e. zero), then the CPU 460 instructs the transmitter 204 to sample the signal S1, and possibly DS1, and to process the same as described above in connection with the broadcasting system 200.

The above process permits the reduction in noise and other undesirable frequencies by transmitting only the sinusoidal signals. A system similar to the system 450 can be used at the receiving end of the broadcasting system 200 to regenerate the original signal So1.

Returning now to the teleconferencing system 400 of FIG. 16, the video signals S1, S2, S3 and S4 are processed according to the teachings of the broadcasting method 10 of FIGS. 1 and 6 and then sent back to the video monitors 402-1, 400-2, 400-3, and 400-4.

The teleconferencing method and network provide selective video communication capability among a plurality of remote sites and a central video switching exchange (CVSE) 404. The teleconferencing method comprises the steps of initiating a video call to one or more remote sites for participating in a video teleconferencing session. For instance, if remote site 1 (RM1) desires to initiate a video teleconference with remote sites 2, 3 and 4 (RM2, RM3, and RM4 respectively), RM1 dials the designated numbers for RM2, RM3, and RM4.

The CVSE allocates a plurality of different video channels to the participating remote sites, such that each video channel corresponds to one of the participating remote sites. In the present example, the CVSE assigns video channels 1, 2, 3 and 4 (VC1, VC2, VC3 and VC4) to the video channels incoming from RM1, RM2, RM3, and RM4 respectively.

The CVSE then generates signals for identifying these video channels, such that the video identifying signals are transmitted at a different carrier frequency than the video channels. The channel identifying signals are then transmitted to all the participating remote sites. In the present illustration, the CVSE generates video identifying signals IS1, IS2, IS3 and IS4.

If the participant at RM1 wishes to view video signals incoming from RM2 and RM3, then the participant selects video identifying signals IS2 and IS3. If the participant at RM2 wishes to view the video signals incoming from RM1, RM2 and RM4, the participant selects the video identifying signals IS1, IS2 and IS4. The remote sites feed back the selected video identifying signals to the CVSE, which in turn continually scans the video identifying signals being fed back to it, for identifying the video channels selected by each of the remote sites.

In this manner, if one of the remote sites, such as RM1 changes its selection and desires to additionally view the video signals incoming from RM1 or RM4, the CVSE, by continually scanning the fed back video identifying signals, can easily accommodate changes in the selection process.

The CVSE compresses and multiplexes only those signals from the selected video channels into separate video signal packets, such that each packet corresponds to the particular selection of the video channels made by one of the remote sites. In our example, RM2 will receive a packet containing only signals from RM1, RM2 and RM4, but will not receive video signals from RM3. This new video compression method will significantly increase the number of teleconferring participants since, in the preferred embodiment, the CVSE transmits compressed video signals to the remote sites, and furthermore it does not transmit all the video signals from all the participating sites, but it rather selectively transmits only those video signals which were selected by the particular participating remote site.

After the remote sites receive their corresponding compressed and multiplexed video signal packets, these packets are demultiplexed and separated into separate video channels, and the demultiplexed video channels are reconstructed and displayed on a real-time basis.

In order to further enhance the compression of the video signals, the CVSE passes these video signals incoming from each of the remote sites through a Fourier transformer for generating sinusoidal signals, and only the most desirable sinusoidal signals, i.e at the fundamental and first and second harmonics, are selected, and the remaining signals are rejected. Only those selected signals are then compressed and multiplexed.

In yet another alternative way to further enhance the compression of the incoming video signals, the teleconferencing, network, differentiates the video signals incoming from the remote sites, and samples only those video signals whose first derivative is different from a tolerance value, such as zero.

In a still another alternative method to compress the incoming video signals (Sn), the teleconferencing network differentiates the video signals (Sn) for generating first derivative signals ($dSn/dt$), and also differentiates these first derivative signals ($dSn/dt$) for generating second derivative signals ($d^2Sn/d^2t$). The signals (Sn) and their corresponding first and second derivative signals ($dSn/dt$) and ($d^2Sn/d^2t$), respectively, are routed to a central processing unit (CPU) for further processing and quality control, such as for use in parity check.

In some instances it is desirable to add the signals (Sn) and their second derivatives ($d^2Sn/d^2t$) to generate the signals DSn, as follows: $DSn=Sn+k.ddSn/ddt$, where k is a coefficient resulting from the double differentiation of the signal Sn. In many instances DSn should be equal to the tolerance value (i.e. zero), and if it is not, then the CPU will offset the deficiency.

While in the preferred embodiment, the teleconferencing method and network have been described in relation to the invention described in FIGS. 6 through 8, it should become apparent to those skilled in the art, after reviewing the present invention, that the teleconferencing method and network, could also be used in relation to the invention illustrated by FIGS. 1 through 5. In this respect, the signals transmitted by the transmitter unit are send to all the remote stations, without regard to the selections made by the remote stations.

II. VIDEO CAMERAS

Figure 9:
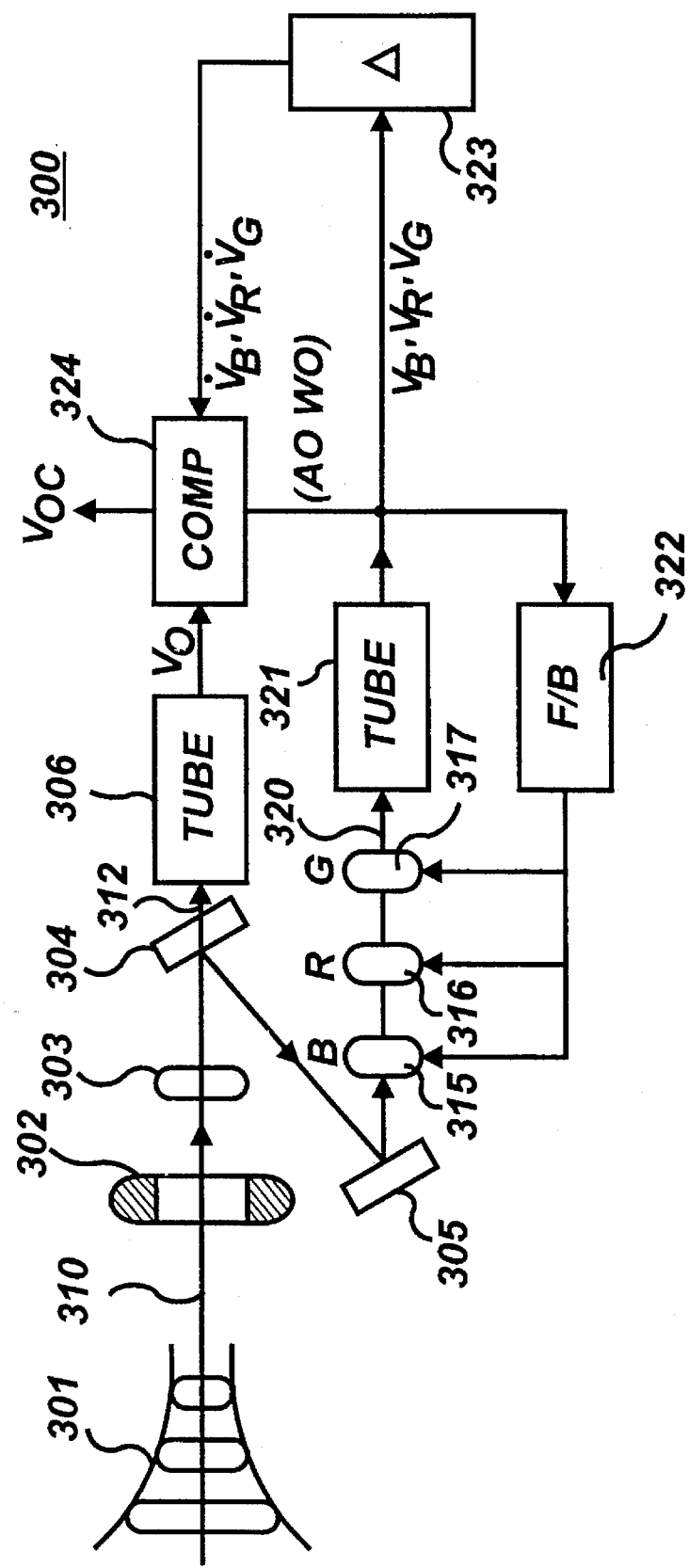
FIG. 9 is a simplified partly block diagram of a video optical system for use in a video camera, according to the present invention.

Turning now to FIG. 9, there is illustrated an optical system or a video camera 300. A taking zoom lens 301 focuses and conducts the impinging light rays or beam to a field lens with mask 302, along a path 310. The light rays then pass through a relay lens 303, and thereafter to a splitter 304 to be split along two paths 311 and 312. A pickup tube 306 receives the light beam along the path 312, and converts the light signal into an electrical signal Vo.

In the preferred embodiment, a mirror 305 reflects the light beam incoming along path 311 through three rotational blue, red and green discs or color lens systems 315, 316 and 317, respectively. Each one of these color lens systems 315, 316 and 316 (FIG. 10) rotates at an angular speed (Wb, Wr, Wg) proportional to the frequency of its corresponding color, in order to achieve four objectives. The first is to filter and sample the incoming light signal; the second is to obtain three derivatives of the signal with respect to the frequencies of the red, green and blue colors; the third is to mix these derived signals so as to obtain the resulting color frequency; and the fourth is to determine the intensity or amplitude of this resulting color frequency.

Each color lens system, such as the blue lens system 315, has a plurality of adjustable shutters 315A, 315B and 315C. As it will be explained later in greater detail, the opening of each shutter reflects the amplitude of the corresponding impinging filtered light signal, i.e. the blue light signal. As a result, the color lens systems 315, 316 and 317 provide information relating to the amplitude of the sampled signals, which are split without the use of conventional color splitters.

The split light beams exit the color lens systems 315, 316 and 317 along a path 320, and emerge onto a pickup tube 321, which receives the split color light beams and converts them into electrical signals Vb, Vr and Vg.

These signals Vb, Vr and Vg are simultaneously transmitted to a feedback system 322, to a differentiator circuit 323 and to a comparator/corrector 324. The feedback system 322 sends the signals Vb, Vr and Vg to the corresponding color lens systems 315, 316 and 317 respectively, to cause the shutters in each one of these lens systems to open up or to close, proportionally to the amplitude of the corresponding signal, that is the amplitudes of the signals Vb, Vr and Vg.

The differentiator 323 differentiates the color signals Vb, Vr and Vg with respect to time and transmit the differentiated signals to a comparator/corrector 324, which compares the signal Vo to each of the differentiated color signals dVb/dt, dVr/dt and dVg/dt, according to the following equations:

$$Vo+(b.d^2Vb/d^2t+r.d^2Vr/d^2t)=Vgc; \quad (1)$$

$$Vo+(b.d^2Vb/d^2t+g.d^2Vg/d^2t)=Vbc; \quad (2)$$

$$Vo+(r.d^2Vr/d^2t+g.d^2Vg/d^2t)=Vrc; \quad (3)$$

$$Voc=Vbc+Vrc+Vgc, \quad (4)$$

where b, r and g are correction constants; Voc is the corrected output of the optical system 300; Vbc is the corrected blue light signal; Vrc is the corrected red light signal; and Vgc is the corrected green light signal.

Thus, since no color splitters have been used to split the incoming light beam, the intensity of the light beam is not diminished, therefore allowing for a better color resolution even in dimly lit places. The light path 310 could be a fiber optic, which allows the placement of the color lens systems 315, 316 and 317.

Considering now the lens systems 315, 316 and 317 in greater detail in connection with FIG. 10. These lens systems are generally similar in structure, and therefore, only the lens system 315 will be described hereinafter in greater detail. The blue lens system 315 includes three adjustable shutters 315A, 315B and 315C, whose adjusting mechanism (not shown) is coupled to the feedback system 322, for controlling and adjusting the opening of these shutters 315A, 315B and 315C.

In the preferred embodiment, the blue lens system 315 has a generally circular periphery, and the shutters, such as the shutter 315A are pie-shaped, and are designed to rotate around the central axis of symmetry of the lens in the direction of the arrows A and A'. In this manner, the rate of change of the shutter opening is proportional to the arc 315H, and hence to the central angle 315G. The feedback system 322 correlates the angular velocity of the blue lens system 315 to the shutter's central angle of opening, thus providing an additional degree of freedom for the movement of the lens.

If for instance, the change in amplitude is too large for the feedback system to mechanically control the opening of the shutter 315A which reaches its maximum opening limits, the feedback system 322 can control the angular velocity of the blue lens system 315 to make up for the mechanical limitations of the shutter 315A. In the above example, the angular velocity Wb is decrementally reduced to the next lower angular speed or even to a lower angular speed, such that Wb remains proportional to the frequency of the blue light. The correlation between the angular speed Wb, the central angle 315G and the signal amplitudes is calculated and implemented by the feedback system 322, which uses a conventional central processing unit CPU (not shown).

Each shutter, such as the shutter 315A, can be adjusted independently from the other shutters 315B and 315C. It should however be understood that all three shutters can be synchronized and adjusted by the same angular adjustment, or by an angular adjustment proportional to the respective color frequencies.

Turning now to FIGS. 11 and 12, there is illustrated two enlarged top and side views of the blue lens system 315 along the line K—K. The blue lens system 315 includes a shutter section 330 and a lens section 333 which are generally superposed. Both the lens section 333 and the shutter section 330 rotate about the central axis of symmetry 334.

Considering now the lens section 333, it generally includes a single disc, which accommodates three pie-shaped, generally similarly designed blue filter lenses 335, 336 and 337, which are alternately separated by three transparent sections 338, 339 and 340. Thus, the impinging light is allowed to pass through, and be filtered by the filter lenses 335, 336 and 337, and also to pass, unfiltered, through the transparent sections 338, 339 and 340. Each lens system can have only one lens and one shutter.

The shutter section 330 is superposed atop, or, in the alternative, below, the lens section 333, to block the passage of the impinging light beam along the path 310, and to allow its passage through the transparent sections 338, 339 and 340, and in selected sections of the lenses 335, 336 and 337. Thus, the shutter section 330 includes a disc which accommodates the three opaque shutters 315A, 315B and 315C, which are alternately separated by three transparent sections 340, 343 and 343.

As illustrated in FIG. 11, the shutter section 330 partially covers the lens section 333 to allow for a partial passage and filtering of the light beam through the filter lenses 335, 336 and 337. During the next cycle, when the blue lens system 315 is rotated by 360 degrees, the opaque shutter 315A can be rotated clockwise or counterclockwise, in the direction of the arrow A' or A respectively, to either decrease or increase the amount of light passing through the lens 335.

It should also be understood that a correcting filter section, not shown, could also be added as yet another section, below the lens section 333 to further correct the blue color filtering. This correcting blue filter section is similarly designed to, and is caused to rotate in coordination with the blue lens section 333. Other correcting red and green filter sections can be similarly added to the respective red and green lens sections.

As described above, the angular rotation Wb of the blue lens system 315 is proportional to the blue light frequency, while the opening of the shutter 315A is a function of, or proportional to the amplitude of the preceding blue signal. In the preferred embodiment, each sampled signal operates as a template for the next signal. Thus, the opening of the shutter 315B is a function of the amplitude of the signal allowed to pass, i.e. sampled by, the shutter 315A.

In the alternative, the adjustment of the shutter opening is made as a function of, or proportional to, the difference in amplitude between the previous two signals of the same color. For example, the opening of the shutter 315C is made as a function of the difference in signal between the amplitudes of the two blue signals sampled by the shutters 315A and 315B, that is as a function of the difference in the actual openings of the shutters 315A and 315B.

It should be understood that while the shutters 315A, 315B and 315C can be adjusted to have the same openings in any one cycle, the preferred embodiment allows for independent shutter openings, that is the feedback system 322 controls the shutters 315A, 315B and 315C independently.

As it has become clear from the above description, the amplitude of the signal (or shutter opening) is a function of the differential signal of the same color with respect to time. Consequently, the blue lens system 315 simultaneously provides for a differential of the sampled signals, both with respect to time using the shutters 315A, 315B and 315C, and also with respect to the angular velocity of the lens system 315 itself. Each one of these two differential signals serves a different function, as will be described below.

Conventionally, a color picture is produced on the television monitor by juxtaposing the green, red and blue pixels next to one another to produce the desired final color. The light spectrum is treated as a linear spectrum where the colors change frequencies from one end of the spectrum to another.

The present invention describes a novel three dimensional frequency spectrum, with an application relating to the present invention, and with prospective applications relating to laser monochromatic (hologramic) imaging, three dimensional television and single pixel television monitors (as opposed to the conventional three-pixel screen).

FIG. 14 illustrates a three-dimensional coordinates system and a vectorial representation of the new three dimensional color spectrum. The vectorial units i, j and k are not necessarily equal. In the preferred embodiment, these vectorial units are proportional to the color frequencies they are associated with. For instance, the magnitude or value of the vectorial unit i is proportional to the frequency of the red color. In this manner, the three dimensional output vector Wo is equal to the vectorial sum of the blue, red and green vector components as indicated in the following equation, where Wo, i, j and k are vectors:

$$Wo = Wr.i + Wg.j + Wb.k. \tag{5}$$

In this equation, Wr, Wg and Wb represent the angular speeds of the lens systems 316, 317 and 315 respectively. Therefore, the absolute value of the resulting output vector Wo represents the frequency of the final mixed color, such as yellow. The resulting vector is periodically calculated.

The next three dimensional output vector W1 is calculated as follows:

$$W1 = Wo + W'o, \tag{6}$$

where W'o is the is vectorial shifting, along the three dimensional color spectrum. The vector W'o has three B, R and G components W'ob, W'or and W'og respectively. Each one of these components is calculated as follows:

$$Wob = W'b/Fb, \tag{7}$$

$$Wor = W'r/Fr \text{ and} \tag{8}$$

$$Wog = W'g/Fg. \tag{9}$$

In the above equations, Fb, Fr and Fg are the respective selected frequencies of the blue, red and green lights respectively. W'b, W'r and W'g are differential values, with respect to the blue, red and green color frequencies respectively, of the impinging light signal. These differential values W'b W'r and W'g are reflected by the differences in the angular speed of the blue lens system 315, red lens system 316 and the green lens system 317 respectively. As described above, the feedback system 322 controls the angular rotation of the lens systems 315, 316 and 317, as a result of the signals Vb, Vr and Vg from the pickup tube 321.

Hence, the B, R and G components W'ob, W'or and W'og are measured by calculating the angular speed differences between two sampling events. For example, if the angular speed of the blue lens system 315 has not changed between two sampling events, i.e. the angular speed Wb remains unchanged, then the B component Wob of the vector W'o is equal to zero. If on the other hand, the angular speed Wb changes, it does so in proportion to the frequency of the blue light.

The above description on how to measure the vectorial frequency shift is an important aspect of the present invention, in that it enables to locate the frequency of any changing colors in the impinging light ray, within the three dimensional light spectrum.

To better explain the results achieved by this inventive process, it should be explained that the scenes captured by the camera 300 are generally composed of a background and of a moving character, such as a moving train. A scene as defined herein is composed of a series of frames with a generally similar background. If the background changes, the scene is said to have changed.

Let us take for instance an unchanging or fixed background (i.e. a building), and let us consider that a train or some other character (i.e. an animal or a person) is expected to enter the scene after a few frames. While the camera is shooting the fixed background, the pickup tube 306 captures the background scene, and the signals Vbc, Vrc and Vgc as well as the vector Wo are used to enhance the background colors captured by the pickup tube 306. The background colors remain unchanged for several frames until the entering of the character into the scene. The unchanged background colors are reflected by the fact that the components W'b, W'r and W'g are equal to zero (or are within a predefined tolerance range). When the moving character enters the scene, the components W'b, W'r and W'g change according to the colors of this character.

Thus, if the original color of the particular location of the background is pink and the character color is blue, the mixture of the components W'b, W'r and W'g changes are reflected by corresponding changes in the angular speeds of the lens systems 315, 316 and 317.

It will be understood to those skilled in the art after reviewing the present description that the angular speeds Wb, Wr and Wg of the lens systems 315, 316 and 317 can be simultaneously synchronized with the speed of the frame processing as well as with the frequencies of the respective light colors.

It will also be understood that the pickup tube 306 can be replaced by a conventional camera, and that the mirror 305, the lens systems 315, 316, 317, the pickup tube 321, the feedback system 322, the differentiator 323, and the comparator/corrector 324 can be added to a conventional camera to enhance its imaging processing capability.

It therefore remains to determine the intensity or brightness of the colors exiting the lens systems 315, 316 and 317. FIG. 15 illustrates a three-dimensional coordinates system and a vectorial representation of the new three dimensional color spectrum. The vectorial units l, m and n are equal unitary vectors. The components of the resulting amplitude vector Ao are represented by the values Ab, Ar and Ag, which coincide with, or are proportional to, the openings of the B, R and G shutters 315A, 316A and 317A respectively, and thus they are proportional to the angles 315G, 316G and 317G through which the impinging light beam passes.

In this manner, the three dimensional output vector Ao is equal to the vectorial sum of the blue, red and green vector components as indicated in the following equation, where Ao, k, l and m are vectors:

$$Ao = Ar.l + Ag.m + Ab.n. \tag{10}$$

Therefore, the absolute value of the resulting output vector Ao represents the intensity of the final mixed color.

As with the resulting vector Wo, the resulting vector Ao is periodically calculated.

The subsequent three dimensional output vector A1 is calculated as follows:

$$A1 = Ao + A'o, \tag{11}$$

where A'o is the vectorial shifting, along the three dimensional coordinates (FIG. 15) of the color spectrum. The vector A'o has three B, R and G components A'ob, A'or, and A'og respectively. Each one of these components is calculated as follows:

$$Aob = A'b, \quad (12)$$

$$Aor = A'r, \text{ and} \quad (13)$$

$$Aog = A'g. \quad (14)$$

In the above equations A'b, A'r and A'g are differential values, reflected by the variations in the shutters openings. Hence, the B, R and G components A'ob, A'or and A'og are measured by calculating the difference between two consecutive opening of the shutters.

The above description on how to measure the vectorial amplitude shift is an important aspect of the present invention in that it enables to locate the amplitude of any changing colors in the impinging light ray, within the three dimensional light spectrum.

Knowing the frequency and intensity of the final resulting signal, this signal could be reconstructed and then transmitted to a single frequency-sensitive pixel, as opposed to the conventional three-pixel system. As a result, the resolution of the television monitor is improved substantially.

Let us consider the three dimensional light spectrum in greater detail. In a conventional linear light spectrum colors have been assigned a particular range of frequencies of for that matter wavelengths, as follows:

Violet: 3,800 to 4,500 Angstroms;

Blue: 4,500 to 5,000 Angstroms;

Green: 5,000 to 5,800 Angstroms;

Yellow: 5,800 to 5,950 Angstroms;

Orange: 5,950 to 6,200 Angstroms; and

Red: 6,200 to 7,675 Angstroms.

In the present three dimensional light spectrum, three color frequencies, such as blue, red and green are selected as the three basic colors from which other colors can be reproduced, similar to conventional mixing methods. In the present invention however, the blue color can be assigned a single reference wavelength such as 4,750 Angstroms=[C/Fb], where C is the speed of light); the red color can be assigned another single reference wavelength such as 7,000 Angstroms=[C/Fr]; and the green color can be assigned yet another single reference wavelength such as 5,500 Angstroms= [C/Fg].

As described above, the unitary vectors i, j and k, would then have an absolute value of 7,000 Angstroms, 5,500 Angstroms and 4,750 Angstroms respectively. The resulting Wo would then be expressed in terms of these unitary vectors as indicated in equation (5).

Consequently, it would not be necessary to mix the colors, since the final or resulting frequency can be express as a function of the three coordinate frequencies, but rather calculate the resulting frequency and then reproduce it.

It will be understood that other color frequencies can be selected to be the reference frequencies in the three dimensional spectrum. It should also be understood that two three dimensional spectra can be used, each having different reference frequencies, and that the second spectrum can be used as a parity check, in order to ascertain that accuracy of the resulting colors using the first spectrum. In case of disparity between the first and second resulting colors, conventional methods can be used to approximate the final color.

In certain instances, such as in cameras used in the photography of celestial bodies, it will be important to also capture the infra-red and ultra-violet rays. The present three dimensional light spectrum can be extended to cover the infra-red and ultra-violet frequency ranges as well.

Returning now to FIG. 9, a single ray of light enters and is processed by the three lens systems 315, 316 and 317. In certain instances, the light ray passes simultaneously through the filter lenses of the lens systems. Two correction possibilities are available. The first is to cause to the CPU in the feedback system 322 to ignore such overlap, since the position of the color lenses is synchronized. The second correction method is to cause the overlapping colors to be filtered out by the corresponding correcting filters.

While the invention is described herein in connection with a rotating lens systems, it should be understood that other non mechanical devices are contemplated by the invention and achieve similar results.

Considering now equations (1), (2) and (3), since the incoming light beam includes a sinusoidal component (i.e. Vr), a double differentiation of these components (i.e. $d^2Vr/d^2t$) would be proportional to the negative of the original components (i.e. $-Vr$), and thus the original component nullifies its double differentiated signal when both signals are added together.

Consequently, since the original Vo includes three B, R and G components, Vob, Vor and Vog, equations (1), (2) and (3) can be used to correct the Vo signal. Additionally the vector pair (Wo,Ao) can be used to correct the signal Vo.

FIG. 13 illustrates another embodiment for the lens system 315, which uses a generally rectangular lens 315AA instead of the pie-shaped lens of the lens system 315. The two crossed sections containing the lenses are vibrated in the directions of the arrows AA and BB to open up or close the shutters, instead of using the shutter system of FIG. 11. The entire lens system is still rotated around its axis of symmetry similarly to the lens system 315, at an angular velocity of Wbb.

It should be understood that each filtered colored beam could treated as a separate channel, and the broadcasting and modulating system described above could be used to transmit and to reconstruct the original color signals. A frequency shifter could also be added at the receiving or even the sending ends of the broadcasting system.

While the foregoing optical system has been described in connection with the optical system 300, for use with cameras, it should be noted that a similar concept could also be used as part of a monitor or screen. One way in which this could be achieved, is by reversing the directions of the signals. For instance, incoming electrical signals Voc could be fed to the COMP 324. In some applications the differentiator could be eliminated all together, in other applications, the differentiator 323 could be replaced by an integrator. The electrical signals are then transformed into corresponding light signals, and thereafter projected holographically or otherwise visually. Alternatively, the electrical signals could be sent to a flat screen monitor, or an LCD monitor, as the signal processing from Voc to the lens systems 315, 316 and 317 could be carried out remotely from the monitor (which replaces or in some applications complements the lens 301).

III. LCD MONITORS

Figure 18:
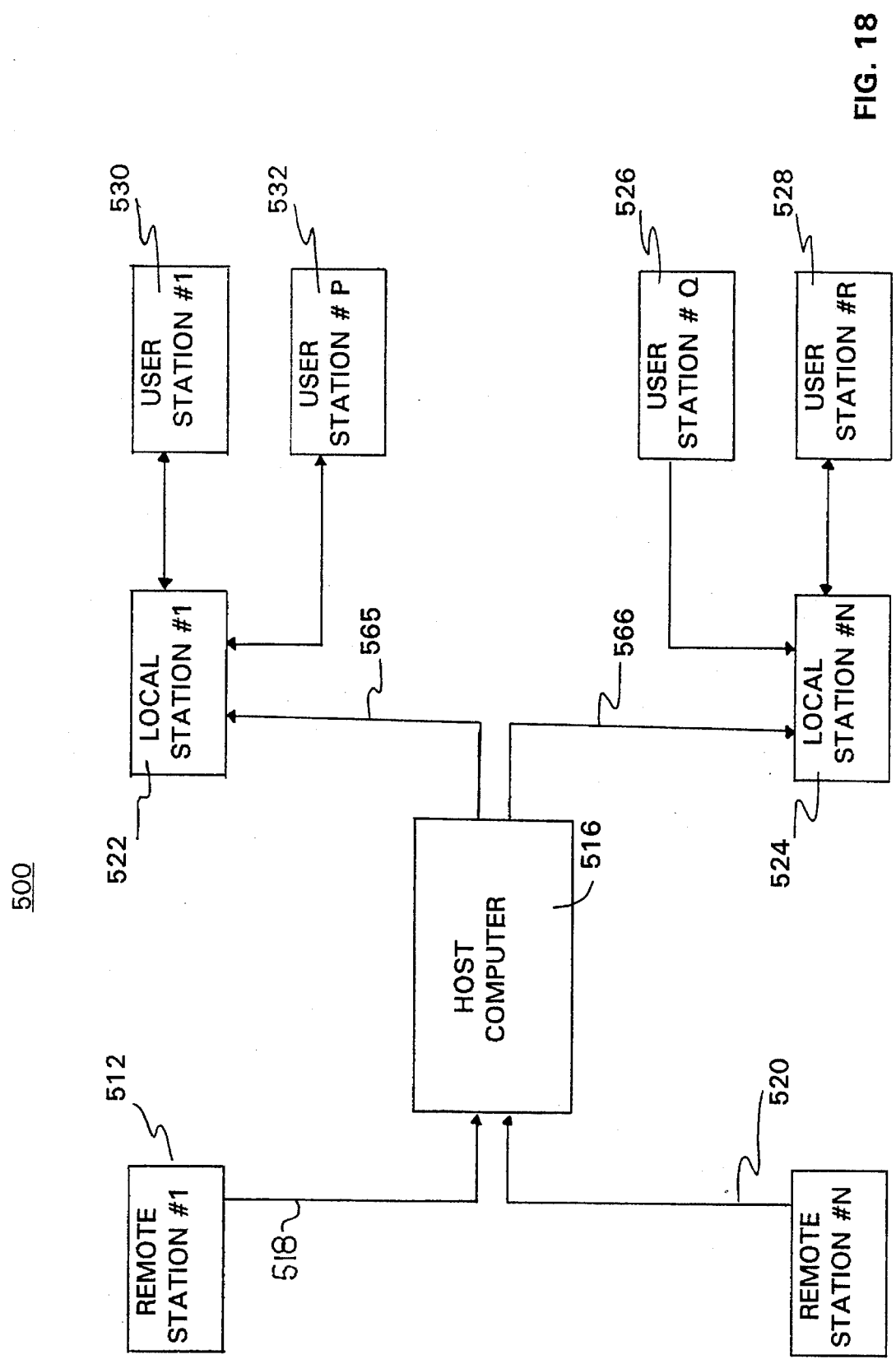
FIG. 18 illustrates a high-level block diagram of a paperless publication network in according to the present invention.

Referring now to the drawings and more particularly to FIG. 18 thereof, there is illustrated a block diagram of a paperless network 500 in accordance to the present invention. The network 500 generally includes a plurality of remote stations, such as the remote stations 512 and 514, a plurality of local stations 522 and 524, and a plurality of user stations 526, 528, 530 and 532.

At the local stations 522 and 524, the information is accessed by the users or subscribers through dedicated user stations, such as the user stations 526, 528, 530 and 532.

While only the user stations 530 and 532 are illustrated in conjunction with the local station 522, it should be understood that more than two user stations can be used in conjunction with either one of the local stations 522 and 524.

Figure 20:
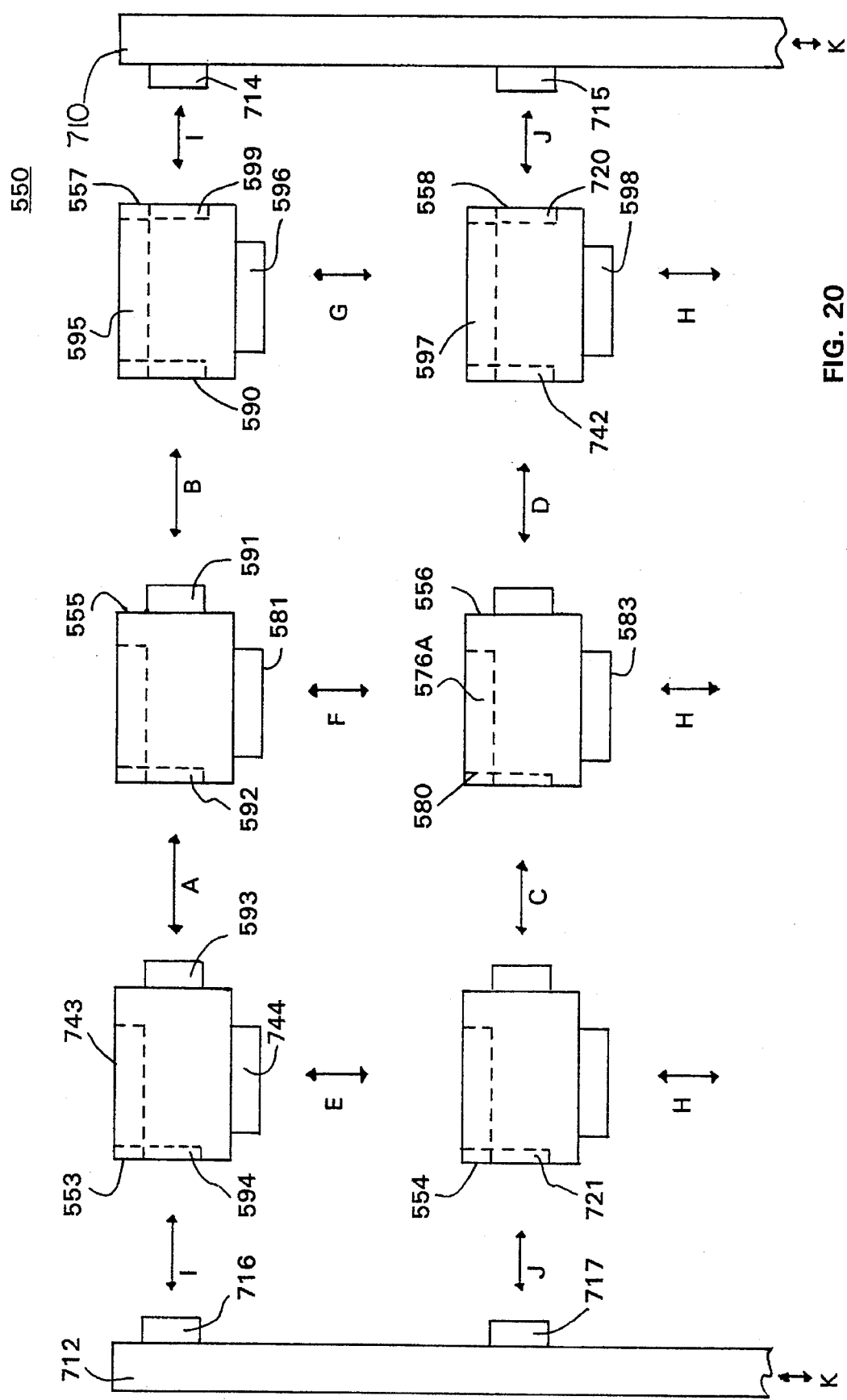
FIG. 20 is an exploded graphical representation of a plurality of screen modules and two lateral buttresses which are inter-engageable and disengageable, to form the modular monitor of FIG. 21, and for use in the teleconferencing system of FIG. 16 and the paperless-publication network of FIG. 18.
Figure 21:
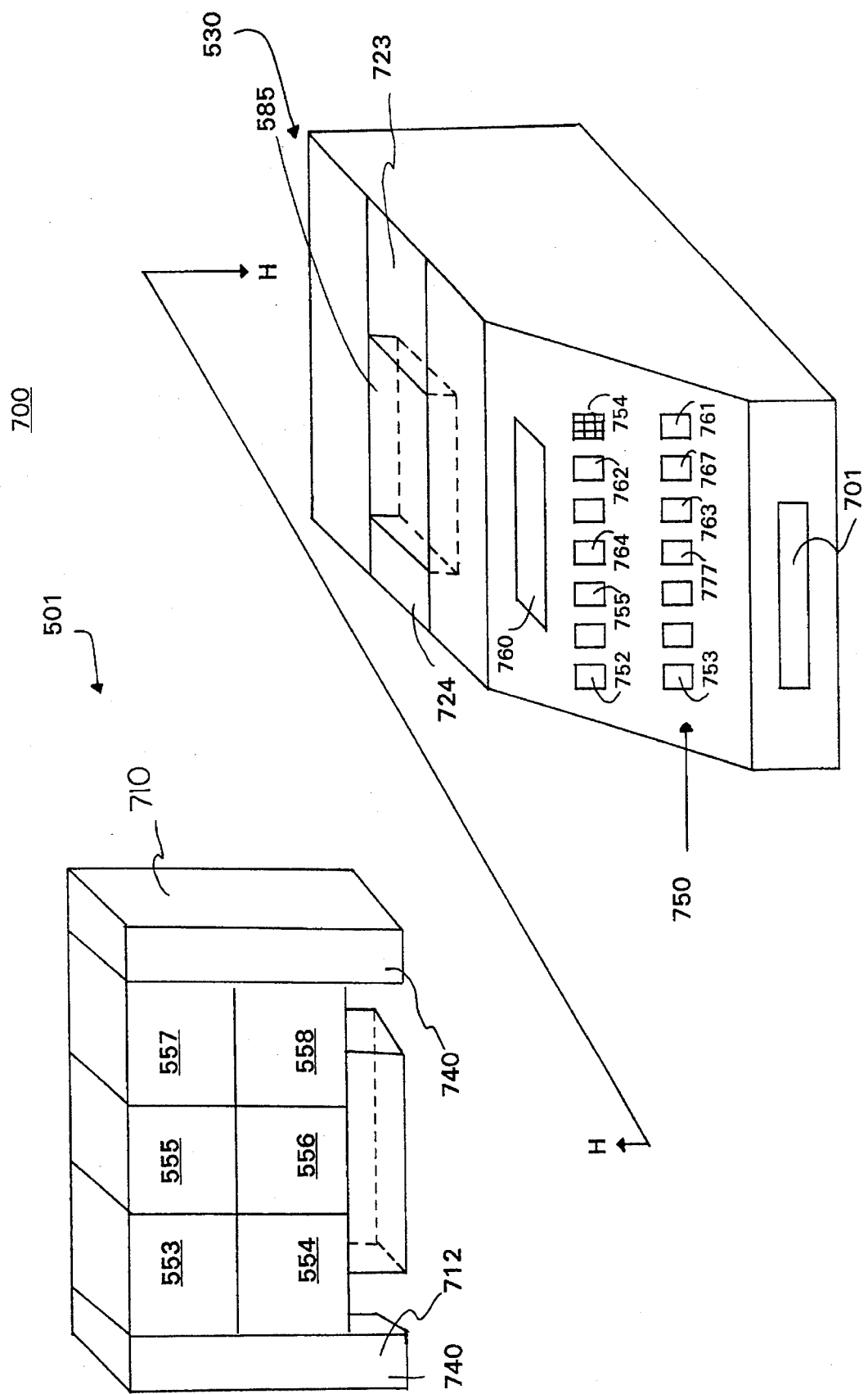
FIG. 21 is a diagrammatic perspective view of the modular monitor referred to, above, in the description of FIGS. 19 and 20.

FIGS. 20 and 21 illustrate a modular screen 550, which is interconnectable to the user station 530 to form a monitor 700. The screen 550 includes a plurality of screen modules such as the modules 553, 554, 555, 556, 557 and 558, which are engageable to one another, in the direction of the arrows A, B, C, D, E, F and G, to form the screen 550. The screen 550 is engageable to the user station 530, along the arrow H, to form the monitor 700.

In operation, the user selects the number of screen modules, such as modules 553–568, he or she wishes to use, and then interconnects them to form the modular screen 501. The user then engages the screen 501 to the user station 530 to form the monitor 700. The monitor 700 can be used as a video monitor for use in the video teleconferencing network 400, as the monitor 402-1, for video imaging. In the alternative, the monitor 700 can be used with as part of the paperless dissemination network 500, for displaying texts and graphics.

Figure 19:
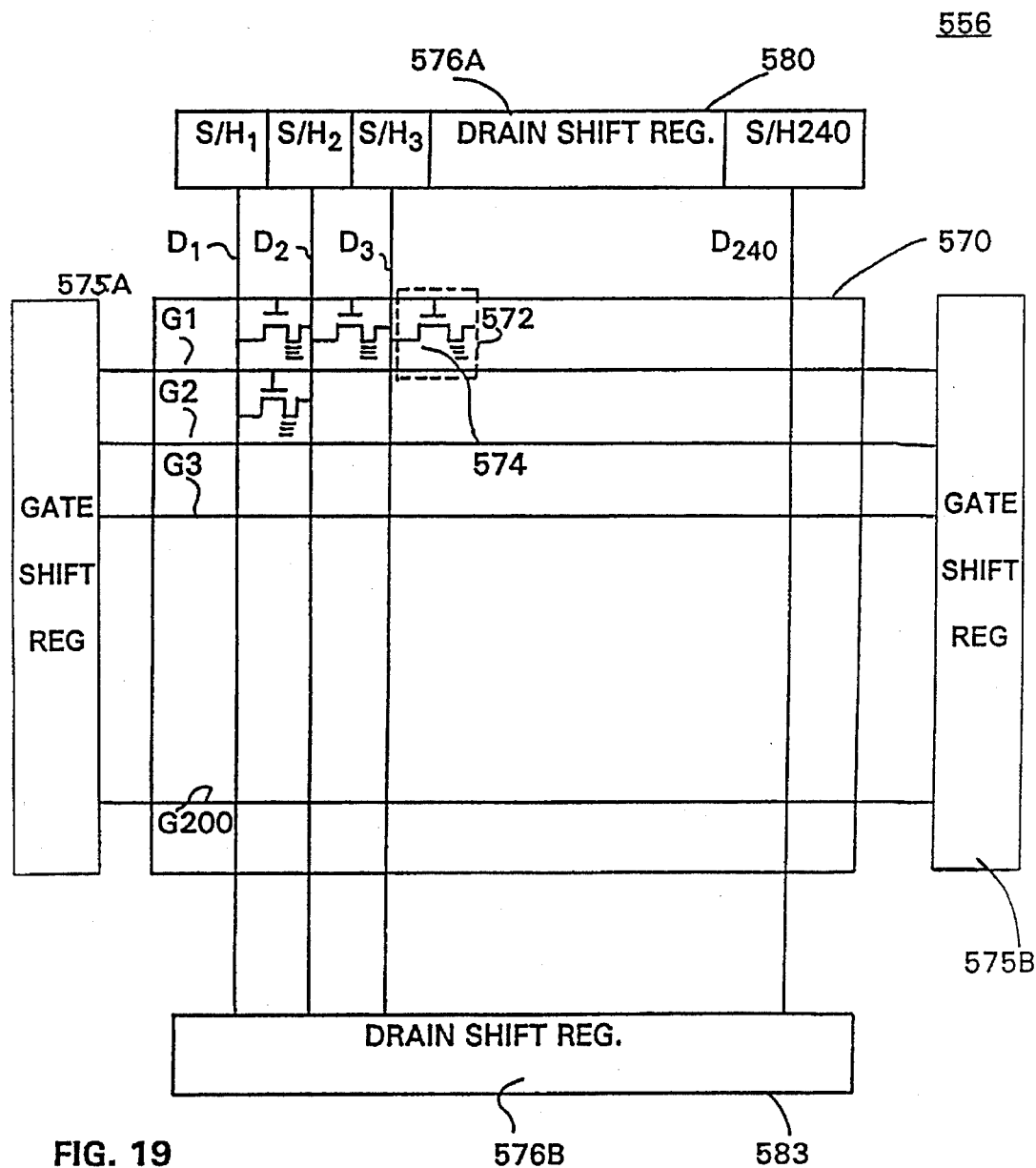
FIG. 19 is an enlarged view of the circuitry of a screen module used in a modular monitor which forms a part of the paperless publication network of FIG. 18.

Considering now a representative screen module, such as the screen module 556 in greater detail with respect to FIG. 19. The module 556 includes a liquid crystal display (LCD) 570 generally known in the art. Liquid crystals have been used for optical displays. Their optical properties change considerably by application of weak electric fields. Common liquid-crystal displays operate using the twisted nematic mode (TNM). In this mode the device rotates any optical beam by 90 degrees. The application of an electrical field changes the orientation pattern of the nematic liquid and reversibly destroys this optical rotation.

The use of both monochrome and color LCD's has become popular, especially in small personal computers and portable television receivers. The LCD is formed of a plurality of units, such as the unit 572, which is shown bordered in phantom lines in FIG. 19. Each unit includes a thin-film transistor (TFT) 574.

The operation of LCD's is not limited by the high-voltage requirements of conventional CRT's. Instead, the picture raster is constructed of a rectangular MOS switching matrix of from 240 to 600 horizontal elements and from 200 to 400 vertical elements. The gates of all the thin-film transistors (TFT's) in a given horizontal row are connected to two common busses or Gate Shift Registers 575A and 575B. Likewise, the drains of the all the transistors in a vertical column are connected to two common busses or Drain Shift Registers 576A and 576B.

It is to be understood, however, that the various principles of the present invention may be employed with any of the various types of liquid crystal materials (cholesteric, nematic or smectic) or combination thereof, including combinations with dyes.

Mechanical Interconnection: The Drain Shift Register 576A is encapsulated in a protective insulation female housing 580, such as hardened plastic to provide a mechanical socket into which a male housing 581 (FIG. 20) is engaged firmly. The housing 581 is generally similar in design and construction to the male housing 583 of the module 556. The male housing 583 houses the Drain Shift Register 576B for mechanically mating with the central socket 585 of the user station 530 (FIG. 21).

In this manner, when all the selected modules are interconnected together to form the unitary screen 501, they are also interconnected to the user station 530. As a result, the screen 501 becomes quite rigid in structure. Additional conventional mechanical locking devices can also be added to ensure that the screen in engageably locked in place with the use station 530.

Two oppositely located lateral connectors or buttresses 710 and 712 also engage the extremity modules 553, 554, 557 and 558, by means of male connectors 714, 715, 716 and 717, which engage the corresponding housings 599, 720, 594 and 721 respectively. Additionally, as indicated in FIG. 21, these lateral buttresses also engage the user station 530 via the lateral sockets 723 and 724. These lateral buttresses 710 and 712 serve as additional locking mechanism.

An additional top buttress, not shown, can also be added to engage the top modules 553, 555 and 557, and to similarly engage the top portions of the lateral buttresses 710 and 712.

The modules can be easily disengaged from the user station 530, from each other, and from the lateral buttresses 710 and 712, when the user wishes to store or to transport the monitor 700.

Electrical Interconnection: When the screen modules are mechanically interconnected, they also become electrically serially interconnected, in that the Gate Shift Register 590 of the module 557 will be interconnected to the Gate Shift Register 591 of the module 555, which in turn is intrinsically connected to the Gate Shift Register 592, which is connected to the Gate Shift Registers 593 and 594 of the module 553. In this manner, when the modules 553, 555 and 557 are engaged to one another, their gates would also become serially interconnected, as if they were a single module.

The Gate Shift Registers are electrically interconnected to the lateral sockets 723 and 724 of the user station 530, and are connected to each other in series, by means of the lateral buttresses 710 and 712. This interconnection can be implemented by electrically interconnecting only one Gate Shift Register, such as 599, in a horizontal row, to the corresponding protruding male connector 714 of the lateral buttress 710. Similarly, the Gate Shift Register 720, in a second horizontal row, is electrically interconnected to the corresponding protruding male connector 720 of the lateral buttress 710.

In the alternative, the male connectors 716 and 717 of the opposite lateral buttress 712 could also be interconnected to the Gate Shift Registers.

Each buttress 710 and 712 includes a bottom portion 740 and 741 respectively, which engages the corresponding lateral socket 723 and 724 respectively. In this manner, when the six modules 553–558 and the two lateral buttresses 710 and 712 are inter-engaged, the screen modules are expanded serially and form the unitary screen 501 which is, not only mechanically rigid, but which electrically operates as a single larger module. It should however be understood that each module can be operated independently from one another as if each module were an independent screen.

The user station 530 is therefore electrically interconnected to all the modules of the modular screen 501. The modules are also identified on a matrix basis, such that the user station can be selectively connected to one or more screens, at the will of the user.

For instance, the user can access and activate the modules 553, 556 and 557, and not activate the remaining modules. This simulated split screen feature has several applications, and enables the software program which controls the monitor 700 to easily select the desired module.

Software Interconnection: The modules 553–558 are also interconnected and controlled by means of a software program 600, illustrated by the flow chart in FIG. 23. The program 600 is stored in the user station 530, or, in the alternative, it could be loaded by means of the disc drive 701.

Figure 22:
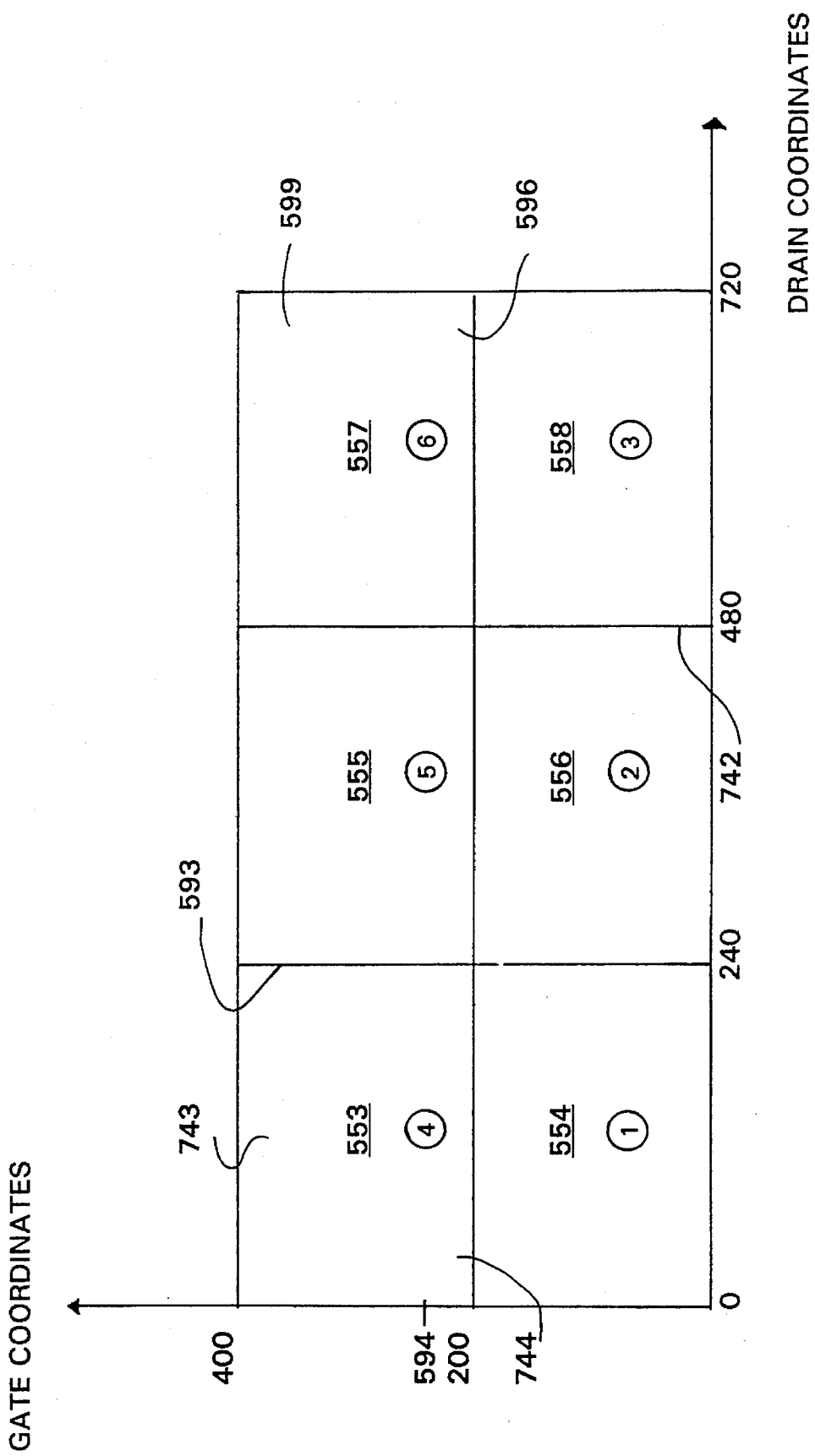
FIG. 22 illustrates a two-dimensional coordinates system on which the screen modules of FIG. 20 are represented as blocks.

Turning now to FIG. 22, there is illustrated a two-dimensional coordinates system on which the screen modules are represented as blocks, in order to show how the screen 501 is controlled by the program 600. The user instructs the user station 530 of the number of modules he or she intends to couple to the user station 530, or in the alternative, the number of modules the user wishes to activate on the screen 501. Upon this instruction, the software program 600 maps the coordinates of the drain elements along the horizontal axis of the coordinate system, and the gate elements along the vertical axis.

In this manner, the software has access to each pixel on the screen 501, and consequently, the user has a very flexible control of the screen 501. Thus, if for instance the user wishes to activate only three of the modules, such as the modules 553, 556 and 557, the user simply enters the number of the modules when instructed to do so by the program 600. In the present example, the user enters the numbers 4, 2 and 6.

The software program 600 then instructs and controls the conventional electronics of the user station 530 to display the image or information only on those selected modules. In this manner, the user can for instance view a text document on module 553, a graph on module 557, and a video display on module 556.

It should be understood that the user has control over the correlation of images to be viewed on the screen 501 and the particular module he or she wishes to view these images on. For instance, the user can ask the monitor 700 to display the text on module 556 instead of on module 553.

In the above example where the user has selected only three out of the already connected six modules, the software treats these three selected modules 553, 556 and 557, as if they were serially connected adjacent to another. In fact, depending on the selection priority or order assigned to the modules by the user, the software has the alternative to interconnect the modules in several ways, such as: (1) 553–556 –557; (2) 553–557–556; (3) 556–553–557; (4) 556–557–553; (5) 557–553–556; (6) 557–556–553.

Let us take, for illustrating purposes example (5), where the modules are connected as 557–553–556. The user station 530 will then treat or view the modules as if: (a) the Gate Shift Register 599 of the module 557 is directly coupled to the Gate Shift Register 594 of the module 553; and (b) the Gate Shift Register 593 of the module 553 is directly coupled to the Gate Shift Register 742 of the module 558.

Depending on how the user wishes to view the modules, the user can instruct the software to interconnect the selected modules 553, 556 and 557 either in a horizontal row, or stacked one above the other, or as shown in FIG. 22, or as the user wishes. For illustration purposes let use consider that the user intends to view the modules as if they were stacked. In this case, the software treats the modules as if: (a) the Drain Shift Register 596 of the module 557 is coupled to the Drain Shift Register 743 of the module 553; and (b) the Drain Shift Register 744 of the module 553 is coupled to the Drain Shift Register 576A of the module 556.

This flexibility in selecting and viewing the modules in a pre-selected order has several applications. One such application relates to the use of the monitor 700 in the video telecommunication network 400, shown in FIG. 16. Let us assume for illustration purposes that in this application, there are three sites that wish to confer. The user at the first site, selects the number of modules he or she wishes to activate, and then assigns the modules to each one of the other sites conferring with such first user. The second and third users at the other ends assign their own modules.

Additionally, the signals S1, S2 and S3 from the three sites are transmitted to the central switching system 404, and processed as explained above, and then retransmitted to the monitors 402-1, 402-2 and 402-3 at the conferring sites as separate channels. The receiver monitor then reroutes each channel to the corresponding module, as selected by the particular user.

Therefore, the user at site 1, can view his or her own picture, or text on module 553, the picture from the second site on module 556, and the picture from the third site on module 557. Additionally, there can be two or more cameras in each site, if there are more than just one person at each site, or if it is desired to take pictures of graphs or similar other documents in addition to the pictures of the conferees.

The conference can also be taped by each user by either taping the signals that are incoming from the central switching system 404, or, if editing is desired, the user can instruct the user station 530 to select the signals on the particular modules which he or she desires to tape and the user station 530 treats the signals from each module as if it were a separate channel and then transmits these signals and records them according to the above teachings.

Figure 23:
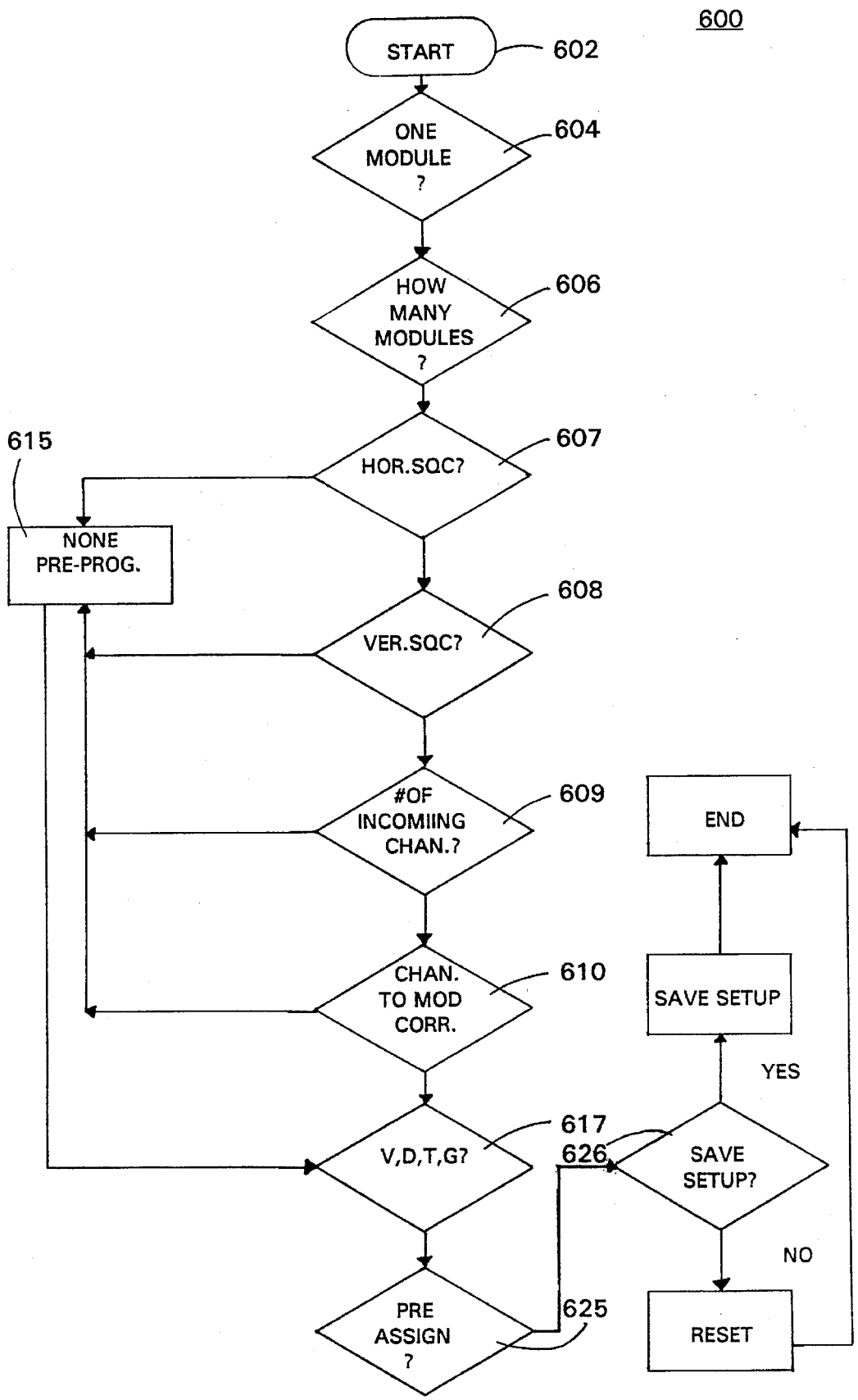
FIG. 23 is a flow chart diagram illustrating the operation of the modular monitor of FIG. 21.

Turning now to. FIGS. 21 and 23, the software program 600 is illustrated in the form of a simplified flow chart in FIG. 23, and the keyboard 750 of the user station 530 is illustrated in FIG. 21. When the user couples the screen 501 to the user station 530, the user presses a START button 752, and the software is initialized at 602. The software next automatically inquires at 604 whether there is only one module coupled to the user station 530, or desired to be activated.

If the answer is no, then the user presses the NO button 753, and the software displays the following question on a built-in screen 76: "HOW MANY MODULES!", as indicated at 606 In the alternative, the above question can be displayed on a dedicated module, such as the module 556. The user then enters the number of modules he or she wishes to activate, by using a keypad 754.

The software then displays the following question on the screen 76: "HORIZONTAL SEQUENCE OF MODULES?", as indicated by block 607. The user then enters the desired horizontal sequence of modules by using the keypad 754. In the above example, where the user wishes the following sequence of modules: 557–553–556 the user will enter the following sequence: (3,2), (1,2) and (2,1), or the following sequence, as is desired: (6,4,2). Both sequences will relate the desired horizontal module sequence to the software. The pair sequence indicates the coordinates of the module, while the second triple sequence indicates the number of the modules, as illustrated in FIG. 22.

The software then displays the following question on the screen 76: "VERTICAL SEQUENCE OF MODULES?", as indicated by block 608. The user then enters the desired vertical sequence of modules by using the keypad 754. The user will enter either one of the following sequences: (1,2), (2,1) and (3,2), or (4,2,6).

The following inquiry is then displayed on the screen 76: "NUMBER OF INCOMING CHANNELS?", as indicated at block 609. The user then enters the number of incoming channels using the keypad 754. The incoming channels refer for instance, to the channels that are being, or will be, transmitted by the central processing 404 of the teleconferencing system 400, illustrated in FIG. 16. Let us consider that the number of selected channels is three.

The software then asks the use to correlate the incoming channels to the selected modules at 610. The user then enters either one of the following sequences: (C1, 1,2), (C2, 2,1) and (C3, 3,2), or (C1,4; C2,2; C3,6). As such, incoming channels 1, 2 and 3 are assigned to modules 553, 556 and 558, respectively.

If on the other hand, the user does not find it necessary to correlate the incoming channels to the modules, as illustrated by block 611, or if the user does not have a preference for the vertical or horizontal interconnection of the modules, as indicated by blocks 612 and 614, then, as indicated at block 615, the software assigns the channels and the intermodular interconnections in a pre-programmed, pre-selected way.

In the preferred embodiment for instance, the software will sequentially assign the incoming channels to the horizontal modules first in the first row, and then to the second horizontal row, starting with module 554, i.e. module 1. In the above example, incoming channels 1, 2 and 3 will be assigned to modules 554, 556 and 558 respectively, and the upper modules 553, 555 and 557 will not be activated, unless activated by the user at a later time.

The software then asks, the user, at 617, whether the incoming channel includes video (V), graphics (G), text (T) or data (D) information. The user then presses one of the corresponding buttons 762, 763, 764 and 767 to indicate the appropriate choice, by choosing the letter of his or her choice, and by entering the following sequence using the keypad 754: (C1,V); (C2,T); and (C3,V). This sequence will instruct the user station 530 to route channels 1 and 3 through a video mechanism to process the video images, and to route channel 2 to a computer for processing the text. Both the video mechanism and the computer are well known in the art. The present invention enables the simultaneous processing of video, text, graphics and data, and to display the same on a single modular screen.

The software then asks the user whether he or she wishes to reserve one or more dedicated modules, to another incoming channel, at 625. If an unexpected channel is transmitted to the monitor 700 while the some of the modules are activated, then the monitor 700 will automatically activate a CHANNEL WAITING feature, whereby the software automatically inquires whether the user wishes to be interrupted during the teleconferencing session. If the user does not wish to be disturbed, or if all the screen modules have been assigned to incoming channels, then the software automatically responds with a busy signal to the caller.

If on the other hand, the user expects a channel call during the conference session, then the user can pre-assign one or more modules to this expected channel call. As the call arrives, then the user station 530 automatically connects the call to the spare module, such as the module 555, and the software displays the following inquiry on the screen 760: "CONNECT TO TELECONFERENCE?". If the user wishes this incoming call to be part of the teleconference, then the user presses the YES button 755, and the software automatically reroutes the incoming call to the central processing system 404, where it is processed as one of the other incoming channels.

It should be understood that a sophisticated user can bypass the inquiries at 607, 608, 609, 610, 617 and 625, and can enter the following sequence instead: (C1,V,4), (C2,T,2), (c3,V,6).

The software then asks the user, at 626, whether he or she wishes to save the setup for future use? If the answer is yes, then the same setup will be used in future module assignments, until the setup is changed or reset. If the answer is no, then the assignment values will be reset at the end of the conference as indicated by block 628.

A REASSIGNMENT button 777 at the keyboard 750 enables the user to reassign the channels to different modules during the course of the conference session.

It should be understood to those skilled in the art, after reviewing the present specification, that more than one module can be assigned to a particular channel. If for example, the user wishes to use the user station 530 to preview a text or a video recording on the screen 501, the user can select all six or more modules for such preview, and the user is not limited to a single module.

In which case, the user can for instance, assign four modules, i.e. 553, 554, 555 and 556 to view a document, and assign modules 557 and 558 to perform selective tasks to manipulate or better preview the text displayed on the modules 553, 554, 555 and 556. For example, the user can identify the coordinates of the text he or she wishes to enlarge, using the coordinate system of FIG. 22, i.e. (Drain 0, 240; Gate 200, 300) and then ask the user station 530 to display the text on the modules 557 and 558, i.e. (Drain 480, 720; Gate 100, 400). The user station will copy the identified text and enlarge it to fit the new coordinates on modules 557 and 558.

IV. PAPERLESS NETWORK

The remote stations 512 and 514 generally represent a variety of companies or individuals. While only two remote stations 512 and 514 are illustrated, it should be understood that the network 500 includes a greater number of remote stations that are not shown. Therefore, only the two remote stations will be referred to hereinafter.

The network 500 further includes a host computer or switching central processing unit 516 which is connected to the remote stations 512 and 514 via communication links 518 and 520 respectively. The host computer 516 receives the information to be published and routes it to one or more local stations, such as the local stations 522 and 524, over communication links 565 and 566 respectively. It should however be understood that the remote stations 512 and 514 can, alternatively transmit or publish the information directly to the local stations 522 and 524, directly, without passing through the host computer 516.

The local stations 522 and 524 generally represent receiving stations for storing the information to be published. While only the local stations 522 and 524 are illustrated, it should be understood that the network 500 can include more than two local stations which are not shown. Therefore, only the local stations 522 and 524 will be referred to in the following specification.

Turning now to FIG. 18, the local stations 522 and 524 generally represent receiving stations for storing the information to be published. While only the two local stations 522 and 524 are illustrated, it should be understood that the network 500 can include note than two local stations. At the local stations 522 and 524, the information can be accessed by the users or subscribers through dedicated user stations, such as the user stations 526, 528, 530 and 532.

In operation, the publisher of the printed publications, such as a newspaper publishing company sends the information (publication) to be published over the remote station 512 via the host computer 516 to selected ones of the local stations 522 and 524, until subsequently updated by the published companies.

When the user wishes to retrieve the published information, he or she inserts a memory device, such as a floppy disc or a compact disc into the local station 522, and uplinks an interface software program from the disc to the local station. The interface software includes the user's identification number and the identification of the publications he or she is allowed to access.

In the alternative, the interface software can include credit information of the user, so that, if the user is not a subscriber, his or her address and other credit information are automatically downloaded to the local station 522 for future billing.

The user then interfaces with the local station 522 and downlinks the selected publications from the local statio 522 to the disc. The publication could then be previewed by inserting the disc into the drive 701 (FIG. 21) of the user station 530, and the user operates the monitor 700 as described above in relation to the modular screen 501.

Considering now the local station 522 in more detail, it is generally located at locations which are readily accessible to the users, such as at the outside of building structures. The local station 522 generally includes a memory drive for receiving the memory device, such as the floppy disc, and a central processing unit (not shown).

A plurality of function keys permit the user to control his or her own access to the selected publications. A series of light or visual indicators indicate the status of the local station during the transfer of information to the memory disc. A storage memory retains the published information for a predetermined period of time. Periodically, the published information is erased from the memory and updates.

V. PROGRAM DELIVERY SYSTEM WITH DIGITAL COMPRESSOR AND ENCODING/DECODING SCHEMES

Video channels are becoming a rare commodity, as the demand for video channels continuously increases, and the need to compress the video signals is becoming inevitable. Several video compression methods have been proposed. However, none has satisfactorily, efficiently and simultaneously compressed video, audio and data (VAD) signals.

The present invention presents new methods for compressing video signals, as well as for simultaneously compressing video and non-video signals (such as audio and data). As video and non-video signals are increasingly becoming uniformly digitized, the difference between the VAD signals is expected to be gradually minimized. Wherefore, the new compression methods provide an efficient alternative by which the VAD signals are treated uniformly and in a similar manner, without distinguishing the source of the signals.

Additionally, as computers or signal processors are becoming increasing common and popular, they will become more instrumental in the regulation of the VAD signals and transceiving methods and apparatus, and in interfacing therewith.

The present invention achieves three main purposes: (1) provides efficient video and non-video compression techniques; (2) provides uniform VAD compression techniques; and (3) allows for computers to interface with VAD telecommunications equipment in multimedia devices.

In addition to telecommunications applications, the present invention could be used in several other fields (i.e. medical), where VAD signals are used.

The signals (video or non-video) are fed into a transformer (i.e Fourier transformer), which separates the signals into several transforms of different frequencies (i.e. sinusoidal). If the incoming signals are video signals, only the most desirable video transforms are selected and used, and the rest of the signals are discarded.

If the incoming signals are non-video signals, after they are transformed as mentioned above, they are modulated on video signals, and are treated as if they were video signals. It is important to note that while the description mentions modulation over video frequencies, we could similarly select non-video frequencies (i.e. microwave), and modulate the VAD signals on these non-video frequencies.

Once the VAD signals are rendered uniform, they are digitized, multiplexed, and transmitted. The receiver end will reverse the functions at the transmitter end, in order to restore the original signals. Since the signals are digitized, they can be easily controlled by a processor or a computer.

Figure 24:
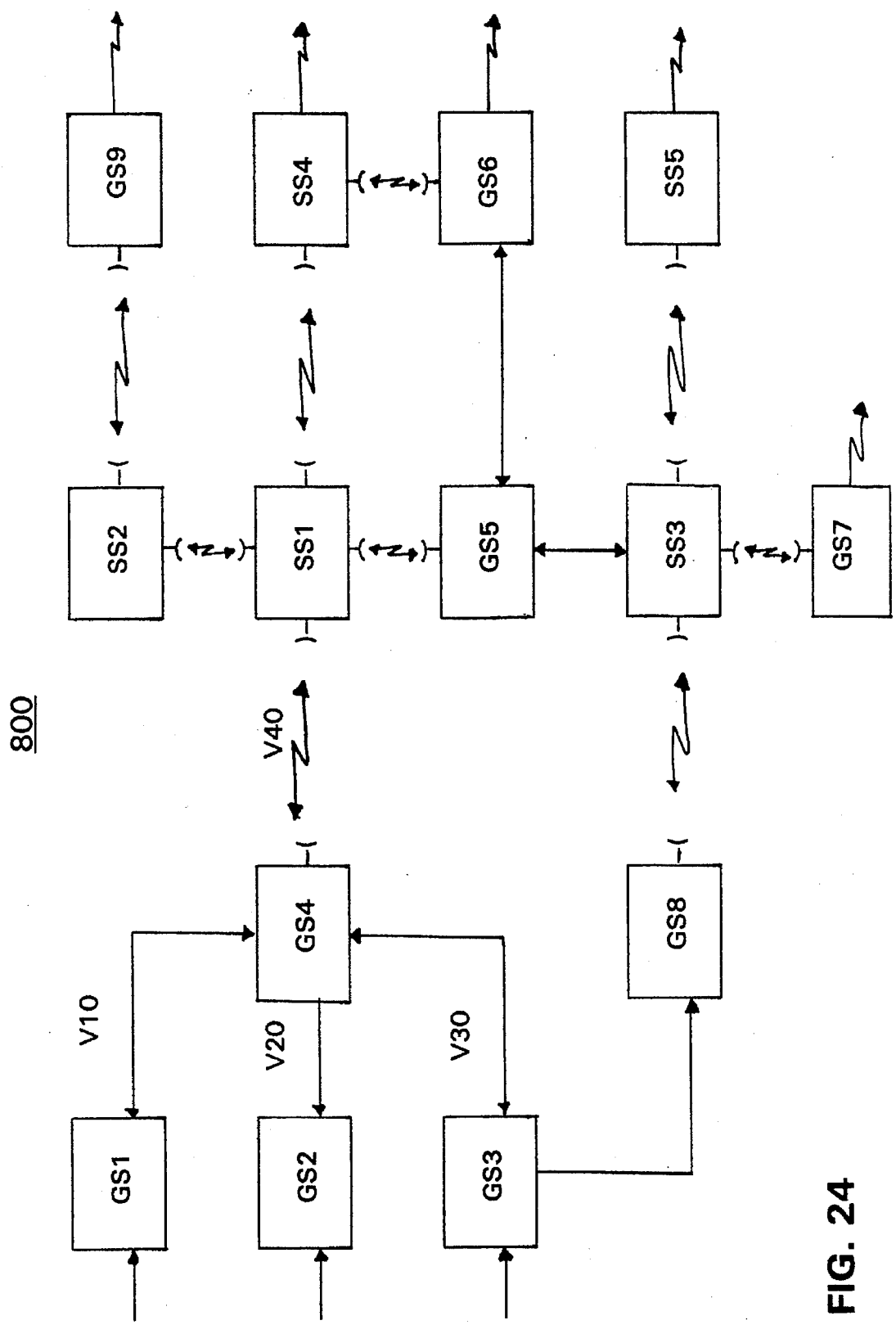
FIG. 24 is a block diagram representation of an architecture for a Program Delivery System (PDS) according to the present invention, showing a plurality of ground stations (GS) and a plurality of satellite stations (SS) interlinked according to the present inventive compression scheme.

Prior to describing the inventive Program Delivery System (PDS) 800 in detail, it would be beneficial to cover the corresponding drawings, in a cursory manner, to provide the reader with an overall understanding of the PDS 800. Referring now to FIG. 24, there is illustrated an architecture, in block diagram format, of the preferred embodiment of the program delivery system (PDS) 800 according to the present invention. The PDS 800 includes a plurality of ground stations indicated by the letters "GS", and a plurality of satellite or space stations indicated by the letters "SS". These ground and satellite stations are interconnected by conventional telecommunications links, such as by cable, satellite and/or microwave links.

A primary objective of the PDS 800 is to provide the capability to simultaneously transmit multiple channels of video, audio and data information at various degrees of compression through existing ground and satellite transponders, including existing cable and television plants. The PDS 800 will be compatible with existing C and Ku Band satellite transmission technologies, including but not limited to two degrees spacing.

Figure 25:
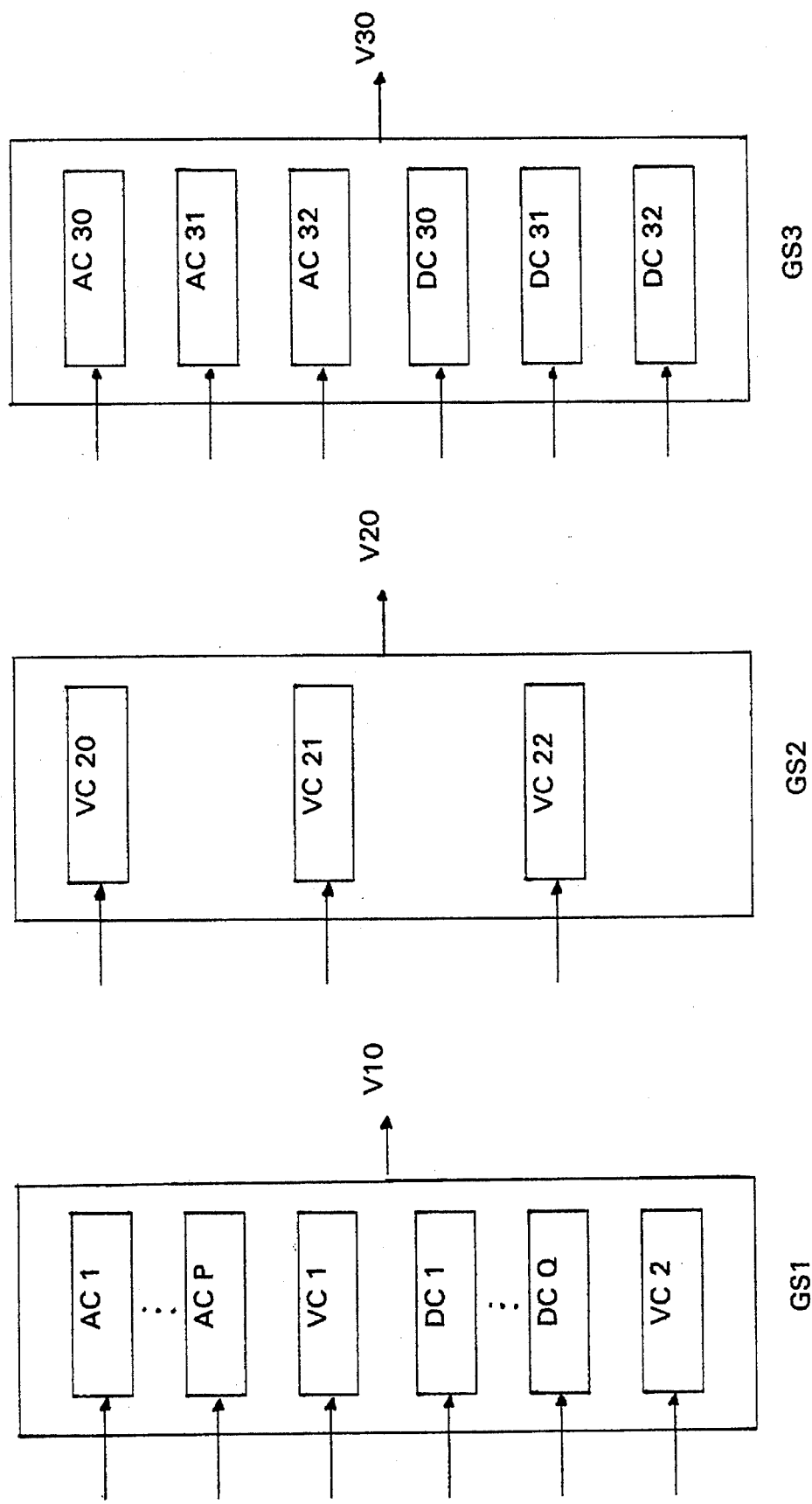
FIG. 25 is a more detailed block diagram representation of three exemplary ground stations $GS_1$, $GS_2$ and $GS_3$ which are part of the PDS of FIG. 24.

FIG. 25 provides illustrative details of three exemplary ground stations $GS_1$, $GS_2$ and $GS_3$ in a simplified block diagram form, where the letters "AC", "VC" and "DC" refer to audio channels, video channels and data channels, respectively. According to a particular aspect of the present invention, each ground station or satellite station has the capability to receive and process a combination of multiple audio, video and data channels in any desired combination, and to a desired degree of compression. For instance, ground station $GS_1$, as illustrated in FIG. 25, receives and processes two video channels $VC_1$ and $VC_2$, several audio channels $AC_1$ through $AC_P$, and several data channels $DC_1$ through $DC_Q$. Ground station $GS_2$ receives and processes three video channels $VC_{20}$, $VC_{21}$ and $VC_{22}$, but no audio or data channels. Ground station $GS_3$ receives and processes three audio channels $AC_{30}$, $AC_{31}$ and $AC_{32}$, and three data channels $DC_{30}$, $DC_{31}$, and $DC_{32}$, but no video channels.

FIG. 26 further illustrates the composition of the audio channels $AC_1$, $AC_2$, and $AC_3$. Each audio channel, such as the audio channel $AC_1$, accommodates one or more incoming audio signals from independent sources, such as the audio signals $A_1$ through $A_4$. Audio channel $AC_2$ accommodates audio signals $A_1$ through $A_8$, and audio channel $AC_3$ accommodates audio signals $A_5$ through $A_{12}$. It will be understood to those skilled in the art after reviewing the present description that each audio channel can comprise a significantly greater number of incoming audio signals. The sources of the incoming audio signals $A_1$ through $A_{12}$ may be studio, off-air, or industry standard common carriers which are delivered or locally generated.

Figure 27:
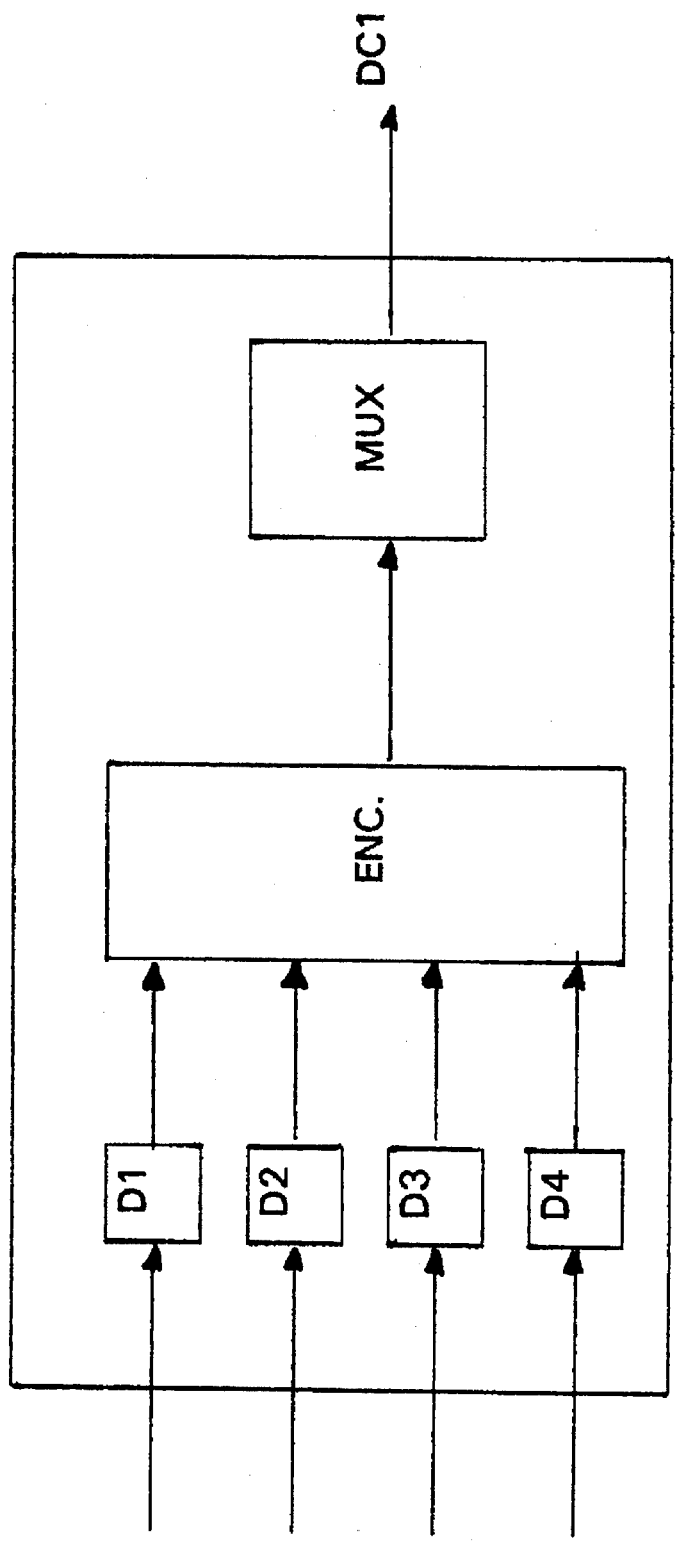
FIG. 27 provides details, in a block diagram form, of a data channel $DC_1$ in the ground station $GS_1$ of FIG. 25.

Similarly, FIG. 27 shows the data channel $DC_1$ as accommodating four incoming data signals $D_1$ through $D_4$. It should however be understood that additional incoming data signals can be processed through data channel $DC_1$. The sources of the incoming data signals $D_1$ through $D_4$ may be industry standard asynchronous data transmission.

Figure 28:
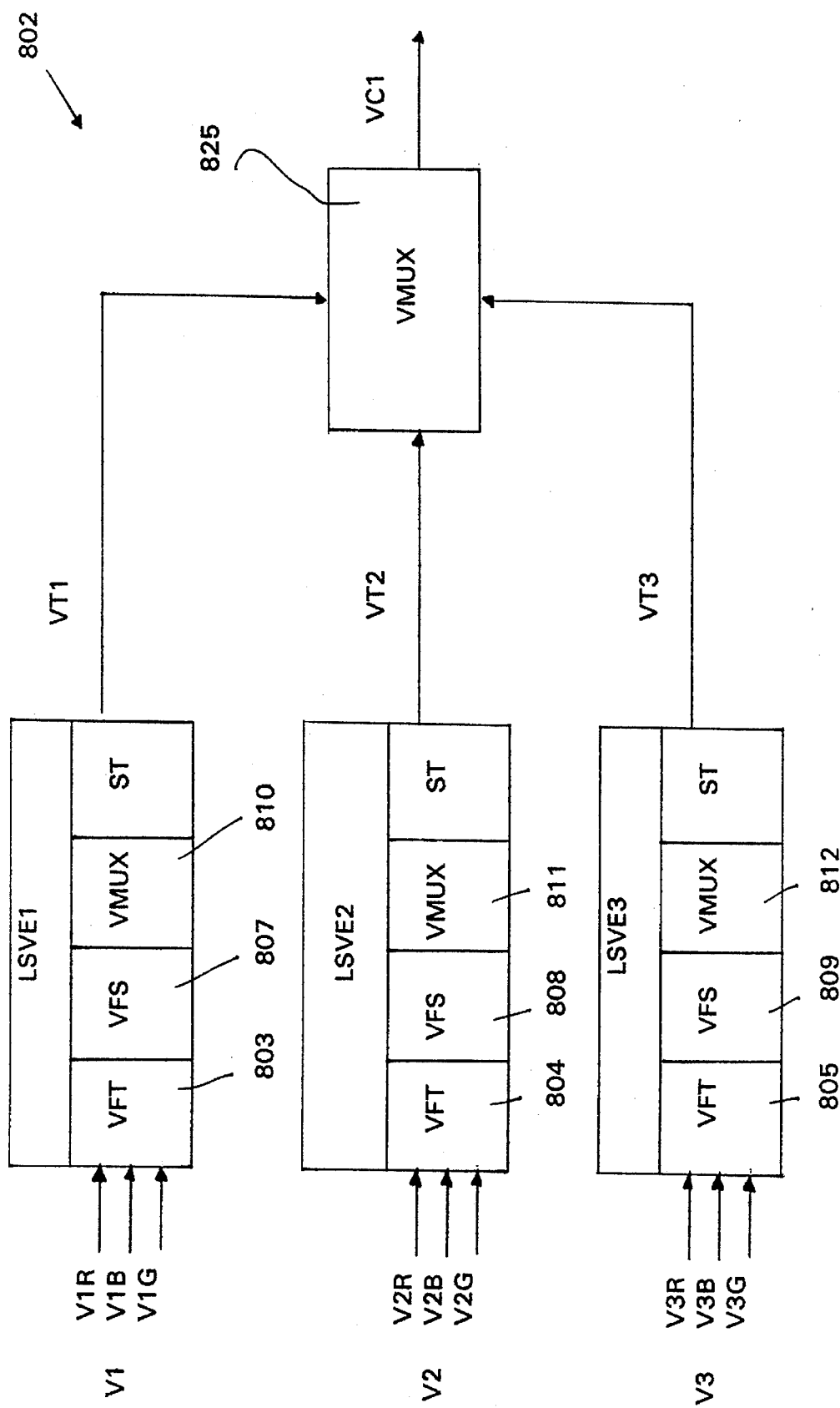
FIG. 28 provides details, in a block diagram form, of a video channel $VC_1$ in the ground station $GS_1$ of FIG. 25.

FIG. 28 illustrates the video channel $VC_1$ as accommodating three incoming video signals $V_1$ through $V_3$, but additional video signals may also be added according to the teachings of the present invention.

Figure 29:
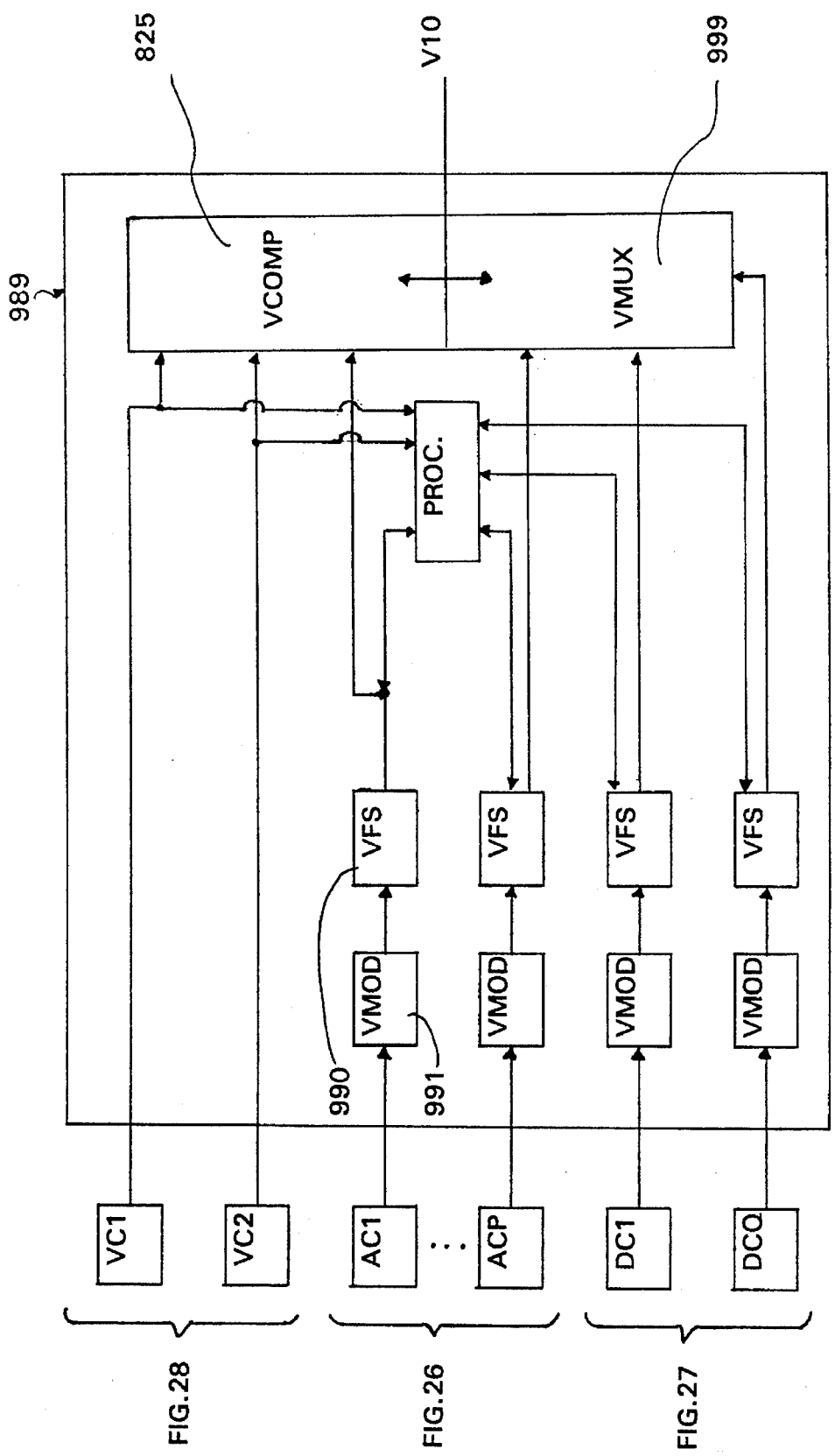
FIG. 29 is a partial block diagram architecture of the ground station $GS_1$ of FIG. 25, showing a Central Video Switching Exchange (CVSE) constructed according to the present invention.

FIGS. 29 and 30 provide additional details of the ground station $GS_1$ of FIG. 25, and illustrate the interdependence of the video, audio and data channels $VC_1$, $VC_2$, $AC_1$ through $AC_P$, and $DC_1$ through $DC_Q$. These figures illustrate an important aspect of the present invention, namely that the video, audio and data signals are compressed through the selective allocation of video harmonic frequencies, and that the audio and data channels are modulated at video frequencies and treated as if they were video channels. The bandwidth of the video channels will enable high quality compression of a significant number of audio and data channels. FIG. 29 shows a central video switching exchange (CVSE) 989, which allows for the compression, modulation and multiplexing of the video, audio and data signals, as shown in the marker channels of FIG. 30.

The processing of the video, audio and data signals will now be described in detail.

Processing of Video Signals

Considering now the video channel $VC_1$ of the ground station $GS_1$ in FIG. 25 in greater detail with respect to FIG. 28, it includes three exemplary incoming video signals $V_1$, $V_2$, and $V_3$ of the RGB type. It should however be understood to those skilled in the art after reviewing the present specification, that other combinations of incoming video signals are contemplated within the scope of the present invention. While the present specification describes the modulation of the audio and data signals over R, G, B video (RF) frequencies, it should be understood that other frequencies in another appropriate frequency range can be alternatively selected. For illustration purposes only, and without limiting the scope of the invention, the following video input specifications can be used:

| 1. NTSC | |
| --- | --- |
| Impedance: | 75 ohms |
| Level: | 1.0 V ±0.3 $V_{p-p}$ |
| Sync: | Negative |
| Return Loss: | Greater than 30 dB |
| Level Adjust: | ±3 Db |
| 2. RGB | |
| Inputs: | 1 for each R, G, B |
| Impedance: | 75 ohms |
| Level: | G 1.0 V ±0.3 $V_{p-p}$ |
| | R, B 0.7 V ±0.2 $V_{p-p}$ |
| Sync: | on G only, Negative |
| Return Loss: | Greater than 30 Db |
| Level Adjust: | ±3 Db |
| 3. Y/R-Y/B-Y | |
| Inputs: | 1 for each Y, R-Y, B-Y |
| Impedance: | 75 ohms |
| Level: | Y 1.0 V ±0.3 $V_{p-p}$ |

-continued

| | |
| --- | --- |
| | R-Y, B-Y 0.7 V ±0.2 $V_{p-p}$ |
| Sync: | on Y only, Negative |
| Return Loss: | Greater than 30 dB |
| Level Adjust: | ±3 dB |

More particularly, for cable television (CATV) applications, the CATV headend unit conforms to short haul specifications, and the consumer units conform to medium haul specifications. Additionally, the frequency response and other characteristics of the CATV headend units of two exemplary video types (NTSC and RGB) could conform to the following specifications:

| 1. NTSC | |
| --- | --- |
| Frequency Response: | ±0.25 dB to 4.2 MHz |
| | -3 Db at 5.0 Mhz |
| | -12 dB at 6.0 MHz |
| Chrominance Bandwidth: | -3dB at 3.58 MHz + 620 KHz (I, Q) |
| | -1.3 MHz (I), -620 KHZ (Q) |
| Y Vertical Response: | At least 20% response at 330 lines |
| Return Loss: | Greater than 30 dB to 60 MHz. |
| 2. RGB | |
| Frequency Response: | ±0.25 dB to 5.0 MHz |
| | -12 dB at 6.0 MHz |
| Signal Level G: | 1.0 $V_{p-p}$ into 75 ohm |
| R, B: | 0.7 $V_{p-p}$ into 75 ohm |
| Negative Synch on Green | At least 20% response at 330 |
| Vertical Resolution: | lines |
| Return Loss: | Greater than 30 dB to 60 MHz. |

Each of the incoming video signals $V_1$, $V_2$, and $V_3$ is passed through a local video switching exchange (LVSE), such as LVSE 802 for imparting a desired degree of compression to the incoming video signals, and for multiplexing these signals into a single video channel $VC_1$. The incoming video signals $V_1$, $V_2$, and $V_3$ can be expressed in equation form, as follows:

$$V_1 = V_{1R} + V_{1G} + V_{1B} \quad (15)$$

$$V_2 = V_{2R} + V_{2G} + V_{2B} \quad (16)$$

$$V_3 = V_{3R} + V_{3G} + V_{3B}, \quad (17)$$

where $V_{1R}$, $V_{1G}$, $V_{1B}$, $V_{2R}$, $V_{2G}$, $V_{2B}$, $V_{3R}$, $V_{3G}$ and $V_{3B}$ are the R, G and B components of the incoming video signals $V_1$, $V_2$, and $V_3$, respectively.

FIG. 28 further illustrates three local video switching exchange $LVSE_1$, $LVSE_2$ and $LVSE_3$ which process the incoming video signals according to the foregoing teachings, via the video Fourier transformers (VFT) 803, 804 and 805; the video frequency selectors (VFS) 807, 808 and 809; and the video multiplexers (VMUX) 810, 811 and 812. Each one of these R, G and B components is passed through a Fourier transformer, such as the Fourier transformers 803, 804 and 805 for deriving the Fourier harmonics of these signals. For purposes of brevity, and since the incoming signals are basically processed in a generally similar manner, only the transformation of the incoming signal $V_1$ will be described hereafter in detail.

The Fourier transformation of the signal $V_1$ is carried out according to the following equations:

$$x(t) = a_o + (a_n \cos nw_o t + b_n \sin nw_o t) \quad (18)$$

where $x(t)$ is the video signal function, such as $V_{1R}$, $V_{1G}$, and $V_{1R}$, and $$a_o = (1/T) \cdot x(t) \cdot dt \quad (19)$$

$$a_n = (2/T) \cdot x(t) \cos nw_o t \, dt \quad (20)$$

$$b_n = (2/T) \cdot x(t) \sin nw_o t \, dt. \quad (21)$$

The application of the above equations to the video signals will be expressed in the following equations for better handling. For simplicity purposes, and for better focus on the gist of the invention, the $a_o$ coefficient will not be considered in the present illustration. However, this coefficient will be taken into account by those skilled in the art.

$$V_{1R} = V_{R1}[\phi_{R1}] + V_{R2}[\phi_{R2}] + V_{R3}[\phi_{R3}] + V_{R4}[\phi_{R4}] + V_{R5}[\phi_{R5}] + \ldots \quad (22)$$

$$V_{1G} = V_{G1}[\phi_{G1}] + V_{G2}[\phi_{G2}] + V_{G3}[\phi_{G3}] + V_{G4}[\phi_{G4}] + V_{G5}[\phi_{G5}] + \ldots \quad (23)$$

$$V_{1B} = V_{B1}[\phi_{B1}] + V_{B2}[\phi_{B2}] + V_{B3}[\phi_{B3}] + V_{B4}[\phi_{B4}] + V_{B5}[\phi_{B5}] + \ldots \quad (24)$$

In the above equations, $[\phi]$ represents the sinusoidal angular components of the Fourier sinusoidal harmonic signals, and $V[\phi]$ represents the Fourier transform.

The present invention allows for a various degree of video signal compression, by selecting only those Fourier components that are desirable for a later regeneration of the original signal. The selection process can be pre-programmed, or automatic, as it will be explained later in greater detail.

The video channel $VC_1$ is illustrated by the two marker channels $MC_1$ and $MC_2$ of FIG. 30, as comprising three video bands $V_1$, $V_2$ and $V_3$. Each one of these bands includes several sub-bands, such as the sub-bands 901 through 909, corresponding to particular video frequencies such as R (i.e. sub-band 901), G (i.e. sub-band 902) or B (i.e. sub-band 903). For illustration purposes only the first and second transforms $V_{R1}[\phi_{R1}]$ and $V_{R2}[\phi_{R2}]$ respectively of the component signal $V_{1R}$ are selected to be processed by the Fourier selector 807, as shown in sub-band 901, thus reducing equation (22) to:

$$V_{1R} = V_{R1}[\phi_{R1}] + V_{R2}[\phi_{R2}]. \quad (25)$$

Sub-band 903 in marker channel $MC_2$ illustrates that only the first transform $V_{G1}[\phi_{G1}]$ of the signal $V_{1G}$ has been selected, thus reducing equation (23) to:

$$V_{1G} = V_{G1}[\phi_{G1}]. \quad (26)$$

Similarly, as illustrated in the marker channel $MC_2$, the first, second and third transforms $V_{B1}[\phi_{B1}]$, $V_{B2}[\phi_{B2}]$, and $V_{B3}[\phi_{B3}]$ of the signal $V_{1B}$ are selected, in the sub-band 903, thus reducing equation (24) to:

$$V_{1B} = V_{B1}[\phi_{B1}] + V_{B2}[\phi_{B2}] + V_{B3}[\phi_{B3}]. \quad (27)$$

Consequently, by substituting the selected Fourier transforms of the signals $V_{1R}$, $V_{1G}$, and $V_{1B}$ of equations 25, 26 and 27 in equation 15, the signal $V_1$ becomes:

$$V_{1T} = V_{R1}[\phi_{R1}] + V_{R2}[\phi_{R2}] + V_{B1}[\phi_{B1}] + V_{B2}[\phi_{B2}] + V_{B3}[\phi_{B3}] + V_{G1}[\phi_{G1}] \quad (28)$$

thus achieving the selective compression of the video signal $V_1$. $V_{1T}$ is the transformed signal of the signal $V_1$, after the selection process of the harmonic transforms has been carried out.

Considering now the signal $V_2$ in connection with sub-bands 904, 905 and 906 it is processed similarly to the signal $V_1$, and it could be expressed by the following equation:

$$V_{2T} = V_{R1}[\phi_{R1}] + V_{R2}[\phi_{R2}] + V_{G1}[\phi_{G1}] + V_{G2}[\phi_{G2}] + V_{R3}[\phi_{R3}] + V_{B1}[\phi_{B1}] \quad (29)$$

thus achieving the selective compression of the video signal $V_2$.

In a similar way, the selective compression of the video signal $V_3$ is illustrated in sub-bands 907, 908 and 909 as follows:

$$V_{3T} = V_{R1}[\phi_{R1}] + V_{G1}[\phi_{G1}] + V_{G2}[\phi_{G2}] + V_{G3}[\phi_{G3}] V_{B1}[\phi_{B1}] + V_{B2}[\phi_{B2}] \quad (30)$$

The signal selection is carried out by the selectors 807, 808 and 809 of FIG. 28. The signals $V_{1T}$, $V_{2T}$ and $V_{3T}$ are then multiplexed by the multiplexer 810 to yield the signal $V_{T1}$, as follows:

$$V_{T1} = V_{1T} + V_{2T} + V_{3T}. \quad (31)$$

The signals $V_{T2}$ and $V_{T3}$ are derived in a similar manner as $V_{T1}$, and are multiplexed, by the multiplexer 825 in accordance with the teachings of the present invention or with other multiplexing teachings, to yield the $VC_1$ signals:

$$VC_1 = V_{T1} + V_{T2} + V_{T3}. \quad (32)$$

It should however be understood that the video channel $VC_1$ can accommodate a much greater number than the three video signals $V_1$, $V_2$ and $V_3$.

While in general, it would be desirable to select the first or lower harmonics of the transformed video signals, it might be more desirable, in certain circumstances, to select the later or higher harmonics, and to reserve the lower harmonics to non-video signals, such as audio or data signals. This would be desirable when the fidelity of reproduction of the video signal is not as important as that of the audio or data signals.

As it will be described in greater detail with respect to FIGS. 31 through 33, this feature could be automatically selected to further enhance the compression of the video, audio and data signals on the same video channel. For instance, when the video picture is a still or background picture that has not changed or that has minimally changed, then higher harmonic signals are selected for the video signals, and lower harmonics are assigned to audio and/or data signals.

Figure 34:
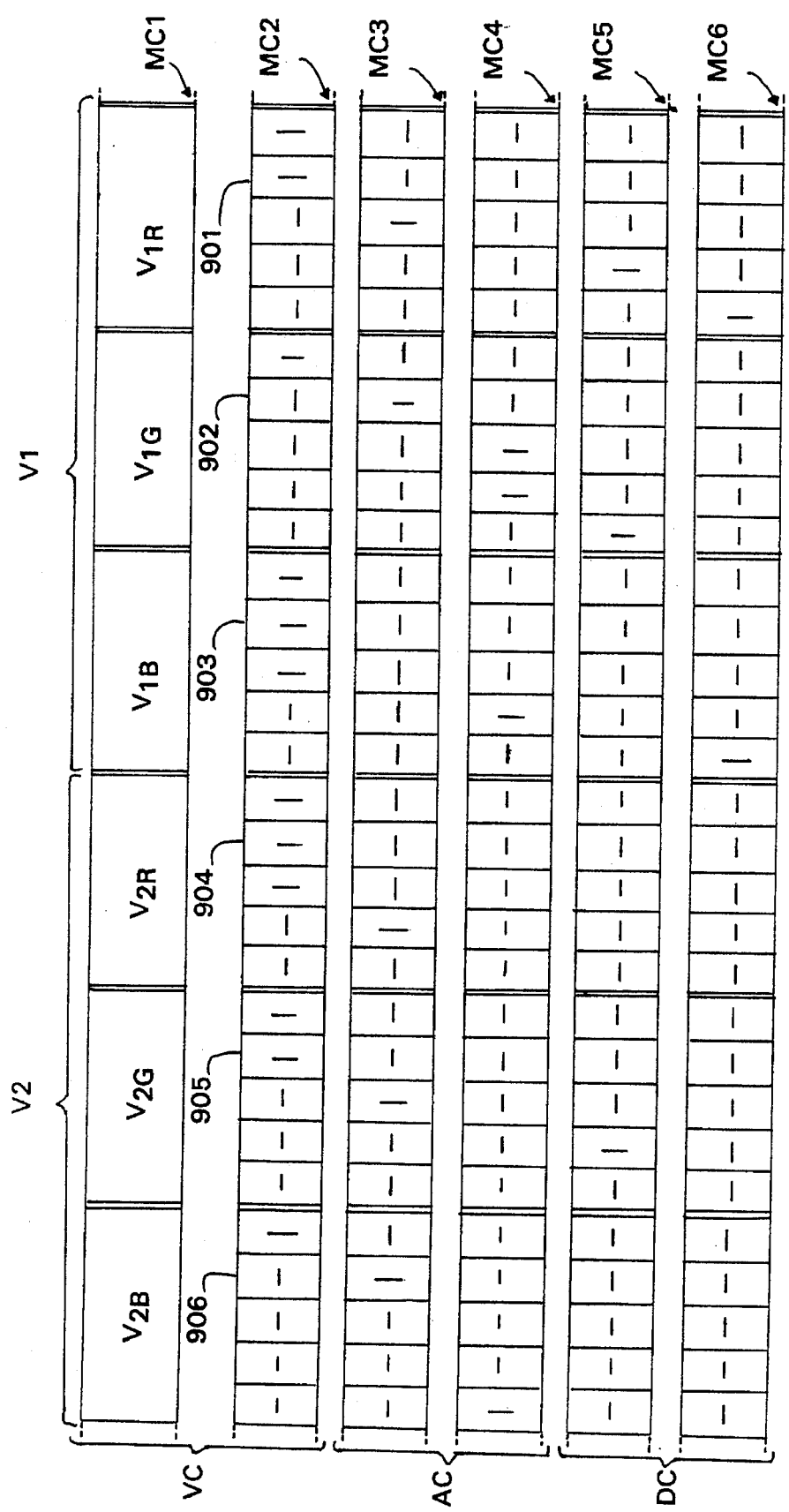
FIG. 34 illustrates a plurality of marker channels, as part of an inventive data encoding scheme for the marker channels in FIG. 30.

FIG. 34 shows the six illustrative VAD marker channels $MC_1$ through $MC_6$ of FIG. 30, with a further breakdown of the sub-bands 901 through 906. These marker channels are useful visual aid techniques to simplify the description of the various compression schemes according to the present invention, and to aid in the design of the PDS and its maintenance.

Each of the sub-bands, such as the sub-band 901, includes five consecutive intervals, which are illustrated as boxes, in order to facilitate the understanding of the invention. Each of these intervals indicates the number or order of the harmonic component selected to be processed. In the present example, it is desired to process only the first five harmonic components, and therefore, only five intervals have been selected. It should however be understood that the number of intervals (five) is shown for illustrative purposes and is not intended to be limiting, and other numbers could be employed without departing from the spirit of the invention. In operation, the sub-bands may be programmed independently from each other, and the programming process could be continuously monitored and updated according to the signals being processed.

Figure 35:
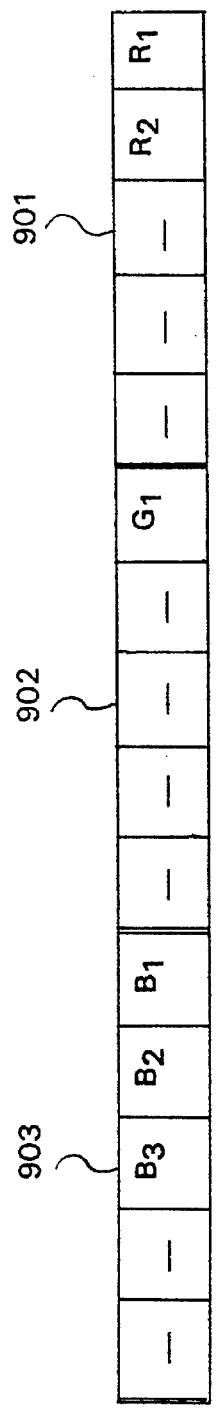
FIG. 35 represents a portion of one marker channel of FIGS. 30 and 34.
Figure 36:
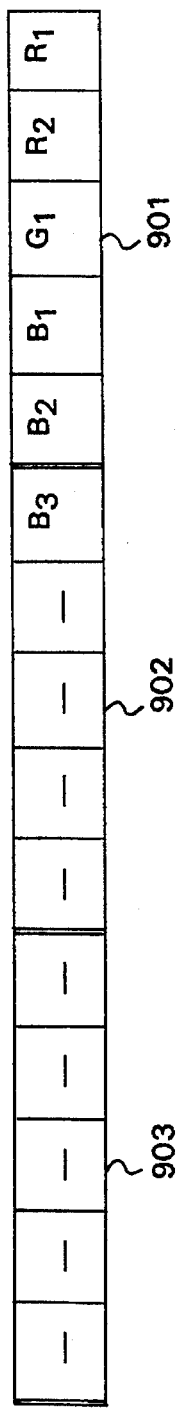
FIG. 36 represents a portion of the marker channel of FIG. 35, with the VAD signals further compressed according to the teachings of the present invention.

FIGS. 35 and 36 illustrate a compression scheme, whereby the signals in the sub-bands 901, 902 and 903 are serially multiplexed. The harmonic frequencies allocation is as follows:

$V_{1R}$: First and second harmonic of the R frequency.

$V_{1G}$: Third harmonic of the R frequency.

$V_{1B}$: Fourth and fifth harmonics of the R frequency, and first harmonic of the G frequency.

It should however be understood that the above reallocation of harmonic frequencies is given as an example only, and the compression scheme of the invention presents other flexible harmonic frequency reallocation alternatives. For example the following reallocation or frequency shifting scheme could be followed:

$V_{1R}$: First and second harmonics of the R frequency.

$V_{1G}$: Third harmonic of the R frequency.

$V_{1B}$: First, second and third harmonics of the B frequency.

With either the above exemplary compression schemes, harmonic frequencies and sub-bands are now freed to be allocated to other signals, possibly non video signals.

The magnitude or amplitude of the signals could be modified or amplified at either the transmitter or the receiver end. Thus, the compression scheme could be used in conventional video transmitters to transmit the video signals on a real-time basis. The receiver receives these signals and causes them to be viewed on a real time basis. The signals are labeled or coded so that, at the receiver level, the signals could be identified and decoded, and thereafter separated or processed as desired.

Considering now the automatic selection of the harmonic frequencies in connection with FIGS. 31 and 32, there is illustrated two alternative compression methods, which could be used either separately or in combination with each other, as will be described later in relation to FIG. 33. FIG. 31 is a flow chart of a preferred embodiment for a "horizontal compression technique", and is illustrated by the program routine 950 which permits the automatic compression of video signals at various degrees, for selecting only those Fourier components that are desirable for a later regeneration of the original signals.

The routine 950 starts at step or block 951, and sets the value of a count integer n to zero, at 952. The value of n is indicative of the number of the Fourier harmonic components. For instance, if n=1, then the routine 950 will select the first Fourier component $V_1[\phi_1]$, and will keep selecting, storing and adding subsequent Fourier components until a predetermined component $V_A[\phi_A]$ is reached, or if the amplitude component $DV_n$ is less than or equal to a predetermined value x such as zero, where:

$$DV_n = \text{absolute value of } (V_n - V_{n+1}). \quad (33)$$

In effect, what is being accomplished by equation 33 is that each signal $V_n[\phi_n]$ is taken as a template for the next harmonic signal $V_{n+1}[\phi_{n+1}]$, and if the value of $DV_n$ is less than x, then it would be acceptable not to consider the harmonic component $V_{n+1}[\phi_{n+1}]$ or the following harmonics, and a flag will be set to that effect, for future use of this information for reconstructing the original signal. For example, if, when considering the third Fourier component $V_3[\phi_3]$ it is found that $[DV_2=(V_2-V_3)<x]$, then the third harmonic component $V_3[\phi_3]$ will not be considered, and only the first and second harmonic components $V_1[\phi_1]$ and $V_2[\phi_2]$ will be used, and a flag will be set to the effect that $DV_2<x$.

While the above compression technique is described with respect to two immediately succeeding Fourier components, it should be understood that other, not immediately succeeding signals, could be compared, such as: $DV_n=V_n-V_{n+3}$. It should also be noted that the compression techniques described in this specification could be used with analog or digital signals.

A subroutine is started at block 953, by increasing the value of the count integer n to (n+1). The program then determines whether the count integer n has reached or exceeded a preselected value A, at 954. If it has not, then the program determines at block 955 whether $DV_n$ is less than or equal to x. If $DV_n$ is found to be greater than x, then the nth harmonic component $V_n[\phi_n]$ is selected and stored at 957, and the program increases the n count by 1, at block 953, and inquires once again at 954 whether the count integer n has reached the preselected value A.

If the value A has not been reached, then the program repeats the comparative step at 955, and if it is determined that $DV_n$ is less than or equal to x, then a flag is set at 959, and the values of the stored harmonic components $V_n[\phi_n]$ for composing the video signal V at 960. If at 954 it is determined that n has reached the value A, then the software adds all the selected and stored harmonic components to form the video signal V. The subroutine relating to the audio and data compression will be explained later.

Figure 32:
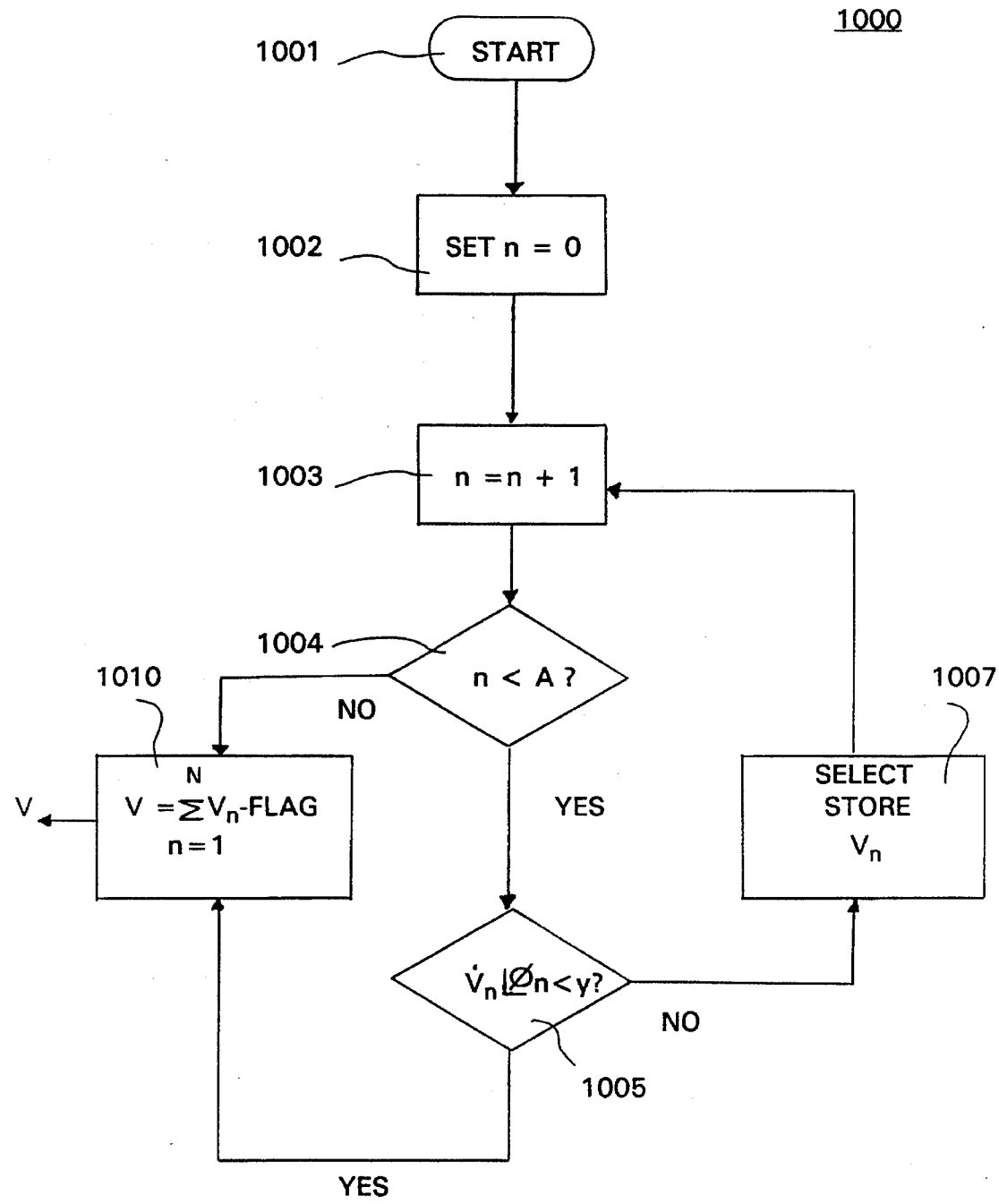
FIG. 32 is a flow chart representation of a "vertical compression" method according to the present invention.

Turning now to FIG. 32, it illustrates a program routine 1000 of an alternative embodiment for a "vertical compression technique", and permits the automatic compression of video signals at various degrees, for selecting only those Fourier components that are desirable for a later regeneration of the original signal. The routine 1000 starts at block 1001, and sets the value of a count integer n to zero, at 1002.

Similarly to the "horizontal compression" method described above, the value of the integer n is indicative of the number or order of the Fourier harmonic components. For instance, if n=1, then the routine 1000 will select and the first Fourier component $V_1[\phi_1]$, and will keep selecting, storing and adding subsequent Fourier components until a predetermined component $V_A[\phi_A]$ is reached, or if the amplitude component $dV_n$ is less than or equal to a predetermined value y, such as zero, where $dV_n$ is the absolute value of the derivative of $V_n$, whether angular or with respect to time, of the nth harmonic component, that is of the difference between the present nth harmonic component and the (n−1)th harmonic component immediately preceding it, wherefore the designation "vertical compression".

What is being accomplished by this vertical compression technique is that if the value of $dV_n$ is less than y, then it would be acceptable not to consider the harmonic component $V_{n+1}[\phi_{n+1}]$ or following harmonics, and a flag is set to that effect, for future use of this information for reconstructing the original signal. While the above compression technique is described with respect to two immediately succeeding Fourier components of the nth order, it should be understood that other, not immediately succeeding components, could alternatively be compared, such that the second derivative $d^2V_n$, rather than the first derivative $dV_n$, is compared to y, and the remaining process is substantially similar, as described below.

A subroutine is started at block 1003, by increasing the value of the count integer n to (n+1). The program then determines whether the count integer n has reached or exceeded a preselected value A, at 1004. If it has not, then the program determines at block 1005 whether $dV_n$ is less than or equal to y. If $dV_n$ is found to be greater than y, then the nth harmonic component $V_n[\phi_n]$ is selected and stored at 1007, and the program increases the n count by 1, at block 1003, and inquires once again at 1004 whether the count integer n has reached the preselected value A.

If the value A has not been reached, then the program repeats the comparative step at 1005, and if it is determined that $dV_n$ is less than or equal to y, then a flag is set at 1009, and the values of the stored harmonic components $V_n[\phi_n]$ for composing the video signal V at 960. If, at 1004, it is determined that n has reached the value A, then the software adds all the selected harmonic components to form the video signal V.

Figure 31:
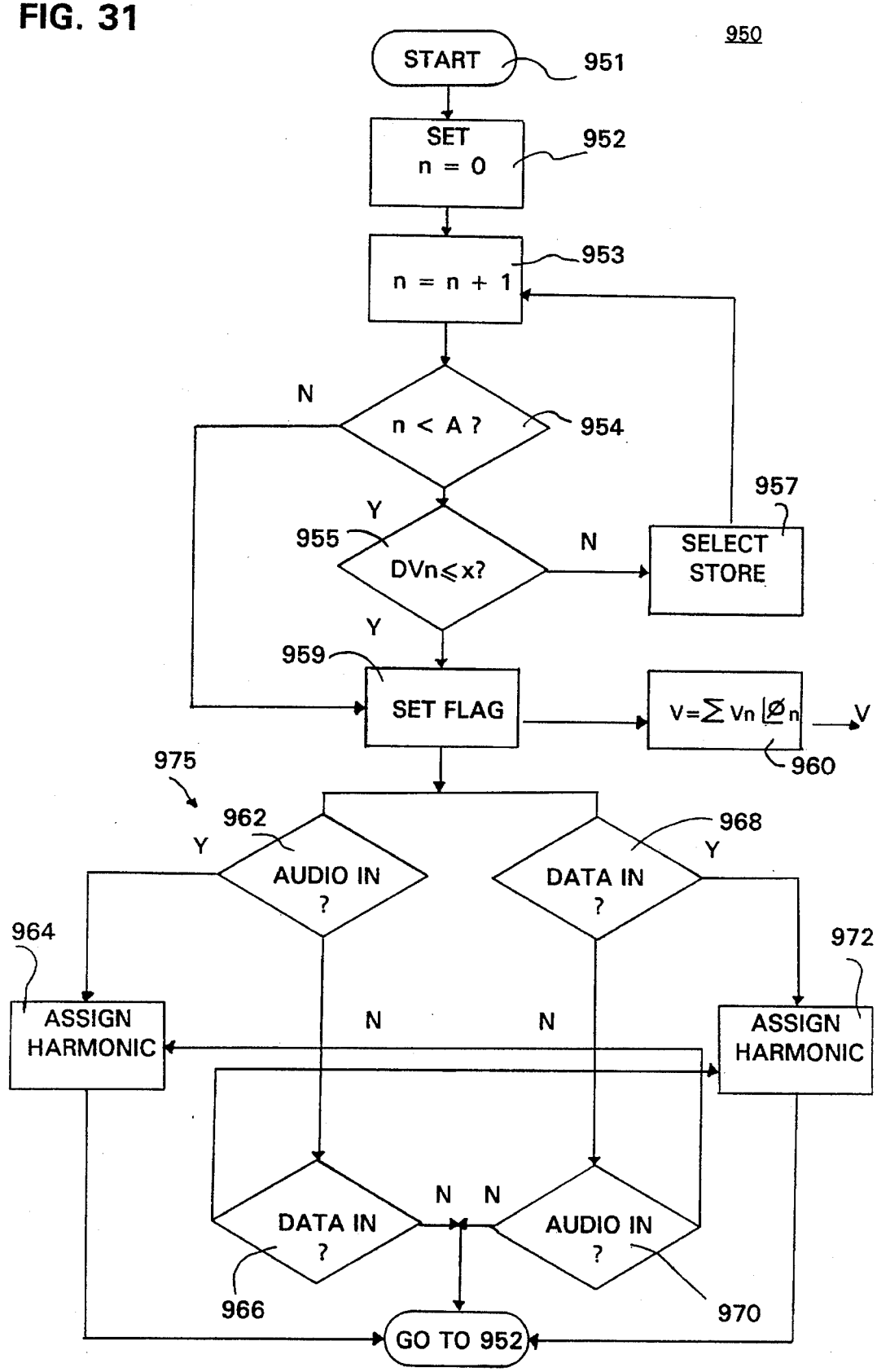
FIG. 31 is a flow chart representation of a "horizontal compression" method according to the present invention.
Figure 33:
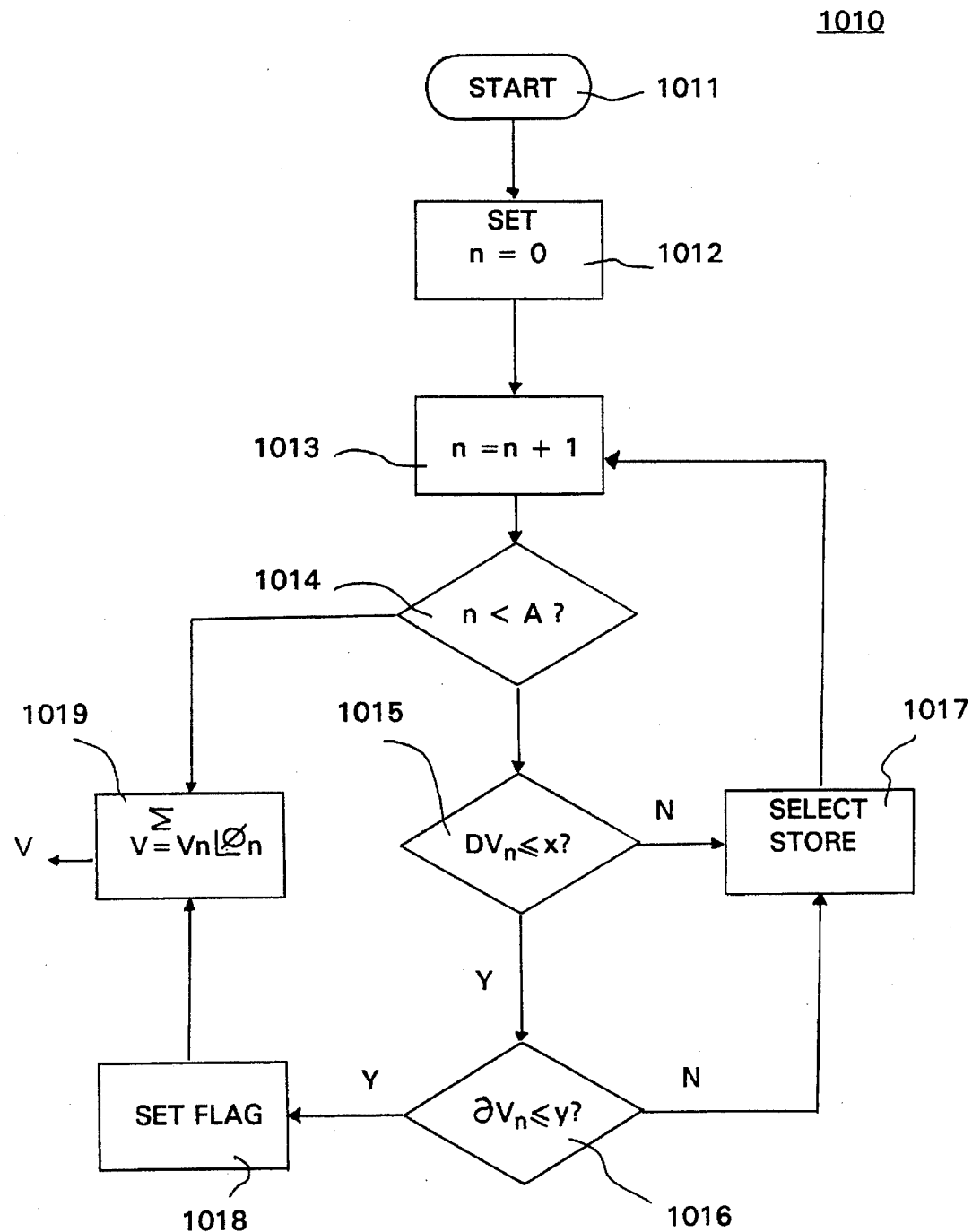
FIG. 33 is a flow chart representation of a combined "horizontal and vertical compression" method according to the present invention.

Turning now to FIG. 33 it represents a flow chart of a program routine 1010 which combines the foregoing vertical and horizontal compression techniques discussed in relation to FIGS. 31 and 32. While the routine 1010 represents one particular combination of these techniques, it should be understood that other combinations are possible. In the combination illustrated in FIG. 33, the program keeps selecting and storing successive Fourier components, at 1017, as long as either $DV_n$ is greater than x, or $dV_n$ is greater than y. It is only when the count integer n is equal to, or greater than A; or when both $DV_n$ and $dV_n$ are less than x and y respectively, that the program exits the iterative subroutine and adds all the stored signals $V_n$.

The video signals are multiplexed by the multiplexer 825 according to the foregoing, or according to conventional teachings.

Processing Audio and Data Signals

The processing of the incoming audio signals will now be described in relation to FIGS. 25, 26, 29, 30 and 31. FIG. 25 shows the ground station $GS_1$ as accommodating several audio channels $AC_1$ through $AC_P$. For illustration purposes only, FIG. 26 illustrates three audio channels $AC_1$, $AC_2$ and $AC_3$, each of which accommodates four incoming audio signals, of which, only the audio channel. $AC_1$ will be described hereafter in detail. The incoming audio signals $A_1$ through $A_4$ on the audio channel $AC_1$ are digitized, compressed and multiplexed by the audio compressor 975 and multiplexer 976, as is conventionally known in the art.

As illustrated in FIG. 29, the audio channel $AC_1$ is then transmitted to the CVSE 989, where the signals are selectively modulated over particular video frequencies, such as the R, B and G frequencies, by means of an audio to video modulator 991. The modulated signals are then fed through a Fourier transformer 990, for calculating the Fourier harmonics of the video modulated audio signals. One important aspect of the present invention is to treat these video modulated audio signals similarly to the incoming original video signals described above. These video-modulated audio signals are then multiplexed with the original incoming video signals, by the multiplexer 999, as further illustrated in FIG. 30. It should be understood that the incoming audio and data signals could alternatively be passed through the video frequency selectors VFS, i.e. VFS 990, and then passed through the video modulator, i.e. VMOD 991.

FIG. 30 illustrates two marker channels $MC_3$ and $MC_4$ relating to the modulation of the audio signals over video frequencies. The marker channel $MC_3$ is an exemplary marker channel for the audio channel $AC_1$, and the marker channel $MC_4$ is an exemplary marker channel for the audio channel $AC_P$. An important aspect of the present invention is to have the CVSE 989 assign a video harmonic frequency to the audio signals. For this purpose, the CVSE 989 determines which video harmonic frequencies have not been allocated, and to modulate the audio signals over these frequencies. While in the preferred embodiment of the invention, the video signals are assigned preferential harmonics, followed by the audio and then the data signals, it should be understood that a different prioritization scheme could be followed.

The marker channel $MC_3$, indicates that the CVSE 989 has assigned the harmonic component $V_{R3}[\phi_{R3}]$ in sub-band 901. The harmonic component $V_{G2}[\phi_{G2}]$ has been assigned in sub-band 902, but no harmonic components were assigned in the video sub-band 903. It should be re-emphasized at this point that there is no intention to limit the marker channel architecture to the R,G and B frequencies, and that other appropriate frequencies (i.e. video frequencies) could alternatively be selected. Furthermore, the selection and assignment of the sub-bands to the audio and data channels could be done automatically, by setting a hierarchical order for each audio channel. For instance, the third and fourth harmonic components $V_{G3}[\phi_{G3}]$ and $V_{G4}[\phi_{G4}]$ in the sub-band 902 have been assigned to the audio channel $AC_P$, while the harmonic component $V_{G2}[\phi_{G2}]$, also in the sub-band 902, is assigned to the audio channel $AC_1$. By varying the assignment combination of the harmonic components, it is now possible to arrive to various combinations of audio, data and video signals.

The data channels $DC_1$ through $DC_Q$ are modulated over video frequencies in a similar manner as described above in connection with the audio channels, and sub-bands assignment is carried out based on priority and availability. The video signals, video-modulated audio signals and/or video-modulated data signals are then multiplexed as video signals $V_{10}$ (FIG. 29), and transmitted to the ground station $GS_4$.

In certain instances, it would be desirable to assign predetermined harmonic components to a signal, such as an audio or video signal. However, it is possible that a conflict or a frequency assignment competition may arise in that those harmonic components have already been pre-assigned in the sub-band in question. In anticipation of this situation, the CVSE 989 "slides" the signal and then reassigns another sub-band. It is also possible to leave unassigned certain sub-bands along the marker channels, such that these sub-bands will be reassigned, at will, possibly automatically, in the event of harmonic frequency competition. This feature is referred to as "sub-band re-assignment".

Another feature anticipated by the present invention is the "sub-band anti-competition", which allocates a predetermined priority to a signal which has been reassigned. For instance, as we mentioned above, audio signals takes precedence over data signals. However, a data signal could be programmed to take precedence over a reassigned audio signal.

Turning now to FIG. 31, a subroutine 975 assigns video harmonic components to the audio and/or data signals. The subroutine simultaneously asks at 962 and 968 whether any audio or data signals are incoming. If none is incoming, then the subroutine is exited and the program 950 is started at step 952. If on the other hand, audio and/or data signals are incoming, then video harmonic components are assigned for modulation at 964 and 972, as described above, and the subroutine 975 is exited.

VAD Mapping System

Figure 37:
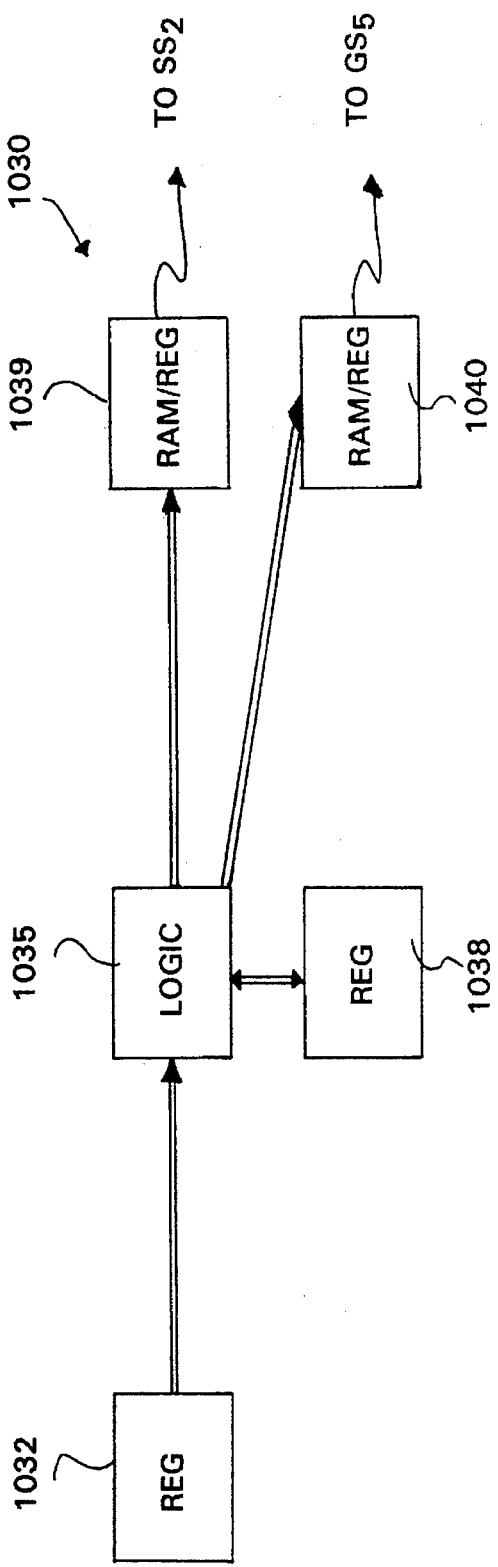
FIG. 37 is block diagram architecture of a video, audio and data (VAD) mapping system for processing video, audio and data signals according to the present invention.

FIG. 37 is a block diagram representation of a video, audio and data (VAD) mapping system 1030 for processing the video, audio and data signals, as described above. The VAD mapping system 1030 could be located at a ground or satellite station. However, for illustration purposes, and for the purpose of this example, the VAD mapping system will be considered as if it were located at ground station $GS_4$. The VAD mapping system 1030 includes a plurality of memory registers 1032 for registering the incoming signals, and for storing them for a predetermined period of time, in a time-space matrix format. The memory registers 1032 are coupled to a logic module 1035, via bus lines, including an address bus 1037, in order to enable the selective and flexible processing, retrieval and reconstruction of the signals stored in the memory registers 1032.

The logic module 1035 includes a plurality of logic ports, and is connected to at least one additional memory register 1038. The logic module 1035 is capable of processing the signals stored in this memory register 1038 by themselves or in combination with the signals in the other memory registers such as the memory register 1032. The processing of the signals in the logic module 1035 is carried out according to conventional techniques and/or according to the video compression methods described above in the present specification. The processed signals are written in RAM memory registers 1039 and 1040, and are transmitted to either the end users directly, or Via other ground and/or satellite stations.

Widen the video, audio and/or data signals are selected for retrieval and decoding, these signals are demultiplexed into separate video channels, and then demultiplexed once again into different video bands. The demultiplexed video bands are separated into video sub-bands which contain the harmonic components.

FIG. 38 represents a data encoding/decoding scheme 1025 For the marker channels $MC_2$ through $MC_6$ illustrated in FIG. 30. This scheme 1025 represents the VAD signals which are transmitted, and is used to decode and demodulate these VAD signals, as well as to reconstruct and recombine them.

Considering for purposes of illustration marker channel $MC_3$, which is the marker channel for the audio channel $AC_1$, the digit "1" in the third box or register of sub-band 901 indicates that the audio signals have been modulated over the third Fourier harmonic (R) frequency. Consequently, when the VAD signals are to be reconstructed, the scheme 1025 is used to select only those harmonic frequencies that need to be processed, and to disregard the other harmonic frequencies.

This selection process of the harmonic frequencies is made clearer when further explained in conjunction with the VAD marker channel 1027 of FIG. 38. The VAD marker channel or data encoding and display channel 1027 combines the information in the marker channels of FIG. 30, and illustrates, in a visual manner, the information encoded in the sub-bands.

Considering for example the sub-band 901 of the VAD marker channel 1027, this sub-band has been allocated and divided into five registers, each of which is dedicated to a particular harmonic R video harmonic frequency. The first two registers indicate that the first two harmonic frequencies have been assigned to video signals from the video channel $VC_1$, and that video signals have actually been transmitted or received. The following register indicates that the third R video harmonic frequency has been assigned to an audio signal from the first audio channel $AC_1$. The last two registers show that the fourth and fifth R harmonic frequencies have been assigned to data signals from the data channel $DC_1$ and $DC_Q$ respectively. While only five registers have been selected for the marker channels illustrated and described in the present specification, it should be understood to those skilled in the art that other numbers of registers could be selected depending on the nature of the application.

FIG. 38 is a tabular representation of the VAD mapping system 1030 which registers and stores the data in the marker channels of FIG. 38. The table of FIG. 38 indicates that sub-band 901 is composed of video, audio and data signals; that the video signals have been assigned the first and second Fourier harmonic frequencies; that the audio signals have been modulated over the third Fourier harmonic frequency; and that the data signals have been modulated over the fourth and fifth Fourier harmonic frequencies. It would be possible to assign additional coordinates to the information in the registers of the VAD mapping system, which includes the magnitude or amplitude of the stored signal, as well as its source, such as the designation of the video, audio or data channel number.

For illustration purposes, it will be assumed that the final destination of the information processed by the logic module 1035 (FIG. 37) is the space station $SS_2$ and the ground station $GS_{35}$. The signals in the memory register 1032 are tabulated by the VAD mapping system 1030, according to FIG. 38. The signals in the memory registers 1038 are not shown, but are processed in a similar manner to those in the memory registers 1032. The logic module 1035 then identifies the signals to be transmitted to the different destinations and routes them accordingly.

Program Insertion Systems

Cable television systems in the United States carry an average of 35 channels of diversified programming services. Higher capacity systems are currently being designed to 80 channels (550 MHz) on a single coaxial cable. Commercial program insertion systems, such as sppt advertising, cross-channel promotional, barker insertions and network non-duplication have evolved somewhat independently in cable systems, and it would be desirable to integrate these program insertion systems within the cable television network.

Until recently, the cable operators have been generally using tape playback systems for most commercial program operations. However, these tape playback systems are limited in both their video storage capacity and their reliability. These machines are mechanical in nature, and therefore they require extensive maintenance to function.

By using the inventive concepts described in the present specification, it is now possible to dispense with the tape playback patching systems. More specifically, this objective would be accomplished by using the video, audio and data compression techniques described herein. Furthermore, the VAD mapping system could also be used to identify the location(s) at which the commercial/program needs to be inserted. Once these locations are identified, a flag or a series of flags is/are generated for insertion on a real time basis.

Another alternative approach is to multiplex the commercial/programs with the actual television or cable program, prior to transmitting the signals to the end users. The compression and multiplexing techniques are described in the present specification.

The VAD mapping system could also be used by the advertising agencies to reserve their spots, similarly to the reservation network used by travel agents.

As further illustrated in FIG. 41, the computer 51 controls the scanner-transmitter 285, to regulate the transmission sequence of the information to the selector-receiver 275.

An additional storage 243 is connected to the plurality of memory storage 230, 232 and 234, via a multiplexer 245 for combining and editing the signals stored in the memory storage 230, 232 and 234. Thus, if the user wishes to combine the signals in channels 1 and 2, he or she instructs the computer 51 to cause the release of the signals from the corresponding memory storage 230 and 232, to the exclusion of the remaining channels. The released signals are multiplexed by the multiplexer 245, and stored in storage 243. The stored signals are then decompressed and viewed on a real-time basis.

Alternatively, the storage 243 and the multiplexer 245 could be connected to the compressor 250, for storing and multiplexing the signals that have already been decompressed by the demultiplexer 250.

One application of the system 200 of FIG. 41, is in commercial insertion. In this respect, if, for instance, two commercials were to be inserted into program, the commercials would be transmitted on various channels. For instance, if two or more commercials were to be combined with the main program, these commercials, which for illustration purpose are incoming from different sources or locations, are transmitted over channels 1 and 2, from the transmitter circuit 204 to the receiver station 202.

The computer 51 determines whether these channels should be demultiplexed by the demultiplexer 105. If so, each channel is stored in its designated memory storage, i.e. 230. The main program is independently retrieved from the storage or library 242, and is transmitted to the transmitter circuit 202, where it is passed through of stored in a temporary memory storage, i.e. 234. As mentioned above, the storage periods for the channels in the memory storage 230, 232 and 234 are variable, and are controlled by the computer 51.

Another application of the present invention, is the commercial insertion systems, where commercials are, for example, transmitted on channels 2 through (n–2), while the main video signals are transmitted on channels 1, (n–1) and n.

Figure 42:
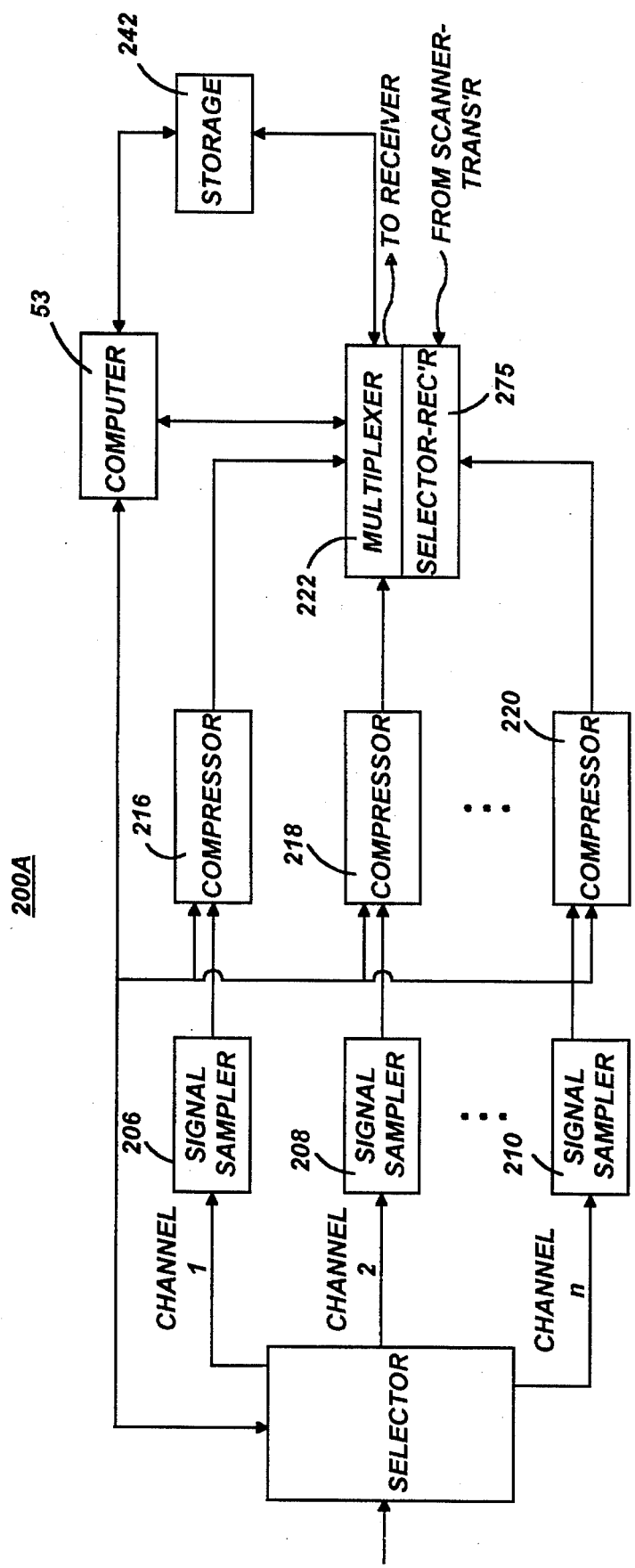
FIG. 42 illustrate a block diagram architecture of a transmission station, for use in another embodiment of the video broadcasting system of FIG. 8.
Figure 43:
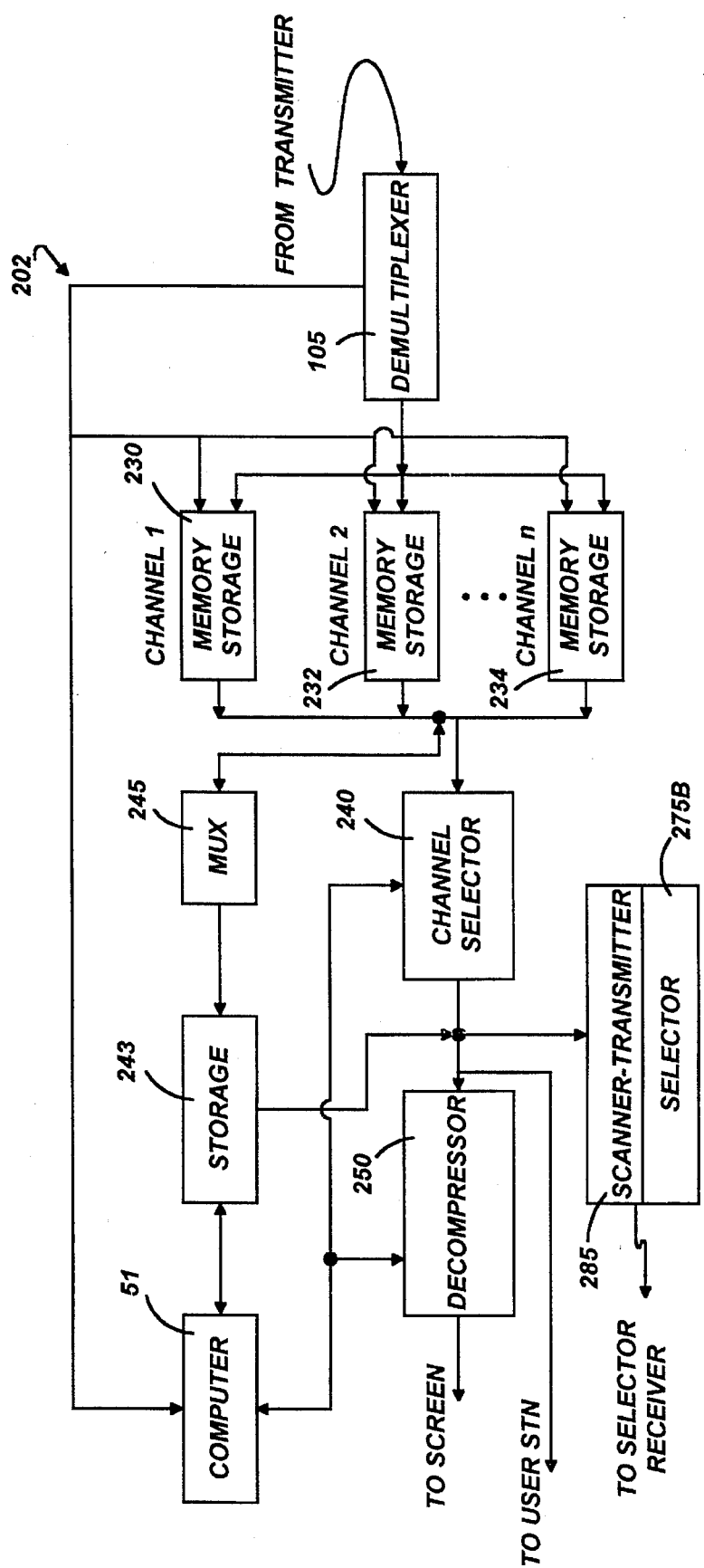
FIG. 43 illustrate a block diagram architecture of an intermediate or receiver station, for use with the transmission station of FIG. 42.

FIGS. 41, 42 and 43 combined, illustrate one broadcasting system 200A, according to the present invention. For illustration purpose, the system 200A is shown to include one transmission station 204A, one intermediate station or receiver station 202A, and one user station 203A. It should understood however, that additional stations, similar to stations 202A, 203A and 203A, could be included. Hereinafter, only one exemplary station of each type will be described in detail.

The demultiplexer 105 is under the control of the computer 51 (FIG. 8), and demultiplexes only those selected channels which the user instructed the computer to demultiplex. The remainder channels are not demultiplexed. The demultiplexed channels are stored in their corresponding memory storage, i.e. 230, 232, in FIG. 3. The channels that have not been demultiplexed could be stored in any one of the remaining memory storage (i.e. 234).

As further illustrated in FIG. 43, the computer 51 further controls the storage of the signals or data in the memory storage 230, 232 and 234. The user could instruct the computer 51, to vary the storage periods T of the information. Thus for instance, the signals stored in memory storage 230 could be stored for a period T1, while the signals in memory storage 234 would be stored for a different period T2, depending on the application. The main program could be stored, if need be, for yet another period Tn, in order to obtain a continuity of signals, as described above (see also FIG. 4).

By timing the release of the signals from the appropriate memory storage, and by multiplexing these signals by means of the multiplexer 245, over a predetermined carrier frequency, it would now be possible to possible to combine the main program, and to have the commercials in their appropriate places. It is also possible to add the feature of encoding the main program, for identifying the locations of the commercials.

The multiplexed signals could be stored in storage 243 for several purposes, such as for later transmission to the end users or to other stations, according to an established schedule.

Additionally, the computer 51 would now enable the user to conduct parity checks to make sure that the commercials are located in their proper location, by using several methods, such as by using the VSD mapping system described below, or by viewing the particular interface segments between the main program and the commercials, or two consecutive commercials.

The latter inspection could be done by viewing these interface segments, or even the entire program, on a screen. To achieve this objective, the computer 51, identifies and selects these interface segments stored in the storage 243, by setting two or more flags (two flags in the preferred embodiment), or a pair of identifiable marks, to encompass the commercials, while leaving a comfortable margin for error. The decompressor 250 then decompresses the selected segments, and sends them to the screen. The user then conducts a parity check to ascertain that these segments are set as desired.

If there is a mismatch between among the commercials and the main program, the user fixes the errors, and feeds back the corrected segments to the storage 243, where the old segments (between the flags) are replaced by the new and corrected segments. This procedure will also enhances the maintenance of the receiver station 202A. It should be noted that the foregoing selection and feedback process could be carried out automatically, using the computer 51.

If the receiver station 202A were part of an intermediate broadcasting station, which transmits programs to other stations or to the end users or customers, (see FIGS. 24 et seq.) then a plurality of different programs and commercials combinations would be needed. In which case, the receiver station could include additional demultiplexers 105, multiplexers 245 and storage elements 243, which operate simultaneously (in parallel) with the elements described above.

Figure 44:
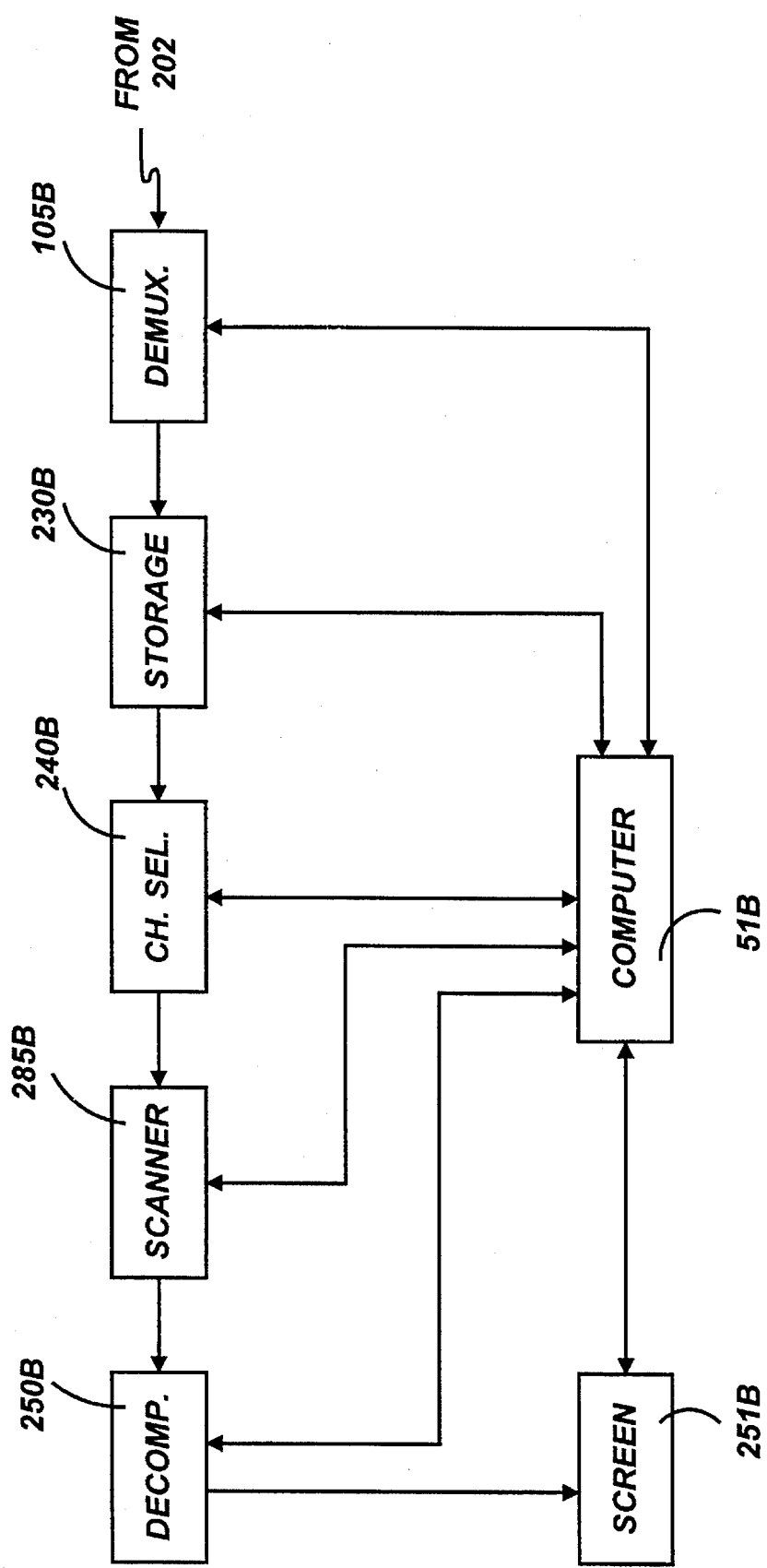
FIG. 44 illustrate a block diagram architecture of a user station, for use with the transmission station of FIG. 42, and the receiver station of FIG. 43.

Turning now to FIG. 44, it illustrates a simplified block diagram architecture of the user station 203A. The user station 203A is generally similar to that user circuit 202 of FIG. 8, or to the more sophisticated receiver station 202A of FIG. 43. Since the user station 202 and the receiver station 202A have been described in detail above, it suffices to describe the user station 203A, briefly, and to emphasize the special features or functions thereof.

The user station 203A generally includes a demultiplexer 105B, which could be connected to an signal inputting device, such as an antenna or a cable outlet (not shown). Alternatively, the demultiplexer 105B could be connected at subsequent sections of the user station 203B, so that the incoming signals are not automatically demultiplexed. Alternatively, the computer 51B could disable or delay the demultiplexing of the signals or channels, as needed, such that the incoming multiplexed signals are stored in the memory storage 230B (only one is shown for illustration) in a multiplexed and compressed format.

In certain instances, where only one channel is transmitted to the user station 203B, and no other channels are stored in the memory storage 230B, then the demultiplexer 105B is temporarily disabled, since it would not be needed. In less expensive models of the user stations, which receive only one channel at a time, the demultiplexer 105B could be eliminated, as a cost reduction measure, and the incoming channel is stored in storage 230B, if needed. Alternatively, memory storage 230B could also be eliminated from less expensive models, such that the incoming signals are directly decompressed, by the decompressor 250B, and viewed on a real time basis on the screen 251B.

In the preferred embodiment, where a plurality of channels are inputted to the user station 203B, these channels are processed, as described in the present specification. A scanner 285B scans and identifies the channels that have been selected by the channel selector 240B and/or by the computer 51B, and sends this information to a selector 275B (FIG. 43), over conventional communications means, such as a telephone line.

Therefore, the user is now able to send control signals to the intermediate station 202A, which in turn sends corresponding signals to other intermediate or relay stations (similar to 202A) or to the transmission station 204A. This is accomplished by having the scanner 285 A identify the selected channels, from the plurality of user stations 203B and/or from the computer 51, and send this information to the selector 275 and/or 275A (FIG. 42). The computer 51 can therefore be used for billing the user, or for other purposes, such as accounting, statistics, etc.

The decompressor 250B decompresses the signals from the storage 230B, and sends them to the monitor 251B for display on a real time basis. In certain applications, the monitor 251B could be replaced by, or supplemented with an auxiliary apparatus. This auxiliary apparatus could be used, for example, when the signals (channels) being processed by the user station 203A are, or include non-video signals, which are processed as described herein.

As a result, the system 200A could be used as a video-on-demand system, as well as for other services, such as telemarketing (or videomarketing). It should also be clear to those skilled in the art, after reviewing the present invention, that the system 200A could also be used as a Commercial Removal or Substation System (CRSS). This CRSS includes identifying the commercial segments, as described above, and deleting them, or replacing them with other commercials. It should be understood that, while reference is herein made to "commercials", segments including non-video signals could be alternatively processed according to the present teaching. Therefore, the system 200A could have several applications beside television broadcasting.

Turning now to FIG. 42, it illustrates a high level block diagram of a transmission station 204A. The transmission station 204A is generally similar to the transmission circuit or station 204 of FIG. 8, and further includes additional elements, whose function will be emphasized.

The transmission station 204A includes a computer 53 which is the central control unit for the signal samplers 206, 208, 210; the compressors 216, 218, 220; the multiplexer 222; the storage unit 242; and the selectors 275 and 275A. In the preferred embodiment, the selector 275 is used to control the multiplexing and transmission of selected channels, while the selector 275A is used to control the initial reception of incoming channels (1 through n). Thus, if the computer 53, determines that only a certain number of channels (i.e. 1 and 2) have been selected, via the selectors 275 and 275A, then it can either disable the operation of the non functional samplers (i.e. 210); or, in the alternative, it could use them to assist in alleviating the traffic on congested circuits. In this manner, the operation of the transmission station 204A is optimized.

Figures 45, 47:
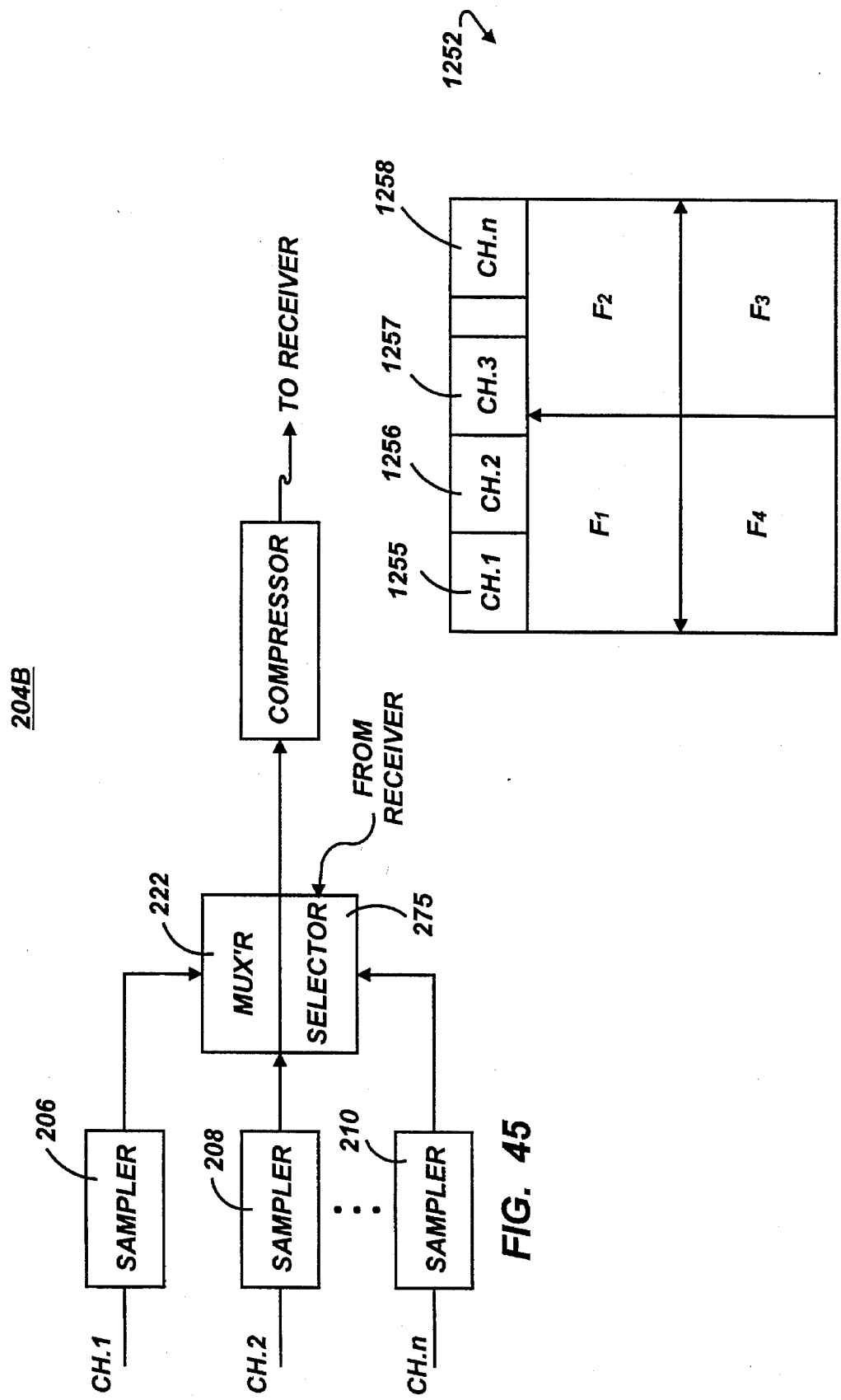
FIG. 45 illustrates another configuration of the transmitter 204 of FIG. 8.
FIG. 47 illustrates a monitor for use with the present invention, and preferably with the receiver 202C of FIG. 46.

FIG. 45 illustrates another configuration of the transmitter 204 of FIG. 8. The transmitter 204B differs from the transmitter 204 in that the sampled signals are multiplexed first and thereafter they are compressed, and transmitted to the receiver unit 202 of FIG. 8, or the alternative receiver 202C of FIG. 46.

The receiver 202C (FIG. 46) includes a storage unit 242C, where the compressed and multiplexed channels, from the transmitter 202B, are stored. When the user makes his or her selection using the channel selector 240C, which is connected to the computer 51C, the latter, causes the selected channels to be copied and transmitted from the storage 242C to the demultiplexer 105C. It should be noted that the storage unit 242C could be used by several end users, and could be remotely disposed, separately from the remaining elements of the receiver 202C.

The selected channels are then demultiplexed by the demultiplexer 105C into separate channels, and the signals of each channel are stored, in a compressed and preferably digital format in the storage units 230C, 232C, 234C. The user can now use the signals in the latter storage units at his or her convenience.

It should be noted that the storage periods of storage units 242C, 230C, 232C, 234C are all variable, and controlled by the computer 51C. In certain applications, such as live video teleconferencing, the storage periods could be minimal or eliminated all together. In specialized applications within the video teleconferencing application, for instance, it might be desirable to store part of the incoming signals for a predetermined period of time, or for later review.

For instance, if one site is simultaneously sending video, audio and data signals, it might be desirable to store the data signals (i.e. graphics) but not the audio or video signals. Other combinations of signals are also possible, such as storing all the incoming signals from one but not all the remote sites. It would yet be possible to store the entire video teleconferencing session. Additionally, the present architecture will enable the user to split the screen 1052 (FIG. 47), and to control the images to be displayed on the screen.

The selected signals are decompressed by the decompressor 250C, and then viewed on the monitor or screen 1052. As illustrated in FIG. 47, the monitor could be a regular television screen or a conventional computer monitor. In future applications, that are not yet widely available on the market, such as three dimensional television, or holographic projections, the signals from the storage units 230C, 232C, 234C, from the switching unit 1020, or from the decompressor 250C, could be sent to special apparatus for processing the signals, as desired.

It should become apparent to those skilled in the art, after reviewing the present invention, that, if several channels (i.e. 3 channels) all including VAD signals are transmitted to the receiver 202C, then each channel could be stored separately, such that the VAD signals are still multiplexed. For illustration, assume channel 1 includes VAD1 signals formed of: V1 (video) signal, A1 (audio) and D1 (data) signals muliplexed according to the teaching of the present invention. Similarly channels 2 and 3 simultaneously include VAD2 and VAD3 signals, which are composed of (V2, A2, D2) and (V3, A3, D3).

The demultiplexers 1254, 1256 and 1258 demultiplex the VAD1, VAD2 and VAD3 signals into separate video, audio and data signals. In certain applications, the computer 51C controls the demultiplexing process. For instance, if the user wishes to use only the data, but not the video or the audio signals, then the computer 51C instructs the demultiplexer (i.e. 1254) to demultiplex only the data signals D1 (i.e. separate them from the audio and video signals A1, V1), and store them separately. In which event the A1 and V1 signals would still be stored in a multiplexed and compressed format, until further instructions from the user, via the computer 51C.

Figure 46:
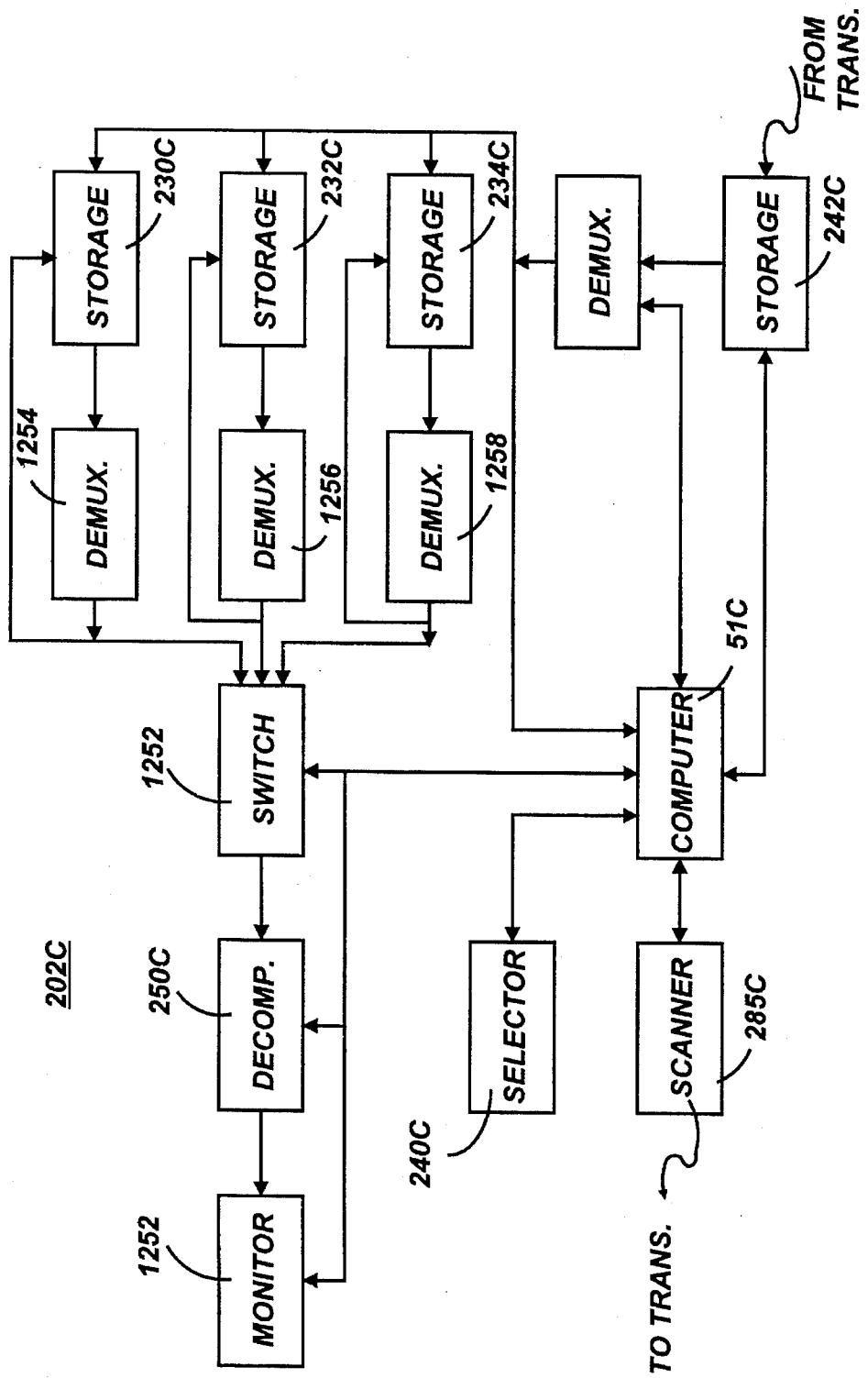
FIG. 46 illustrates an alternative configuration of a receiver 202C.

It should be understood that other combinations of VAD signals (i.e. multiplexed and demultiplexed) are possible. For further illustration, assume that the user wishes to use the audio and video signals (A2, V2) from Channel 2, and the audio signals (A3) from Channel 3. The demultiplexer 1256, corresponding to Channel 2, will demultiplex the audio and video signals (A2, V2), and store them in the storage unit 232C. Similarly, the demultiplexer 1258 demultiplexes only the audio signals (A3) and store the demultiplexed signals in the corresponding storage unit 234C. While FIG. 46 shows that the demultiplexed signals are fed back for storage in the storage units 230C, 232C and 234C, for storage efficiency, it should be noted that the demultiplexed signals could be stored within the switching unit 1252, or in other special storage units (not shown).

Under the control of the computer 51C, the switching unit 1252 accommodates the demultiplexed signals (i.e. D1, A2, V2, A3) and prepares them for further processing, such as by prioritizing the signals, and/or optionally multiplexing them in a predetermined sequence, as desired by the user. Hereinafter, the signals at the output of the switching unit 1252 will be referred to as the "switched signals". The switched signals are then fed into the decompressor 250C, and thereafter forwarded to the monitor 1252.

Turning now to FIG. 47, it illustrates the monitor 1252. Tile monitor 1252 is preferable a conventional computer screen, or the new modular monitor, as described herein. The computer 51C has the capability to assign each channel of signals, to specific icons 1255 through 1258, and to cause the monitor 1252 to be split into several fields, such as F1 through F4. In this way, the user in the foregoing example can select the icon 1255 of Channel 1, and identify the signals he or she wishes to view (i.e. data signals D1 in the above example). The computer 51C will advise the user of the types of available signals on the selected channel (i.e. Channel 1), and will prompt the user to make a selection.

The selected signals will be viewed on the identified field (F1 in this example). It should be noted that the monitor fields F1 through F4, could be varied in number, shape and dimension, by the computer 51C. In a similar way, the signals from Channels 2 and 3 could be viewed on their selected monitor fields F2 and F3.

VI. MULTIMEDIA AND VIDEO ON DEMAND SYSTEMS

Another multimedia application for present invention is for use as part of a statistics or voting system. The users would continuously, or as needed or requested, cast or send in various information or selections, to be processed by an agency or another party. To accomplish this result, the user makes a selection, or enters comments, or casts a vote, or transmits VAD signals, from the user station 203A (FIG. 44), to the intermediate station 202A (FIG. 43), or the transmitter station 200A (FIG. 42).

In the preferred embodiment, the decompressor 250B is connected to the signal sampler 206, via available communications means, such as a telephone line, satellite, etc. The user information, from several sources, is collected by the transmitter station 204A, and processed as described therein. Additionally, the scanner 285B of the user station 203A transmits "handshake" data to the selector 275A of the transmitter station 204A, and allows the user station 203A and the transmitter station 204A to establish communication.

Yet anther application of the present invention, is that it allows the users to communicate and interact with each others, not only through data or audio exchange, but through an integral video-audio-data exchange (VADE) system, thus achieving true interactivity.

Another application of the present system 200, 200A, that distinguishes it over conventional VTR's, is that it allows the user to perform the VTR functions, such as fast forward and rewind, pause, etc., while the channel is being viewed. In conventional VTR's, the channel has to be taped first, and then the foregoing functions could be performed, using a special recorder (VTR).

In the present invention, such a recorder is not necessary, or in the alternative, it could be part of the computer system, i.e. a personal computer, or, part of the intermediate station 202A. In this manner, if the user wishes to "pause" the channel being viewed, the viewer issues a command to the computer 51B (FIG. 44), which, by controlling the storage period in the storage 230B, the decompressor 250B and/or the scanner 285B, prevents further transmission of the signals from the storage 230B to the screen 251B.

As a result, the user obtains a still picture on the screen or auxiliary device 251B. This will enable the picture to be printed. This feature will allow the user station 203A, or a simplified version thereof, to be used in still picture photography. Additionally, the user station 203A could be combined with the video optical system or camera 300 which will be described hereafter, in connection with FIG. 9, such that the signals from the optical system 300 could be inputted to the demultiplexer 105B, and processed as described herein.

Similarly, if the user wishes to fast forward the program (channel) being viewed, the computer 51B controls the storage 230B and the decompressor 250B, and causes the stored signals, which were already sampled prior to storage, to be resampled. For instance, instead of the sequence of signals (FIG. 4) to be released or transmitted to the decompressor 250B, every other signal, or every two other signals (or faster if desired), are transmitted to the screen 251B.

The modular screen or the present invention, or a conventional monitor with split screen capability could be used with the present user station 203A. In this way, if the user wishes to fast forward the program (channel), while still viewing it, the fast forwarded signals could be viewed on a part (split) of the screen, while the remaining program could be viewed on the remaining portion of the screen. Additionally, another part of the screen could also be designated to allow the user to view the rewound program (or other features). To perform this multi-task function, the computer 51B (or the storage 230B, or as an independent element) of the user station 203A, includes a sampler 26B, which controls the re-sampling period of the signals, prior to further processing. The re-sampling period T" is controlled by the computer 51B. Additionally, instead of automatically erasing the signals that have been viewed, the storage 243 or 230B could still store these signals, for another holding period $T_n$.

Consequently, the rewind and other features could be performed, similarly to the conventional VTR's, without having to use a separate recorder-player, as the computer 51B and the monitor 251B could share the functions (elements) of the conventional VTR, and provide improved performance. The foregoing feature of the present invention if part of the multi-media environment, which will become increasingly acceptable in industry standard.

For sophisticated users, or for other applications, the station 203B could also be used as a segment (commercial)

removal. This would require the coordination from the sources of the programs, in that they need to encode the programs so that they are identifiable by the user station 203B. In other words, the locations of the commercials are generally identified, and the uses station 203B could recognize the identification signals, and instruct the computer 51B to remove, or otherwise dispose of the signals between two successive identification signals, in a desired manner.

In order to accommodate analog monitors that currently exist on the market, the decompressor 250 includes a digital to analog (D/A) converter (not shown). However, as digital monitors become widely available, the D/A converter will not be needed. Additionally, in anticipation of a transition period, where analog and digital monitors will coexist in the market place, the VAD systems and methods 10, 200 and 200A, or the monitors, will include a digital-analog selector (not shown) which automatically determines whether the monitor in use can accept digital signals. If so, the digitally stored signals will not be converted into analog signals. Otherwise, the D/A converter will convert these digital signals into analog signals for display on the monitor.

FIG. 39 illustrates a feedback path 1200, which selectively controls the demultiplexing of the signals. Thus, the demultiplexer 105 could demultiplex only the signals which were selected by the channel selector 240. Thus, the storage devices 230, 232 and 234 are capable of storing a combination or digital multiplexed signals, as well as digital demultiplexed signals. It is also within the scope or the invention that the stored signals be a combination of either digital and/or analog signals.

VII. HELICAL APPLICATIONS

Imaging Applications

The present invention has several applications in the imaging field, and in particular in the ultrasound technology for use in medical applications. By using the present invention, it is now possible to achieve greater control over the penetration and resolution of the ultrasound signals. By controlling the harmonic frequencies of the signals, it is possible to better control the penetration and resolution of the signals. Furthermore, it is also possible to generate a three-dimensional picture of the region being diagnosed, and to generate an easily reproducible video picture.

According to the present invention it would be desirable to use two or more signals $S_1$ and $S_2$ of different frequencies and to be reflected and measured. The Doppler shifts generated in response to these two signals are measured and compared. For example, let us assume that the signal $S_1$ has a frequency $F_1$ which is lower than the frequency $F_2$ of the signal $S_2$, the signal $S_1$ will be used to control the resolution of the picture, while the signal $S_2$ will be used to control the penetration of the signal.

Each of the signals $S_1$ and $S_2$ are transmitted and received according to known conventional techniques. However, the simultaneous multiplexing of these two signals is performed according to the present invention, by alternately pulsating the two signals, either simultaneously or within a predetermined delay period from each other, and by allowing an intermittent delay period between two successive signals of the same frequency in order to allow for the processing of the reflected signals.

In the preferred embodiment of the imaging system, the signals $S_1$ and $S_2$ are simultaneously transmitted toward the body part to be imaged. While the present invention is described in relation to medical applications, it should be understood that the imaging system can be used for other applications. The Doppler shifts of the reflected signals $S_1$ and $S_2$ are compared, and each is weighted, according to the following equations 33, 34 and 35:

$$S_{RW}=S_{RR}+S_{RP} \qquad (33)$$

$$S_{RR}=a.S_{1r}-b.S_{2r} \qquad (34)$$

$$S_{RP}=p.S_{1r}-q.S_{2r} \qquad (35)$$

$S_{RW}$ is the resulting Doppler shift being weighted for both signals $S_1$ and $S_2$. $S_{RR}$ is the resulting Doppler shift being weighted for resolution. $S_{RP}$ is the resulting Doppler shift being weighted for penetration. The signal $S_1$ having a lower frequency than the signal $S_2$, its Doppler shift $S_{1r}$ is assigned a heavier resolution weighing coefficient "a" than the resolution weighing coefficient "b" of the Doppler shift $S_{2r}$, see equation (34). By the same logic, the Doppler shift $S_{1r}$ is assigned a lower penetration weighing coefficient "p" than the penetration weighing coefficient "q" of $S_{2r}$, see equation (35).

Thus, according to equation (35), if the resulting Doppler shift $S_{RW}$ is equal to a tolerance value, such as zero, then it is determined that Doppler shifts $S_{1r}$ and $S_{2r}$ are acceptable and could be used. If, on the other hand, $S_{RW}$ is different than the tolerance value, then the weighting coefficients a, b, p and q will require adjustment, and the next step would be to determine whether the Doppler shifts $S_{RR}$ or $S_{RP}$ are different than predetermined tolerance values, then the corresponding weighting coefficients are varied so that the Doppler shifts $S_{RR}$ or $S_{RP}$ are within their corresponding preassigned tolerance values. The above comparative test is done periodically, either on a line by line basis, or on a sector scan basis.

According to the present invention, it would be desirable to use RF video frequency. For illustration purposes only, and without any intent to limit the scope of the invention, three video signals will be used, at the R, G and B frequencies. The signals, such as the $S_R$ signal (R frequency) are coupled with other signals having frequencies that are an integer multiple of the frequencies of the original signals. For example, the $S_R$ signal is coupled with two signals having 2R and R/2 frequencies respectively. In this manner, these three video signals can be processed and considered to be harmonic frequencies and combined to form a single signal. This process is referred to as the "Reverse Fourier Transformation". These three signals are processed to better control penetration and resolution, as described above in connection with the ultrasound signals. The G and B signals are treated similarly to the R signals. The reflected R, G and B signals are then processed and an image is formed. It might be desirable in some applications to control the amplitudes of the harmonic signals, in which event, the amplitudes of these signals are either increased or decreased to the desired value for better processing.

In other applications, the video signals could be processed alongside audio, data, infra-red, ultrasound or other signals, as described above in connection with the program delivery system.

VIII. OTHER APPLICATIONS

Recording Media

The present invention also relates to various recording and storage media, such as optical discs, floppy discs, compact discs; cassettes of different sizes, i.e. micro or mini cassettes; etc.m digital modems and facsimile machines, which utilize the foregoing compression and multiplexing methods. Basically, the audio and/or data signals are modulated over video frequencies, modulated and stored as video signals. The video signals could be generated by television monitors, ultrasound scanners, scanners, printers, facsimile machines or other devices capable of producing a raster scan.

The present invention can also be used in video-audio-data mail applications, where a sender of information can leave encoded video, audio and/or data (VAD) messages, on a recorder, such as a conventional video recorder. When these VAD messages are to be retrieved, they are demultiplexed, demodulated and decoded according to the above teachings. The present video modulation system has several military applications in that it allows the encoding of video, audio and data signals in a non-decodable format by unauthorized users.

While the foregoing compression methods and system have been described in relation to Fourier Transformation, it should be understood to those skilled in the art that other known transformations may alternatively be used in the present invention, without departing from the inventive concept.

Data Transmission System

A conventional digital modem is described in the Motley et al U.S. Pat. No. 3,906,347, which is incorporated herein by reference. The Motley patent includes three sets of claims. The first set includes claims 1 through 4 and relates to a transversal equalizer; the second set includes claims 5 through 10 and relates to an equalization network; and the third set includes claims 11 and 12 which also relates to an equalization network.

FIGS. 48 through 52C illustrate a data transmission system 3001 according to the present invention. The data transmission system 3001 uses a similar transmission principle to that of the modem in the Motley et al. patent, with some exceptions in the design, including the use of transform signals, frequencies and coefficients instead of the multiplying coefficients (89, 93, 97, 99).

Figure 48:
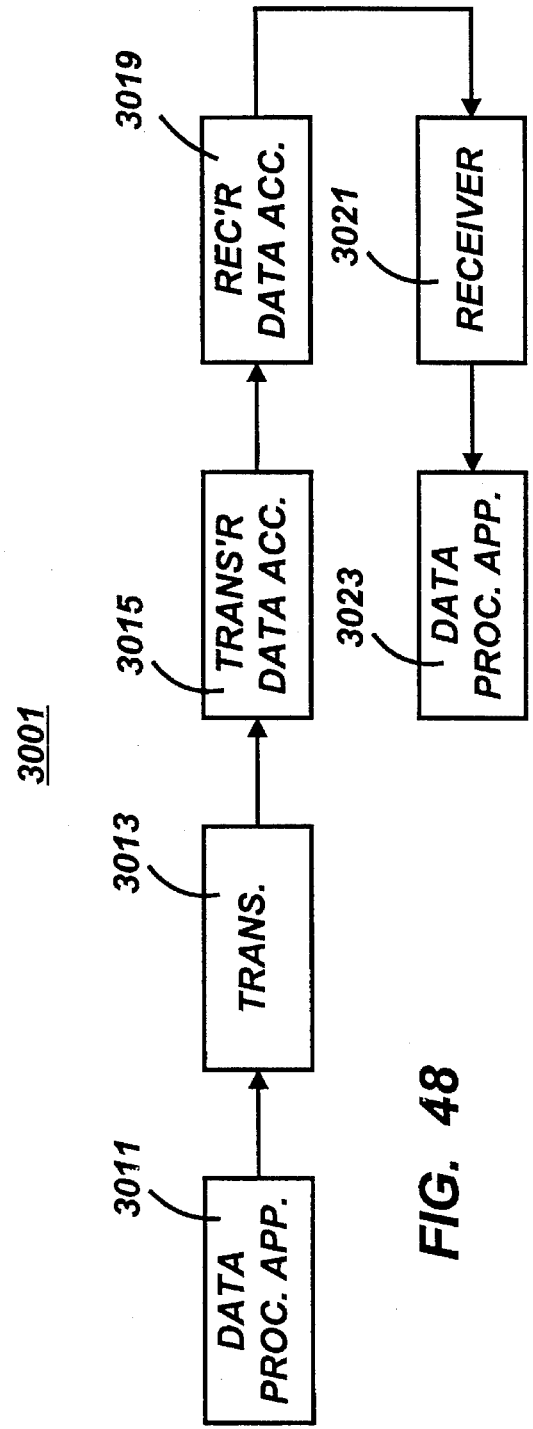

FIG. 48 is a high level block diagram of the data transmission system 3001 comprising a transmitter 3013, and a receiver 3021, according to the present invention. While the data transmission system 3001 is described in relation to a digital modem and data signals, it should be understood that the present invention could be combined with the teaching herein, and applied to various transmission systems, and to signals other than data signals.

Figure 49:
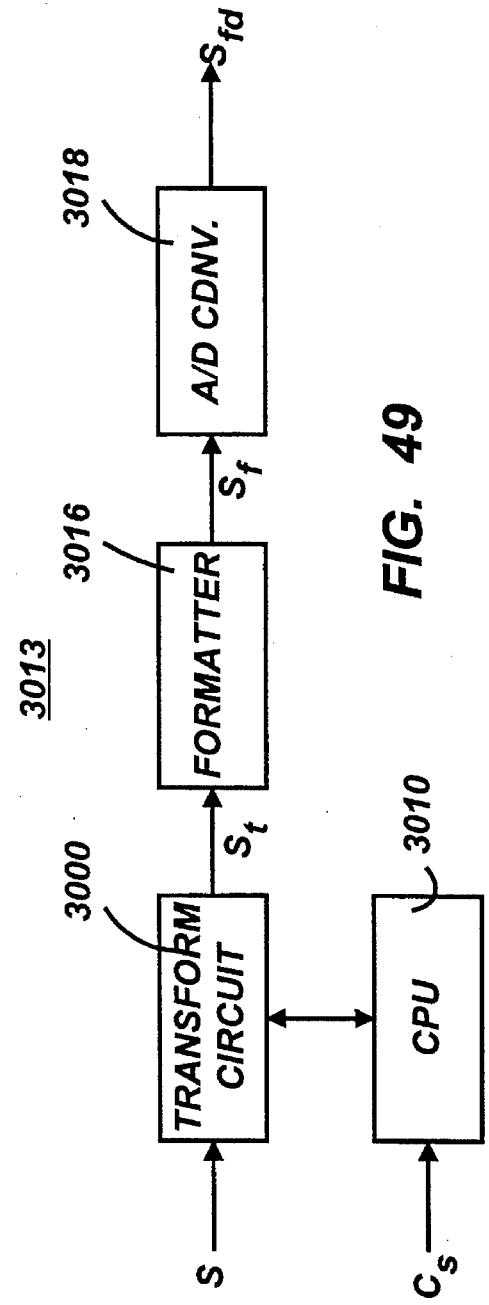
Figure 50:
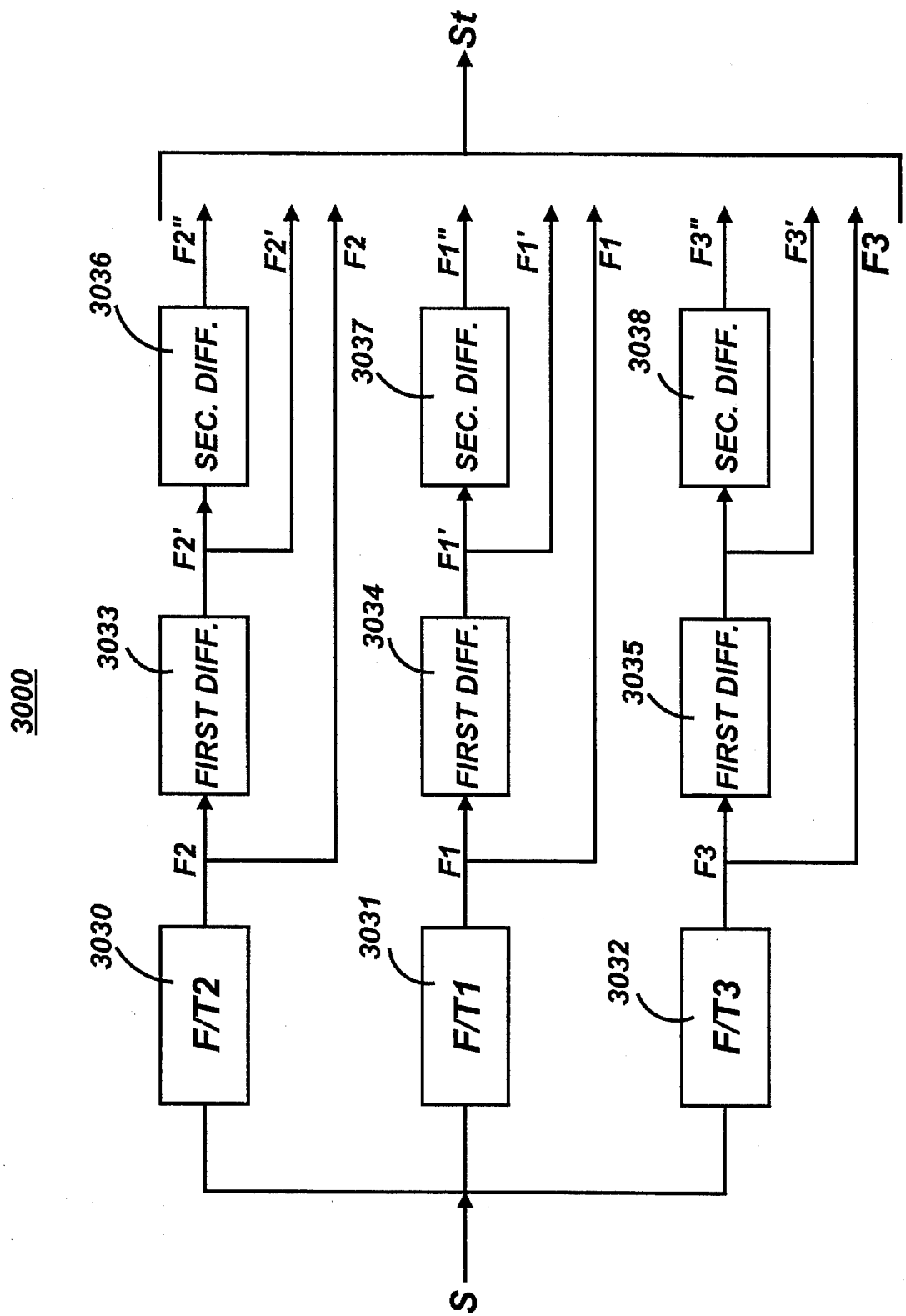

FIG. 49 is a more detailed block diagram of the transmitter 3013. The preferred embodiment of the transmitter 3013 does not include pre-encoding the digitized data, as shown in FIG. 2 of the Motley patent. However, it should be understood that such an encoder could be used as part of the transmitter 3013, such that it is connected to a data processing apparatus 3011, and is adapted to receive straight binary digitized data therefrom at a particular rate, such as 9600 pbs. Data could be encoded within the encoder 3025, The transmitter 3013 includes a transform circuit 3000 which generates a sequence of transform signals St from the original signal "S" to be transmitted. FIG. 50 is a more detailed block diagram of the transform circuit 3000. In the preferred embodiment, the transform circuit 3000 includes a series of Fourier transformers (F/Tn), such as those labeled 3030, 3031 and 3032. It should be understood to those skilled in the art after reviewing the present specification, that, while the present invention as presently described uses Fourier transformers, other transform circuits could be alternatively used.

These transformers 3030, 3031, 3032 generate transform signals F1, F2 and F3. It should be understood that the level of transformation, i.e. how the number of harmonic signals Fn, could be either selected by the user, or automatically adjusted. For illustration purpose only, the present application will describe three transform signals F1, F2, F3.

A series of first differentiator circuits, 3033, 3034, 3035, provide first differential signals F'1, F'2, F'3 of the transform signals F1, F2, F3, with respect to time, or with respect to another factor, such as frequency. A series of second differentiator circuits, 3036, 3037, 3038, provide second differential signals F"1, F"2, F"3 of the transform signals F1, F2, F3. While only two series of first and second differentiators are illustrated, it should be understood that additional differentiation could be done, such as third, fourth or even higher differentiation could be performed according to the teaching of the present invention.

Returning now to FIG. 49, the transmitter 3013 further includes a CPU 3010 for controlling the transformation and differentiation operation of the transform circuit 3000. The CPU 3010 instructs the transform circuit 3000, which transformer and/or differentiator circuit to activate. Optionally, the CPU receives a feedback control signal, for automatically selecting the desired transformer and/or differentiator, As it will be described later.

The signal S as well as a control signal from the CPU 3010 are fed into the transform circuit 3000. The signal S is then passed through a series of Fourier transformers, as described above, and corresponding transform and derivative signals are generated (collectively referred to as St). One important feature of the present invention is the relationship between and among these transformed signals and the derivative signals.

In this respect, F1 is the first Fourier transform signal for signal S; F2 is the second Fourier transform signal (harmonic) for signal S; etc. F2, F3, etc., are the second and third respective Fourier transform signals of the signal S. F'1, F'2, F'3 are the first derivatives of the transformed signals F1, F2 and F3, respectively. F"1, F"2, F"3 are the second derivatives of the transformed signals F1, F2 and F3, respectively. It should be clear that the derivation and transformation selection and functions are controlled by the CPU 3010.

It should also be understood to those skilled in the art, that while the present transform circuit 3000 describes the signal S as being transformed first, and thereafter derived, it is within the scope of the present invention to have the signal S derived first, and thereafter to have the derivative signals transformed later.

Since the signals F1, F2 and F3 are sinusoidal signals, their first and second derivative signals F'1, F'2, F'3 and F"1, F"2, F"3 are also sinusoidal, arid are inter-related as indicated by the following equations 36 through 41:

$$F'1=K'1.F1; \tag{36}$$

$$F''1=K-1.F1; \tag{37}$$

$$F2=K'2.F1; \tag{38}$$

$$F''2=K''2.F1; \tag{39}$$

$$F3=K'3.F1; \text{ and} \tag{40}$$

$$F''3=K''3.F1. \tag{41}$$

Figure 51:
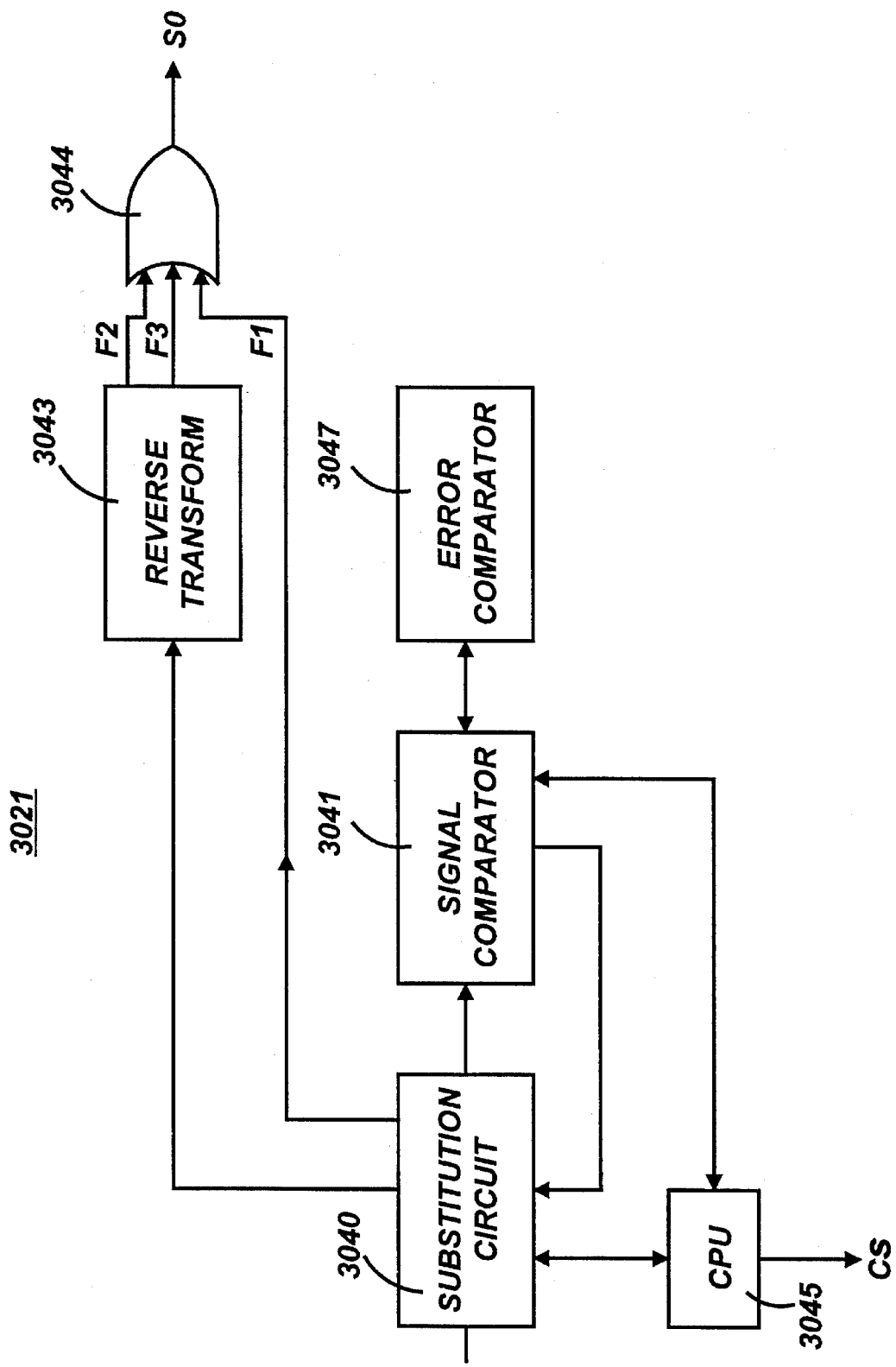

In the foregoing equations, K'1; K"1; K'2; K"2; K'3; and K"3 are known or derivable coefficients. While the foregoing signals are expressed in term of the transform signal F1 (fundamental), it should be noted that these signals could be expressed in term of other transform (harmonics) and/or derivative signals thereof. These coefficients are temporarily stored in the CPU 3010, and could be varied by the feed back control signal from the comparator 3016 (FIG. 51). Furthermore, the signals F'2; F"2; F'3; and F"3 could be expressed in terms of the signals F2 and F3, respectively, equations 38 through 41. This will be desirable in highly accurate transmission data systems, and it will become apparent to those skilled in the art, that this substitution is covered by the present invention.

The following description will use the signal F1 as the template signal, for the signals F'2; F"2; F'3; and F"3, as expressed in the foregoing equations. The signal F1 and the coefficients K'1; K"1; K'2; K"2; K'3; and K"3 are fed into a formatter 3016, where they are placed in a specific format for transmission. One exemplary format, indicated as signal Sf, is as follows: (F1; K'1; K"1; K'2; K"2; K'3; K"3). Therefore, the present invention accomplishes a significant compression architecture, in that only one selected signal (FI) is now transmitted along with coefficients (K'1; K"1; K'2; K"2; K'3; K"3), which occupies lesser spectrum space than non compressed signals.

Yet another important feature of the formatter 3016, is to provide a prioritization scheme of the signals. For instance, the following sequence or format (F1; K'1; K"1; K'2; K"2; K'3; K"3) would indicate that the coefficient K'1 takes precedence over the next coefficient K"1, which, in turn takes precedence over the next coefficient Kt2, and so on. For illustration, the following schemes could alternatively be set by the formatter 3012, which is controlled by the CPU 3010: (F1; K'1; K'2; K'3; K"1; K"2; K'3; K"3); or (F1; F2; F3; K'1; K'2; K"3).

This prioritization scheme would become important for the reconstruction of the signal S. The control signal from the comparator 3016 would allow the CPU 3010 to change the priority scheme, as desired. This change could be done periodically, at predetermined intervals, or continuously, as necessitated.

The formatter 3016 generates a formatted signal Sf, which is fed into an analog to digital (A/D) converter 3018 (if one is needed). It should be understood that the positions of this A/D converter 3018 and the formatter 3016 could be interchanged as required. The digitized signals Sfd are then fed to a transmitter data access circuit 3015 (FIG. 48), for transmission to a receiver data access circuit 3019.

Ideally, the transmitted signal Sfd would be received by the receiver 3021, and, knowing the coefficients and the received signal F1, the original signal S could be restored. However, during transmission, the signal Sf would be distorted. Wherefore the new receiver 3021 is designed to reconstruct the signal S, with minimal distortion, or with distortion that is acceptable for the intended application.

FIG. 51 is a more detailed block diagram of the receiver 3021. The transmitted signals are received by the receiver data access circuit 3019, and are then fed to the receiver 3021, as signal St. The signal Sr includes the formatted sequence (F1d; K'1d; K"1d; K'2d; K"2d; K'3d; K"3d), where the letter "d" indicates distortion in the corresponding signals.

Of these signals, it is expected that the signal F1 be distorted the most. The signal Sfd could be transmitted over a video (or another) carrier frequency, and modulated with other signals, as described herein. However, for illustration and specificity, the signal Sfd will be considered herein, as if it were transmitted directly to the receiver 3021, for use in facsimile machines, modems, or personal computers or devices equipped for receiving data. It should be pointed out however, that when the signal Sfd is transmitted over a video carrier frequency, noise generated during transmission includes signals at that carrier frequency. Consequently, when the original transmitted signal Sfd is to be recovered, noise at the carrier frequency could be filtered out, along with the carrier frequency, thus eliminating a significant and undesirable noise component.

Figure 52A:
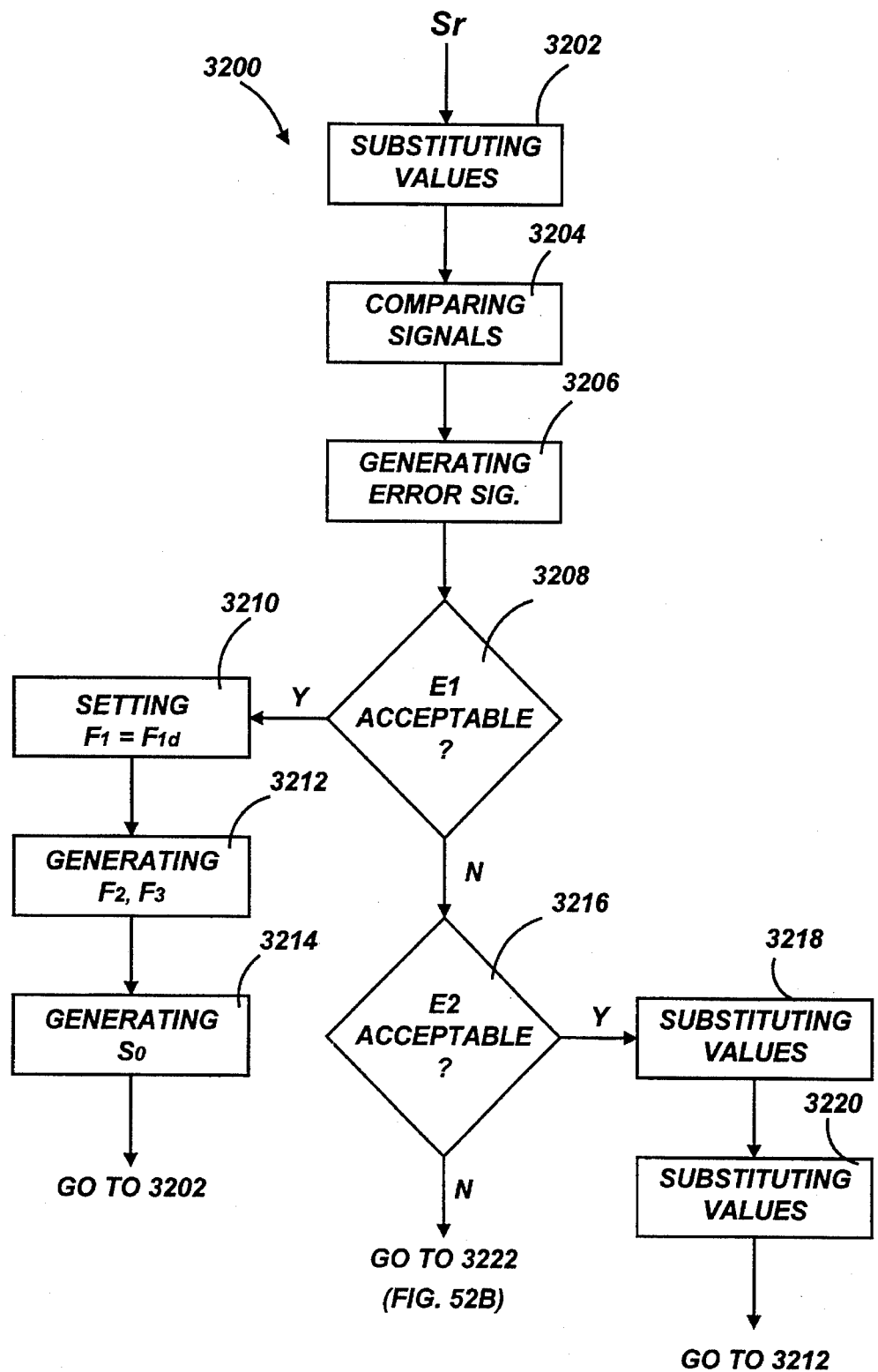
Figure 52B:
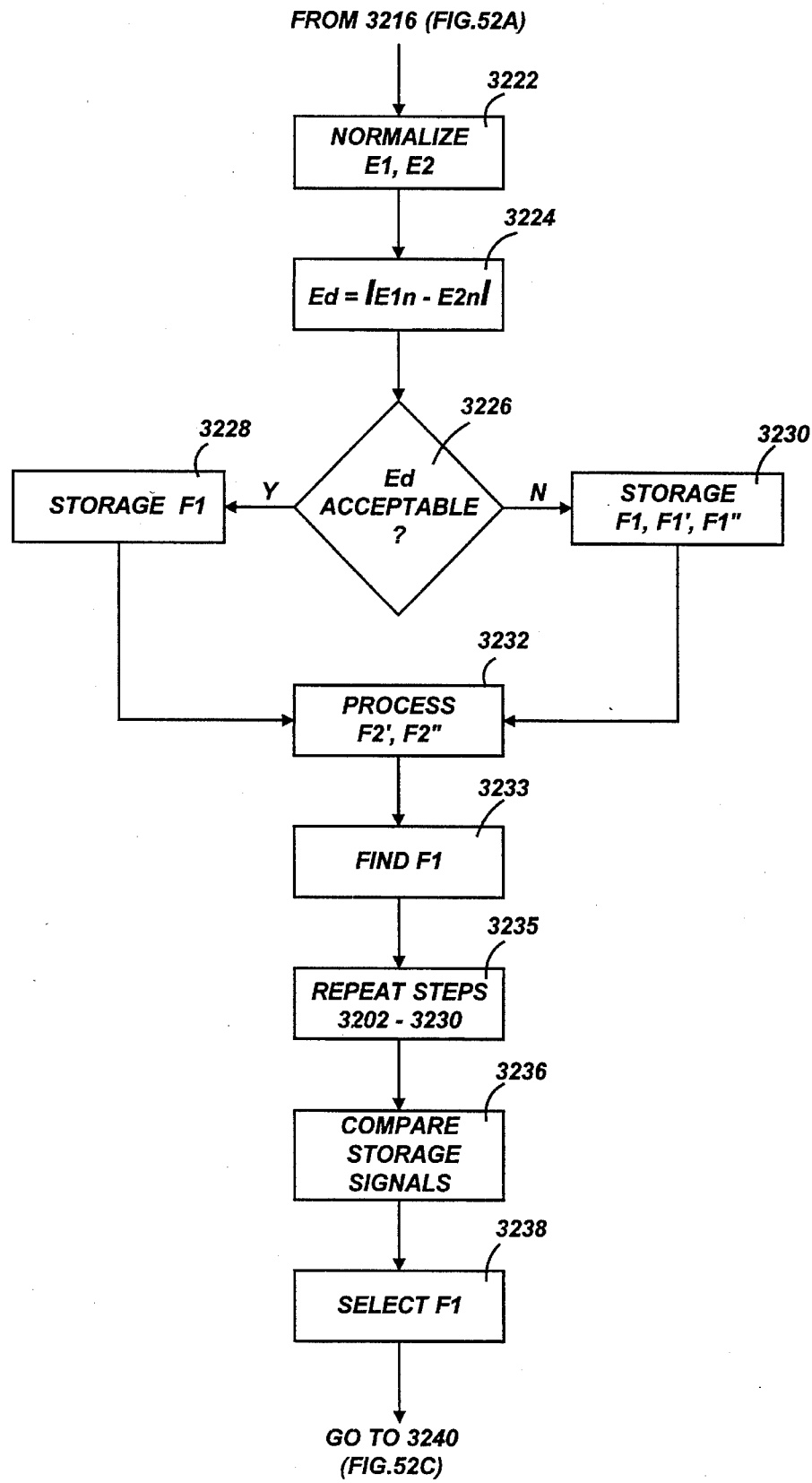
Figure 52C:
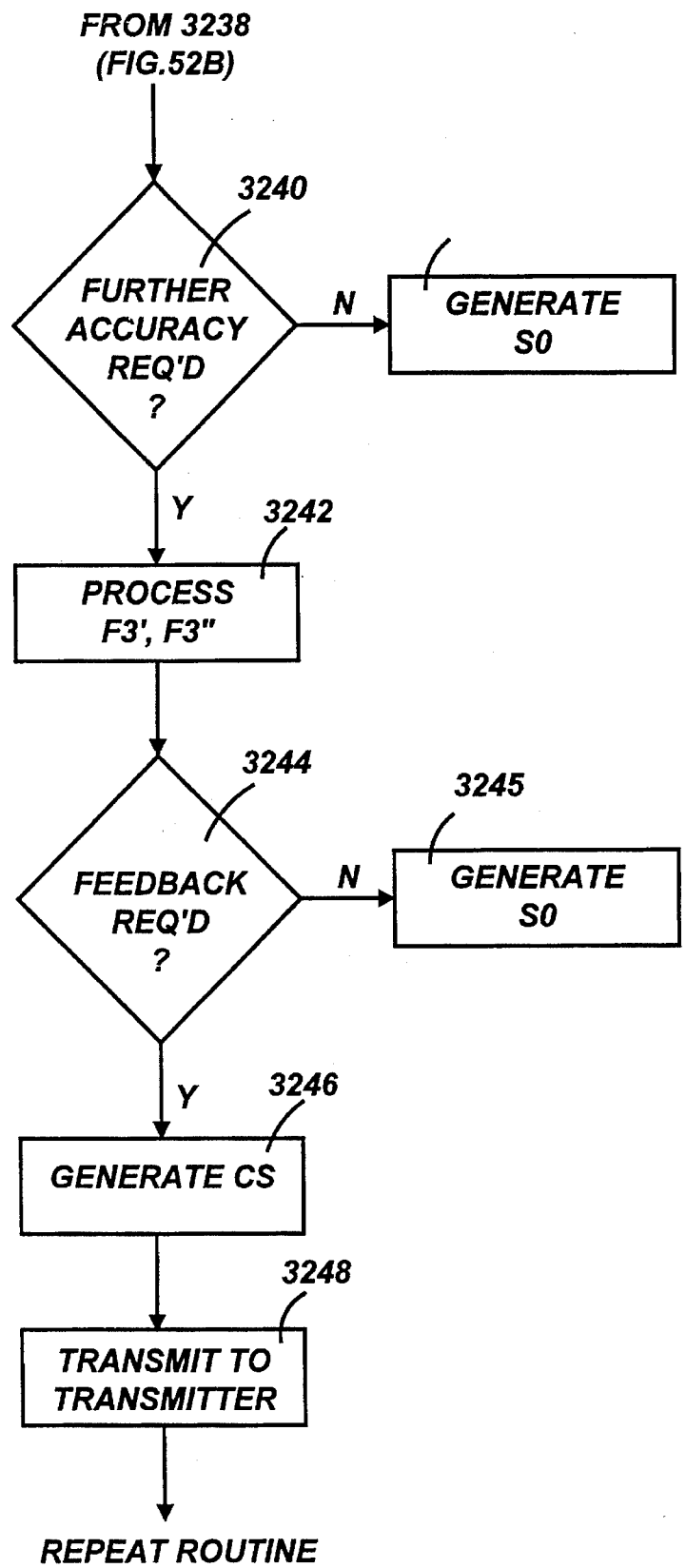

The elements of the receiver 3021 will now be described in connection with FIG. 51, while its operation will be described in relation to a software program 3200 in the CPU 3045, as illustrated in FIGS. 52A through 52C. The receiver 3021 includes a substitution circuit 3040, for substituting (step 3202) the "distorted d" signals (F1d; K'1d; K"1d; K'2d; K"2d; K'3d; K"3d) into equations 36 through 41, and for generating a first sequence of corresponding signals (F1a; F'1a; F"1a), as follows:

$$F'1a = K'1d \cdot F1d; \text{ and} \tag{42}$$

$$F"1a = K"1d \cdot F1d. \tag{43}$$

In the foregoing equations 42 and 43, F'1a and F"1a are the corresponding signals obtained by substituting the known and received signals F1d, K'1d and K"1d into the foregoing equations 42 and 43. A comparator 3041 compares (step 3204) the resulting signals F'1a and/or F"1a with the received signals F'1d and F"1d, and generates (step 3206) corresponding error signals E1 and E2 respectively, according to the following equations 44 and 45:

$$E1 = F'1a - F'1d \tag{44}$$

$$E2 = F"1a - F"1d \tag{45}$$

If the first error signal E1 is within an acceptable range, the received signal F1d would be set equal to F1 (step 3010), and either one of the signals F'1d or F'1a will be set as F'1. Thereafter, the value of F1 is substituted, by the substitution circuit 3040, into the foregoing equations 36 though 41. Knowing the derivative signals F'2; F"2; F'3; and F"3, a reverse Fourier transform circuit 3043 will combine the signals, and will generate (step 3212) the harmonic signals F2 and F3, as described in the present specification. The fundamental signal F1 and the harmonic signals F2 and F3 are then added by the adder 3044, to generate the output signal So (step 3214). The signal So could be converted into analogue signals, if so desired, by means of a Digital to Analogue converter (not shown).

The following alternative method could be used if higher accuracy is desired. Equations 38 through 41 would be expressed as follows $$F'2d = K'2d \cdot F2; \tag{46}$$

$$F"2d = K"2d \cdot F2; \tag{47}$$

$$F'3d = K'3d \cdot F3d; \text{ and} \tag{48}$$

$$F"3d = K"3d \cdot F3d. \tag{49}$$

The transmitter would then transmit the signals F2 and F3, as well as F1, as illustrated by the following exemplary sequence: (F1; F2; F3; K'1; K"1; K'2; K"2; K'3; K"3). Similar determinations would be made with respect to the signals F2 and F3, as they were made above With respect to the signal F1. Respective error signals would be generated, and, if found to be within an acceptable range, the signals F2 and F3 would be substituted in the foregoing equations 46 through 49, and the composite output signal So is derived.

Returning now to the original example, where only the signal F1 is transmitted. If the first error signal E1 is not acceptable, then the second error signal E2 is considered. If the second error signal E2 is within an acceptable range (step 3216), then the signal F"1 would be considered as the template signal (step 3218), from which the signal F1 is derived (step 3220), since the signals F1 and F"1 are related by the following equation, as explained herein:

$$F1=k.F"1 \tag{50}$$

The CPU 3045 controls the foregoing operation. If neither of the error signals E1 or E2 is acceptable, the CPU 3045 normalizes these error signals, so that they could be compared to each other, and generates the corresponding normalized error signals E1n and E2n (step 3222). These latter normalized error signals are then compared by the error comparator circuit 3047 to generate a normalized error differential signal Ed (step 3224), as follows:

$$Ed = \text{Absolute value of } (E1n-E2n). \tag{51}$$

If the normalized error signal Ed is within an acceptable value (step 3226), then the value for F1 is stored (step 3228) in a temporary storage within the CPU 3045, awaiting further processing. If on the other hand, Ed is found to be not acceptable (step 3230), then the values of F1, F'1 and/or F"1 would be stored in the temporary storage (step 3230).

Thereafter, the CPU 3045 then repeats a similar calculation with respect to signals F'2 and F"2 (step 3232), and by substituting these values in equations, 38 and 39, it determines the value of F1 (step 3233). This value for F1 is then substituted in equations 36 and 37, and are compared, by the signal comparator 3041, as described above, and the foregoing steps 3202 through 3230 are repeated (step 3235). The previously stored values for F1, or for (F1, F'1, F"1) are compared with the new values (step 3236), and whichever value either: (1) reduces the error margin, and gets the signal closer to the acceptable range; and/or (2) is comparably closer to the stored value, is then selected and used, as the value for F1 (step 3238).

If further accuracy is needed (step 3240), then the CPU 3045 repeats the foregoing steps with respect to the signals F'3 and F"3, as described above in) connection with signals F'2 and F"2 (step 3242). In this case however, there is the added opportunity to make independent comparisons with the stored signals for F1 and F2 and their corresponding derivative signals, and the CPU 3045 selects the most appropriate signals.

In yet another possible alternative, it would be possible to use a "reverse cascaded" calculation to find the most appropriate value for F1. This is done by substituting the calculated value for F1 (from equations 40, 41) into equations 38 and 39. The most appropriate value for F1 is further calculated using the foregoing teaching. This new value is then substituted into equations 36 and 37, and the new value for F1 is found.

The foregoing process of selection could be rendered more complicated, but more accurate by using equations 46 through 49 for finding the values for F2 and F3, and using these latter signals as well as the signal F1 for cross-parity checking.

In yet another way to increase the accuracy or the transmission, the software inquires at step 3244, whether further accuracy is required. If not, then the signal So is generated, at step 3245.

If on the other hand, further accuracy is required, then the CPU 3045 generates a control error signal Cs at step 3246, and transmits it to the CPU 3010 (FIG. 49). The control signal instructs the CPU 3010 which transform and/or derivative signals to process and transmit to the transmitter 3023, at step 3248. Thus, if at step 3208 it is determined that the first error signal E1 is acceptable, then the error control signal Cs instructs, for example the CPU 3010, not to process any harmonic signals or derivative thereof, as the transmission seems to be within acceptable error/noise margins.

At selected steps of the software 3200, it inquires whether feedback control is required, and if it is, then the CPU 3010 will select the required level of transform and/or derivative signals to be processed. As a general rule however, the further down the flow chart of the software 3200, the control signal is required, additional accuracy would be required, and the higher level of transform and/or derivative signals would be required. It should be noted that the transform and derivative signals are processed independently, i.e. the level of these signals is derived independently.

While particular embodiments of the present invention have been disclosed, it is to be understood that various different modifications are possible and are contemplated within the scope of the specification, drawings, abstract and appended claims.

What is claimed is:

1. A television program insertion method for selectively inserting one or more commercial or secondary programs within one or more main television programs in response to requests from a selector unit, comprising the steps of:
   (a) storing said one or more commercial or secondary programs and said one or more main television programs, using at least two separate channels;
   (b) selecting said at least two separate channels;
   (c) generating signals identifying said selected channels and the insertion positions of each of said one or more commercial or secondary programs relative to each of said one or more main television programs;
   (d) feeding back said identifying signals to a transmitter unit;
   (e) said transmitter unit compressing said selected channels in response to said identifying signals, and transmitting said compressed selected channels;
   (f) storing said transmitted compressed selected channels for a predetermined period of time;
   (g) multiplexing said stored compressed selected channels in a predetermined order; and
   (h) if required, decompressing said stored selected channels.

2. The method according to claim 1, wherein said step of compressing said selected channels includes the step of multiplexing said compressed selected channels prior to said step of transmitting (e); and
   further including the steps of:
   i) determining whether said transmitted compressed selected channels need to be demultiplexed prior to storage in step (f);
   ii) if said transmitted compressed selected channels need to be demultiplexed, then demultiplexing them; otherwise storing them in a multiplexed format; and
   iii) if said transmitted compressed selected channels were demultiplexed, then re-multiplexing them in a predetermined order.

3. The method according to claim 1, further including the steps of transmitting said stored compressed selected channels which were multiplexed pursuant to step (g), to a receiver unit; and decompressing said channels which were transmitted to said receiver unit.

4. A television program-on-demand method for selectively requesting one or more main television programs and for inserting one or more commercial or secondary programs within said one or more main television programs in response to requests from at least one receiver unit, the method comprising the steps of:

(a) storing said one or more commercial or secondary programs and said one or more main television programs, using at least two separate channels;

(b) selecting said at least one or more main television programs by means of the receiver unit;

(c) scanning said at least one or more main television programs that have been selected by the receiver unit in step (b);

(d) generating receiver unit identifying signals in response to said step of scanning in step (c);

(e) transmitting said identifying signals to a selector unit forming part of an intermediate station;

(f) generating intermediate station signals identifying, in response to said receiver unit identifying signals (1) said selected one or more main television programs, (2) one or more commercial or secondary programs, and (3) insertion positions of each of said one or more commercial or secondary programs relative to each of said one or more main television programs;

(g) feeding back said intermediate station identifying signals to a transmitter unit;

(h) said transmitter unit compressing said selected at least two separate channels in response to said intermediate station identifying signals, and transmitting said compressed selected channels to said intermediate station;

(i) storing said transmitted compressed selected channels for a predetermined period of time;

(j) multiplexing said stored compressed selected channels in a predetermined order; and (k) transmitting said multiplexed channels to said at least one receiver unit.

5. The method according to claim 4, further including the step of:

(l) storing said multiplexed channels for a predetermined period of time prior to transmission to said at least one receiver unit in step (k).

6. The method according to claim 5, further including the steps of:

(m) decompressing the channels stored pursuant to step (l);

(n) said transmitter unit multiplexing said compressed channels prior to transmission to said intermediate station;

(o) said intermediate station demultiplexing said transmitted channels pursuant to step (h);

(p) re-multiplexing the demultiplexed channels pursuant to step (o), in a desired sequence;

(q) wherein said transmitting pursuant to step (h), includes the step of transmitting over at least one of satellite link, cable link airwaves or telephone link.

7. The method according to claim 6, further including the steps of:

(n) said transmitter unit multiplexing said compressed channels prior to transmission to said intermediate station; and (o) said intermediate station demultiplexing said transmitted channels pursuant to step (h).

8. The method according to claim 7, further including the step of:

(p) re-multiplexing the demultiplexed channels pursuant to step (o), in a desired sequence.

9. The method according to claim 8, wherein the step of transmitting pursuant to step (h), includes the step of transmitting over satellite links.

10. The method according to claim 8, wherein the step of transmitting pursuant to step (h), includes the step of transmitting over cable links.

11. The method according to claim 9, wherein the step of transmitting pursuant to step (h), includes the step of transmitting over satellite links; and wherein the step of transmitting pursuant to step (k) includes the step of transmitting over at least one of a satellite link, cable link, airwaves or telephone link.

12. The method according to claim 6, further including the steps of:

(n) said transmitter unit multiplexing and compressing said selected at least two separate channels in response to said intermediate station identifying signals, and transmitting said multiplexed and compressed selected channels to said intermediate station; and (o) said intermediate station demultiplexing said transmitted channels pursuant to step (n).

* * * * *